US012677248B2

(12) United States Patent
Edge

(10) Patent No.: US 12,677,248 B2
(45) Date of Patent: Jul. 7, 2026

(54) SYSTEMS AND METHODS FOR MODES OF SIDELINK POSITIONING OF MOBILE DEVICES

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 18/366,455

(22) Filed: Aug. 7, 2023

(65) Prior Publication Data

US 2024/0057027 A1     Feb. 15, 2024

Related U.S. Application Data

(60) Provisional application No. 63/370,918, filed on Aug. 9, 2022.

(51) Int. Cl.
*H04W 64/00* (2009.01)
*H04W 8/00* (2009.01)
(52) U.S. Cl.
CPC ......... *H04W 64/006* (2013.01); *H04W 8/005* (2013.01)
(58) Field of Classification Search
None
See application file for complete search history.

(56) References Cited

U.S. PATENT DOCUMENTS

| | | | |
|---|---|---|---|
| 2022/0014872 A1 | 1/2022 | Balasubramanian et al. | |
| 2023/0221397 A1* | 7/2023 | Baek ....................... | H04L 5/005 |
| | | | 455/456.1 |
| 2025/0008537 A1* | 1/2025 | Sahin .................... | H04W 64/00 |

FOREIGN PATENT DOCUMENTS

WO          2021075851 A1     4/2021

OTHER PUBLICATIONS

International Search Report and Written Opinion—PCT/US2023/071820—ISA/EPO—Nov. 27, 2023.

* cited by examiner

*Primary Examiner* — Frantz Bataille
(74) *Attorney, Agent, or Firm* — Thien T. Nguyen

(57) ABSTRACT

Sidelink positioning of a plurality of UEs may be performed using a sidelink (SL) positioning protocol (SLPP) in either a session mode or a sessionless mode. In the session mode, one UE in the plurality of UEs may discover the other UEs, determine a session for SLPP, indicate the session to the other UEs, and exchange a plurality of SLPP messages with the other UEs, where the SLPP messages are part of the session and enable the sidelink positioning. In the sessionless mode, a UE may not discover some or all other UEs in the plurality of UEs and may exchange a plurality of SLPP messages with the other UEs, where the SLPP messages are not part of a session but enable the sidelink positioning. The two modes may each apply to SL positioning using SL PRS signals as well as WiFi, UWB and GNSS signals.

50 Claims, 25 Drawing Sheets

400A

410

412

Header – e.g., session ID, transaction ID, seq no, acknowledgment seq no.

414

UE1 parameters | UE2 parameters | UEn parameters

Position Method/Type 1

416

UE1 parameters | UE2 parameters | UEn parameters

Position Method/Type 2

418

UE1 parameters | UE2 parameters | UEn parameters

Position Method/Type M

SLPP Message

400B

420

422

424

426

428

1200 —

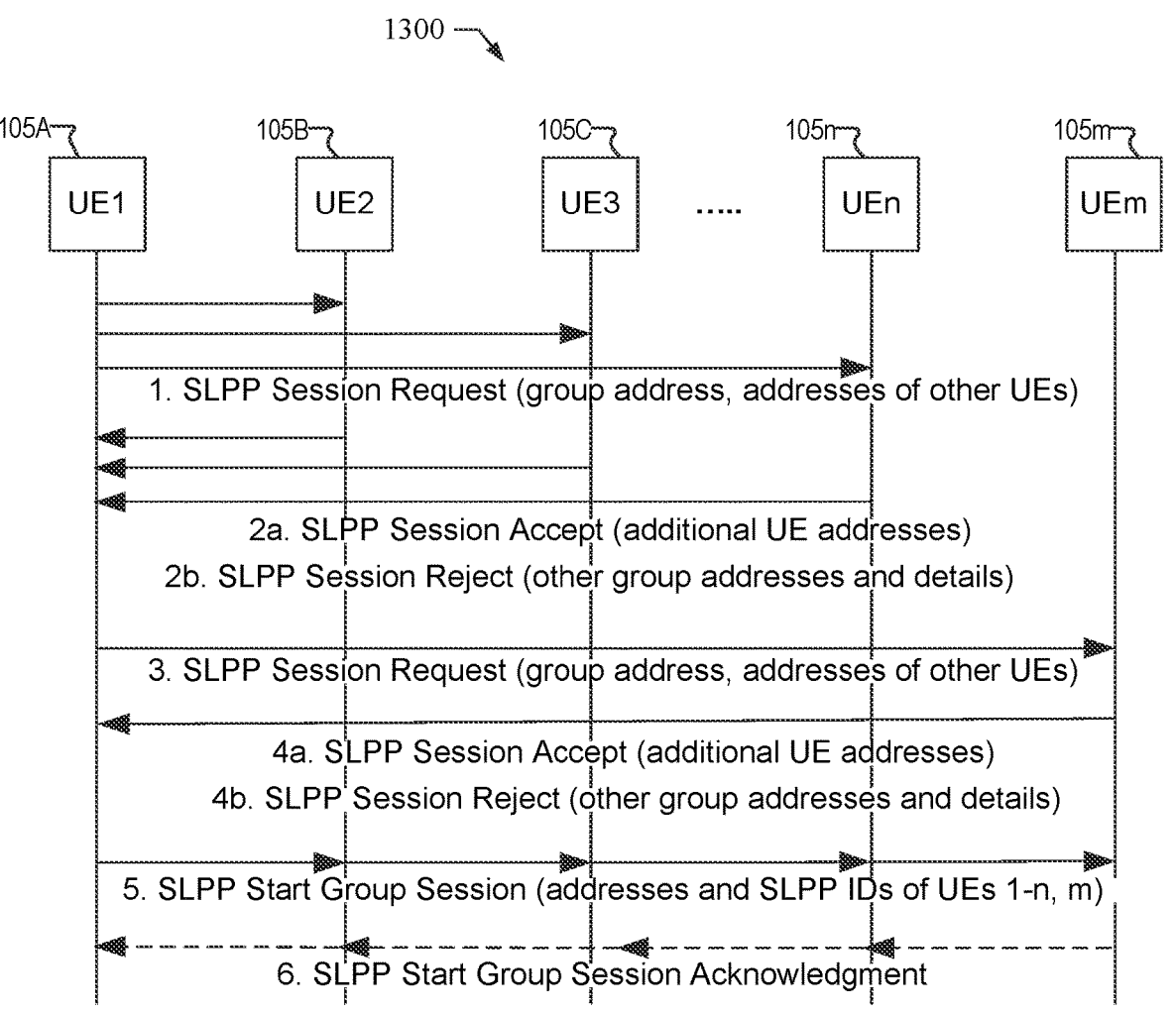

1300

105A      105B      105C      105n      105m

UE1      UE2      UE3      .....      UEn      UEm

1. SLPP Session Request (group address, addresses of other UEs)

2a. SLPP Session Accept (additional UE addresses)
2b. SLPP Session Reject (other group addresses and details)

3. SLPP Session Request (group address, addresses of other UEs)

4a. SLPP Session Accept (additional UE addresses)
4b. SLPP Session Reject (other group addresses and details)

5. SLPP Start Group Session (addresses and SLPP IDs of UEs 1-n, m)

6. SLPP Start Group Session Acknowledgment

UE1        UE2        UE3     .....     UEn

1. Request/Provide SLPP Capabilities and Resources

2. Establish a Common Time Reference if needed

3. Send out and Confirm PRS Configurations from the Anchor UE

4. PRS Transmission and Measurement

5. Send out Measurement Reports

2100

2110 determining a session for a sidelink positioning protocol (SLPP) for the plurality of UEs, wherein the session is indicated to each UE in the plurality of UEs

2120 exchanging a plurality of SLPP messages with other UEs in the plurality of UEs, wherein the SLPP messages are part of the session, wherein the SLPP messages enable the sidelink positioning

2200

2210

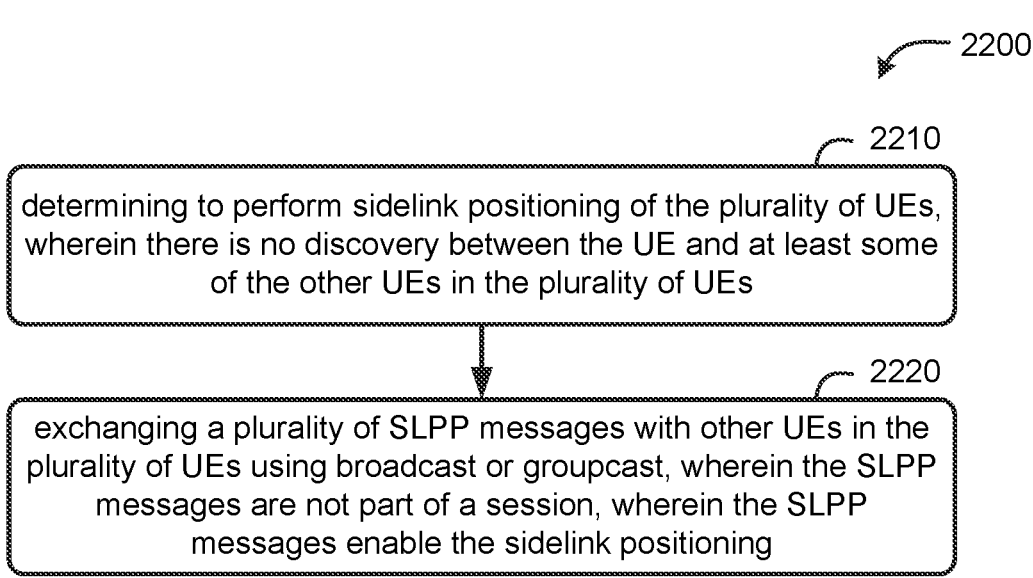

determining to perform sidelink positioning of the plurality of UEs, wherein there is no discovery between the UE and at least some of the other UEs in the plurality of UEs

2220 exchanging a plurality of SLPP messages with other UEs in the plurality of UEs using broadcast or groupcast, wherein the SLPP messages are not part of a session, wherein the SLPP messages enable the sidelink positioning

FIG. 22

SYSTEMS AND METHODS FOR MODES OF SIDELINK POSITIONING OF MOBILE DEVICES

RELATED APPLICATIONS

This application claims the benefit of U.S. Provisional Application No. 63/370,918 filed Aug. 9, 2022, entitled "SYSTEMS AND METHODS FOR 5$^{TH}$ GENERATION (5G) SIDELINK POSITIONING", which is assigned to the assignee hereof, and incorporated herein in its entirety by reference.

BACKGROUND

1. Field of Disclosure

The present disclosure relates generally to the field of wireless communications, and more specifically to determining the location of one or more User Equipments (UEs) using radio frequency (RF) signals transmitted between UEs based on sidelink (SL) communication.

2. Description of Related Art

Wireless communication systems are widely deployed to provide various telecommunication services such as telephony, video, data, messaging, positioning, and broadcasts. Typical wireless communication systems may employ multiple-access technologies capable of supporting communication with multiple users by sharing available system resources (e.g., bandwidth, transmit power). Examples of such multiple-access systems include fourth-generation (4G) systems such as Long-Term Evolution (LTE) systems, LTE-Advanced (LTE-A) systems, or LTE-A Pro systems, and fifth-generation (5G) systems which may be referred to as New Radio (NR) systems.

In some examples, a wireless multiple-access communication system may include a number of base stations, each simultaneously supporting communication for multiple communication devices, otherwise known as user equipment (UEs). A base station may communicate with a set of UEs on downlink channels (e.g., for transmissions from a base station to a UE) and uplink channels (e.g., for transmissions from a UE to a base station). Additionally, UEs may communicate directly with each other using sidelink channels.

A location of a UE may be useful or essential to a number of applications including emergency calls, navigation, direction finding, asset tracking and Internet service. In a cellular network, for example, a base station may send downlink reference signals with which positioning measurements are obtained by a UE and/or the UE may send uplink reference signals with which positioning measurements are obtained by the base stations. The UE may compute an estimate of its own location using the positioning measurements in UE-based positioning or may send the positioning measurements to a network entity, e.g., location server, which may compute the UE location based on the positioning measurements in UE-assisted positioning.

There are a number of other applications where the location of one UE or of multiple UEs may be needed and where traditional UE-based positioning and UE-assisted positioning may be less useful. Examples of such other applications include Vehicle-to-everything (V2X) communication and coordination, Public Safety first responder scenarios and control and coordination of automated environments like factories and warehouses. In these applications, it may be more effective for UEs to communicate using sidelink signaling and for UEs to be located using sidelink related positioning measurements and/or sidelink related control signaling. Further, procedures may be established to enable two or more UEs to perform positioning (including ranging) using sidelink communications. However, many aspects of these sidelink-based procedures are not yet formalized.

BRIEF SUMMARY

Sidelink positioning of a plurality of UEs may be performed using a sidelink (SL) positioning protocol (SLPP) in either a session mode or a sessionless mode. In the session mode, one UE in the plurality of UEs may discover the other UEs, determine a session for SLPP, indicate the session to the other UEs, and exchange a plurality of SLPP messages with the other UEs, where the SLPP messages are part of the session and enable the sidelink positioning. In the sessionless mode, a UE may not discover some or all other UEs in the plurality of UEs and may exchange a plurality of SLPP messages with the other UEs, where the SLPP messages are not part of a session but enable the sidelink positioning. The two modes may each apply to SL positioning using SL PRS signals as well as to WiFi, UWB and GNSS signals.

An example method performed by a user equipment (UE) for sidelink positioning of a plurality of UEs including the UE, comprising determining a session for a sidelink positioning protocol (SLPP) for the plurality of UEs, wherein the session is indicated to each UE in the plurality of UEs; and exchanging a plurality of SLPP messages with other UEs in the plurality of UEs, wherein the SLPP messages are part of the session, wherein the SLPP messages enable the sidelink positioning.

An example method performed by a user equipment (UE) for sidelink positioning of a plurality of UEs including the UE, comprising determining to perform sidelink positioning of the plurality of UEs, wherein there is no discovery between the UE and at least some of the other UEs in the plurality of UEs; and exchanging a plurality of SLPP messages with other UEs in the plurality of UEs using broadcast or groupcast, wherein the SLPP messages are not part of a session, wherein the SLPP messages enable the sidelink positioning.

An example UE for sidelink positioning of a plurality of UEs including the UE, comprises a transceiver, a memory, and one or more processors communicatively coupled with the transceiver and the memory. The one or more processors may be configured to determine a session for a sidelink positioning protocol (SLPP) for the plurality of UEs, wherein the session is indicated to each UE in the plurality of UEs; and exchange a plurality of SLPP messages with other UEs in the plurality of UEs, wherein the SLPP messages are part of the session, wherein the SLPP messages enable the sidelink positioning.

An example UE for sidelink positioning of a plurality of UEs including the UE, comprises a transceiver, a memory, and one or more processors communicatively coupled with the transceiver and the memory. The one or more processors may be configured to determine to perform sidelink positioning of the plurality of UEs, wherein there is no discovery between the UE and at least some of the other UEs in the plurality of UEs; and exchange a plurality of SLPP messages with other UEs in the plurality of UEs using broadcast or groupcast, wherein the SLPP messages are not part of a session, wherein the SLPP messages enable the sidelink positioning.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIG. 13 is a signal flow illustrating the signaling between UEs for starting a session for group mode sidelink positioning, according to an embodiment.

FIG. 22 is a flow diagram of a method of supporting sidelink positioning of a plurality of UEs in sessionless mode, according to an embodiment.

Figure 1:
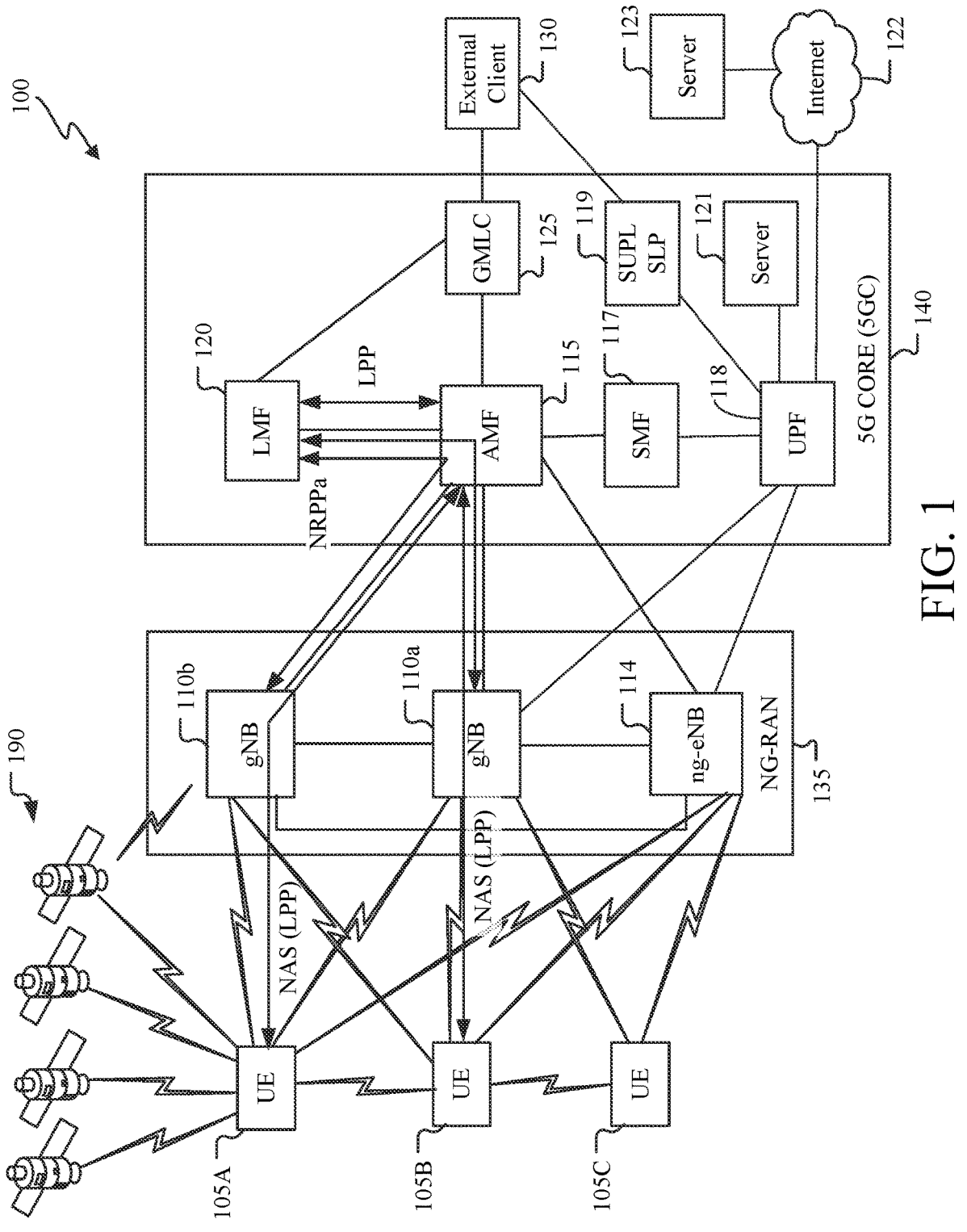
FIG. 1 shows an architecture of a communication system including a number of UEs, a Radio Access Network (RAN), and a 5G Core Network (5GC).

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Techniques and apparatus are discussed herein for supporting sidelink positioning (SL) between UEs. A Sidelink positioning protocol (SLPP) may be used for supporting sidelink positioning of UEs in pairwise positioning (referred to as pairwise mode), group operation (referred to as group mode), as well as network-supported SLPP.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a nontransitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, UEs may be any wireless communication device (e.g., a mobile phone, router, tablet computer, laptop computer, tracking device, Internet of Things (IoT) device, Industrial IoT (IIoT) device, In Vehicle System (IVS), etc.) used to communicate over a wireless communications network. A UE may be mobile or may (e.g., at certain or all times) be stationary, and may communicate with a Radio Access Network (RAN). For example, as used herein, a UE may be an infrastructure node, such as a roadside unit (RSU), Positioning Reference Unit (PRU), etc.

As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device", RSU, PRU, IVS, or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, Wi-Fi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). A communication link through which UEs can send signals to other UEs is called a sidelink channel. As used herein the term traffic channel (TCH) can refer to either an uplink/reverse or downlink/forward or sidelink traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE) in a 5G new radio (NR) network, a 4G (LTE) network or a future (e.g. 6G) network. As described in more detail herein, such signals may comprise any of a variety of signal types but may not necessarily be limited to a Positioning Reference Signal (PRS) as defined in relevant wireless standards.

Further, unless otherwise specified, the term "positioning" as used herein may include absolute location determination, relative location determination, ranging, or a combination thereof. Thus, positioning measurements as discussed herein may include range measurements. Such positioning may include and/or be based on timing, angular, phase, or power measurements, or a combination thereof (which may include RF sensing measurements) for the purpose of location or sensing services.

As noted, SL-based signaling between two or more UEs potentially can be used to perform positioning (including ranging) of at least one of the UEs. However, the many procedural aspects of such positioning have yet to be defined or formalized. Embodiments herein address these and other issues by providing for message types, transactions, procedures and positioning modes that may be used in a protocol for SL-based positioning, referred to herein as SL positioning protocol, or SLPP. According to some aspects, advantages may include expanding the positioning range and capabilities beyond that of traditional LPP positioning of a UE in which the UE exchanges uplink and/or downlink signals with one or more base stations.

FIG. 1 shows an example of a communication system 100 that includes a first UE 105A, a second UE 105B, a third UE 105C, a Radio Access Network (RAN) 135, here a Fifth Generation (5G) Next Generation (NG) RAN (NG-RAN), and a 5G Core Network (5GC) 140. The 5GC 140, for example, may be a public land mobile network (PLMN). The UEs 105A, 105B and 105C may be sometimes referred to herein as UE 105 individually or UEs 105 collectively. The UE 105 may be, e.g., an IoT device, a location tracker device, a cellular telephone, a vehicle, an On-Board Unit (OBU), or other similar type of device. The UE 105 may additionally be considered an RSU or PRU. A 5G network may also be referred to as a New Radio (NR) network; NG-RAN 135 may be referred to as a 5G RAN or as an NR RAN; and 5GC 140 may be referred to as an NG Core network (NGC). The RAN 135 may be another type of RAN, e.g., a 3G RAN, a 4G Long Term Evolution (LTE) RAN, etc. The communication system 100 may utilize a constellation of space vehicles (SVs) 190 which may support a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). In some embodiments, a UE 105 may communicate via an SV 190 and an Earth station (not shown in FIG. 1) with a RAN node (e.g. a gNB 110) or a 5GC 140 node, in which case the UE 105 may not communicate directly with a RAN node but only via the SV 190. This may be used to increase the coverage and/or the capacity of the NG-RAN 135. Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125, a User Plane Function (UPF) 118, and a Secure User Plane Location (SUPL) Location Platform (SLP) 119. The gNBs 110a, 110b and the ng-eNB 114 are communicatively coupled to each other, are each configured wirelessly to communicate bi-directionally with the UEs 105, and are each communicatively coupled to, and configured to bi-directionally communicate with, the AMF 115 and the UPF 118. The gNBs 110a, 110b, and the ng-eNB 114 may be referred to as base stations (BSs) or RAN nodes. The AMF 115, the SMF 117, the LMF 120, and the GMLC 125 are communicatively coupled to each other, and the GMLC 125 is communicatively coupled to an external client 130. The AMF 115, the SMF 117, the UPF 118, and the SLP 119 are communicatively coupled to each other, and the SLP 119 is communicatively coupled to the external client 130. Server 121, the Internet 122, and server 123 may be communicatively coupled with the UPF 118 and may facilitate SL positioning, according to some embodiments. The SMF 117 may further serve as an initial contact point of a Service Control Function (SCF) (not shown) to create, control, and delete media sessions. The base stations 110a, 110b, 114 may be a macro cell (e.g., a high-power cellular base station), or a small cell (e.g., a low-power cellular base station), or an access point (e.g., a short-range base station configured to communicate with short-range technology such as WI-FI, WI-FI DIRECT (Wi-Fi D), BLUETOOTH, Bluetooth-Low Energy (BLE), ZIGBEE, etc. One or more of the base stations 110a, 110b, 114 may be configured to communicate with the UEs 105 via multiple carriers. Each of the base stations 110a, 110b, 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted, as necessary. Specifically, although only UEs 105 are illustrated, many UEs (e.g., hundreds, thousands, millions, etc.) may be utilized in the communication system 100. Similarly, the communication system 100 may include a larger (or smaller) number of SVs (i.e., more or fewer than the four SVs 190 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network. Similar network implementations and configurations may be used for other communication technologies, such as 3G, Long Term Evolution (LTE), future 6G, etc. Implementations described herein (be they for 5G technology and/or for one or more other communication technologies and/or protocols) may be used to transmit (or broadcast) directional synchronization signals, receive and measure directional signals at UEs (e.g., the UEs 105) or at base stations 110a, 110b, 114 and/or provide location assistance to the UEs 105 (via the LMF 120 or SLP 119 or other location server) and/or compute a location for one or both of the UEs 105 at a location-capable device such as the UEs 105, the base stations 110a, 110b, the LMF 120, or SLP 119 based on measurement quantities received at the UEs 105 or the base stations 110a, 110b, 114 for such directionally-transmitted signals. The GMLC 125, the LMF 120, the AMF 115, the SMF 117, the UPF 118, the SLP 119, the ng-eNB (eNodeB) 114 and the gNBs (gNodeBs) 110a, 110b are examples and may, in various embodiments, be replaced by or include various other entities, including location server functionality and/or base station functionality.

The communication system 100 is capable of wireless communication in that components of the system 100 can communicate with one another (at least sometimes using wireless connections) directly or indirectly, e.g., via the base stations 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UEs 105 may include multiple UEs and may be a mobile wireless communication device but may communicate wirelessly and via wired connections. The UEs 105 may be any of a variety of devices, e.g., a smartphone, a tablet computer, a vehicle-based device, etc., but these are examples only as the UEs 105 is not required to be any of these configurations, and other configurations of UEs may be used. Other UEs may include wearable devices (e.g., smart watches, smart jewelry, smart glasses, or headsets, etc.). Still other UEs may be used, whether currently existing or developed in the future. Further, other wireless devices (whether mobile or not) may be implemented within the system 100 and may communicate with each other and/or with the UEs 105, the base stations 110a, 110b, 114, the core network 140, and/or the external client 130. For example, such other devices may include IoT or IIoT devices, medical devices, home entertainment and/or automation devices, etc. The core network 140 may communicate with the external client 130, the server 123 or the server 121 (e.g., which may each be a computer system), e.g., to allow the external client 130, the server 123 or the server 121 to request and/or receive location information regarding the UEs 105 (e.g., via the GMLC 125, SLP 119 or UPF 118).

The UEs 105 or other devices may be configured to communicate in various networks and/or for various purposes and/or using various technologies (e.g., 5G, Wi-Fi (also referred to as WiFi) communication, multiple frequencies of Wi-Fi communication, satellite positioning, satellite communication, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or Wi-Fi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105 may communicate with each other through UE-to-UE sidelink (SL) communications by transmitting over one or more sidelink channels, such as a physical sidelink synchronization channel (PSSCH), a physical sidelink broadcast channel (PSBCH), a physical sidelink control channel (PSCCH), Synchronization Signal Block (SSB), sidelink channel state information reference signal (SL-CSIRS), physical sidelink feedback channel (PSFCH), sidelink positioning reference signals (SL PRS) or sidelink sounding reference signals (SL-SRS).

The UEs 105 may comprise and/or may be referred to as a device, a mobile device, a wireless device, a mobile terminal, a terminal, a mobile station (MS), a Secure User Plane Location (SUPL) Enabled Terminal (SET), or by some other name. Typically, though not necessarily, the UEs 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 Wi-Fi (also referred to as WiFi), Bluetooth (BT), Worldwide Interoperability for Microwave Access (WiMAX), 5G new radio (NR) (e.g., using the NG-RAN 135 and the 5GC 140), future 6G, etc. The UEs 105 may support wireless communication using a Wireless Local Area Network (WLAN) which may connect to other networks (e.g., the Internet) using a Digital Subscriber Line (DSL) or packet cable, for example. The use of one or more of these RATs may allow the UEs 105 to communicate with the external client 130, the server 121 and/or the server 123 (e.g., via elements of the 5GC 140 and possibly the Internet 122) and/or allow the external client 130, the server 121 and/or the server 123 to receive location related information regarding the UEs 105 (e.g., via the GMLC 125, SLP 119 or UPF 118).

Each of the UEs 105 may include a single entity or may include multiple entities such as in a personal area network where a user may employ audio, video and/or data I/O (input/output) devices and/or body sensors and a separate wireline or wireless modem. An estimate of a location of a UE, e.g., UE 105, may be referred to as a location, location estimate, location fix, fix, position, position estimate, or position fix, and may be geodetic, thus providing location coordinates for the UE (e.g., latitude and longitude) which may or may not include an altitude component (e.g., height above sea level, height above or depth below ground level, floor level, or basement level). Alternatively, a location of the UE may be expressed as a civic location (e.g., as a postal address or the designation of some point or small area in a building such as a particular room or floor). A location of the UE may be expressed as an area or volume (defined either geodetically or in civic form) within which the UE is expected to be located with some probability or confidence level (e.g., 67%, 95%, etc.). A location of the UE may be expressed as a relative location comprising, for example, a distance and direction from a known location. The relative location may be expressed as relative coordinates (e.g., X, Y (and Z) coordinates) defined relative to some origin at a known location which may be defined, e.g., geodetically, in civic terms, or by reference to a point, area, or volume, e.g., indicated on a map, floor plan, or building plan. In the description contained herein, the use of the term location may comprise any of these variants unless indicated otherwise.

When sidelink positioning is used, an absolute (e.g. global) or relative location of a UE may not always be obtained. Instead, location results may be obtained for a UE which may include a range or distance between the UE and each of one or more other UEs, a direction from the UE to each of one or more other UEs, a location of the UE relative to the location of some other UE, a location of one or more other UEs relative to the location of the UE, a velocity of the UE, and/or a velocity of each of one or more other UEs. A velocity of a UE may be absolute (e.g. relative to the Earth) or may be relative to some other UE, and may then be referred to as a "relative velocity". A relative velocity of a UE B relative to another UE A may include a "radial velocity" component, which may be equal to a rate of change of a range from the UE A to the UE B, and a "transverse velocity" component which may be at right angles to the radial velocity component as seen by the UE A and may be equal to a rate of angular change of a direction to the UE B from the UE A multiplied by the range from the UE A to the UE B. In the description contained herein, the use of the term "location result" or "location results" for sidelink positioning of a UE or a group of UEs may comprise any of these variants unless indicated otherwise.

The term "target UE" as used herein may refer to a UE for which location results are desired. When a group of two or more UEs participate in SL positioning, only some of the group of UEs may be target UEs as location results may already be known or may not be needed for the other UEs. However, for generality, when discussing the techniques described herein for positioning of a group of UEs, all of the UEs can be considered to be potentially target UEs, as there may be little or no difference in how the techniques described herein are used for the positioning.

The UEs 105 may be configured to communicate with other entities using one or more of a variety of technologies. The UEs 105 may be configured to communicate with one or more other UEs (e.g. other UEs 105) via one or more device-to-device (D2D) peer-to-peer (P2P) links. The D2D P2P links may be an example of (or may be supported by) sidelink signaling and be supported with any appropriate D2D radio access technology (RAT), such as LTE Direct (LTE-D), Wi-Fi Direct (Wi-Fi D), Bluetooth, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UEs 105 via wireless communication between the UEs and one or more of the gNBs 110a, 110b, which may provide wireless communications access to the 5GC 140 on behalf of the UE using 5G. In FIG. 1, the serving gNB for the UE 105A is assumed to be the gNB 110b, while the serving gNB for the UE 105B is assumed to be the gNB 110a, although another gNB may act as a serving gNB if the UEs 105 move to another location or may act as a secondary gNB to provide additional throughput and bandwidth to the UEs 105 and the UEs 105 may share the same serving gNB.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UEs 105. One or more of the gNBs 110a, 110b and/or the ng-eNB 114 may be configured to function as positioning-only beacons which may transmit signals to assist with determining the position of the UEs 105 but may not receive signals from the UEs 105 or from other UEs.

The base stations 110a, 110b, 114 may transmit one or more downlink reference signals, including a positioning reference signal (PRS) transmission. The PRS transmission may be configured for a specific UEs 105 to measure and report one or more report parameters (for example, report quantities) associated with positioning and location information. The PRS transmission and report parameter feedback may support various location services (for example, navigation systems and emergency communications). In some examples, the report parameters supplement one or more additional location systems supported by the UE 105 (such as global positioning system (GPS) technology).

A base station 110a, 110b, 114 may configure a PRS transmission on one or more PRS resources of a channel. A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

The one or more PRS resources may span a number of PRS resource sets according to a PRS resource setting of the base station 110a, 110b, 114. The structure of the one or more PRS resources, PRS resource sets, and PRS resource settings within a PRS transmission may be referred to as a multi-level resource setting. For example, multi-level PRS resource setting of the base station 110a, 110b, 114 may include multiple PRS resource sets and each PRS resource set may contain a set of PRS resources (such as a set of 4 PRS resources).

The UEs 105 may receive the PRS transmission over the one or more PRS resources of the slot. The UEs 105 may determine a report parameter for at least some PRS resources included in the transmission. The report parameter (which may include a report quantity) for each PRS resource may include one or more of a time of arrival (TOA), a reference signal time difference (RSTD), a reference signal receive power (RSRP), an angle, a PRS identification number, a reception to transmission difference (UE Rx-Tx), a signal-to-noise ratio (SNR), or a reference signal receive quality (RSRQ).

Similarly, the UEs 105 may be configured to transmit one or more additional uplink reference signals that may be received by base stations 110a, 110b, 114 and used for positioning. For example, UEs 105 may transmit sounding reference signal (SRS) for positioning. Base stations 110a, 110b, 114 that receive uplink reference signals from a UEs 105 may perform positioning measurements, such as one or more of a time of arrival (TOA), reception to transmission difference (UE Rx-Tx).

A position estimation of the UE may be determined using reference signals, such as PRS signals or SRS for positioning signals, or other reference signals, from one or more base stations 110a, 110b, 114 or the UE. Positioning methods, such as downlink (DL) Time Difference of Arrival (DL-TDOA), DL Angle of Departure (DL AOD), Enhanced Cell ID (ECID) are position methods that may be used to estimate the position of the UE using reference signals from base stations. DL-TDOA, for example, relies on measuring Reference Signal Time Differences (RSTDs) between downlink (DL) signals received from a base station for a reference cell and base station(s) for one or more neighbor cells. The DL signals for which RTSDs may be obtained comprise a Cell-specific Reference Signal (CRS) and a Positioning Reference Signal (PRS).

Other positioning methods may use reference signals transmitted by the UE including uplink-based positioning methods and downlink and uplink based positioning methods. For example, uplink-based positioning methods include, e.g., UL Time Difference of Arrival (UL-TDOA), UL Angle of Arrival (UL AOA), UL Relative Time of Arrival (UL-RTOA). Downlink and uplink based positioning methods include, e.g., multi cell Round-trip time (RTT) between a UE and one or more neighboring base stations. Additionally, sidelink based positioning may be used in which UEs transmit and/or receive sidelink positioning reference signals that are measured and used for positioning.

As noted, while FIG. 1 depicts nodes configured to communicate according to 5G communication protocols, nodes configured to communicate according to other communication protocols, such as, for example, an LTE protocol, a IEEE 802.11x protocol, or a future 6G protocol, may be used. For example, in an Evolved Packet System (EPS) providing LTE wireless access to the UEs 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UEs 105, including cell change and handover and may participate in supporting a signaling connection to the UEs 105 and possibly data and voice bearers for the UEs 105. The LMF 120 may communicate directly or indirectly with the UEs 105, e.g., through wireless communications, or directly or indirectly with the base stations 110a, 110b, 114. The LMF 120 may support positioning of the UEs 105 when the UEs 105 access the NG-RAN 135 and may support position procedures/methods such as Assisted GNSS (A-GNSS), Time Difference of Arrival (TDOA) (e.g., Downlink (DL) TDOA or Uplink (UL) TDOA), Real Time Kinematic (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UEs 105, e.g., received from the AMF 115 or from the GMLC 125. The LMF 120 may be connected to the AMF 115 and/or to the GMLC 125. A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE) may be performed at the UE (e.g., using signal measurements obtained by the UE for signals transmitted by wireless nodes such as the gNBs 110*a*, 110*b* and/or the ng-eNB 114, and/or assistance data provided to the UE, e.g., by the LMF 120). At least part of the positioning functionality (including derivation of the location of the UE) alternatively may be performed at the LMF 120 (e.g., using signal measurements obtained by the gNBs 110*a*, 110*b* and/or the ng-eNB 114. The AMF 115 may serve as a control node that processes signaling between the UEs 105 and the core network 140, and provides QoS (Quality of Service) flow and session management. The AMF 115 may support mobility of the UEs 105 including cell change and handover and may participate in supporting signaling connection to the UEs 105.

The GMLC 125 may support a location request for the UEs 105 received from the external client 130 and may forward such a location request to the AMF 115 for forwarding by the AMF 115 to the LMF 120 or may forward the location request directly to the LMF 120. A location response from the LMF 120 (e.g., containing a location estimate or sidelink location results for the UEs 105) may be returned to the GMLC 125 either directly or via the AMF 115 and the GMLC 125 may then return the location response (e.g., containing the location estimate or sidelink location results) to the external client 130. The GMLC 125 is shown connected to both the AMF 115 and LMF 120, though only one of these connections may be supported by the 5GC 140 in some implementations.

A User Plane Function (UPF) 118 may support voice and data bearers for UE 105 and may enable UE 105 voice and data access to other networks such as the Internet 122 and to servers such as server 121 and server 123. The UPF 118 may be connected to gNBs 110 and ng-eNB 114. UPF 118 functions may include: external Protocol Data Unit (PDU) session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 118 may be connected to the SLP 119 to enable support of positioning of UE 105 using SUPL. SLP 119 may be further connected to or accessible from external client 130.

As illustrated, a Session Management Function (SMF) 117 connects to the AMF 115 and the UPF 118. The SMF 117 may have the capability to control both a local and a central UPF within a PDU session. SMF 117 may manage the establishment, modification, and release of PDU sessions for UE 105, perform IP address allocation and management for UE 105, act as a Dynamic Host Configuration Protocol (DHCP) server for UE 105, and select and control a UPF 118 on behalf of UE 105.

As further illustrated in FIG. 1, the LMF 120 may communicate with the gNBs 110*a*, 110*b* and/or the ng-eNB 114 using a New Radio Position Protocol A (NRPPa), which may be defined in 3GPP Technical Specification (TS) 38.455. NRPPa messages may be transferred between the gNB 110*a* (or the gNB 110*b*) and the LMF 120, and/or between the ng-eNB 114 and the LMF 120, via the AMF 115. As further illustrated in FIG. 1, the LMF 120 and the UEs 105 may communicate using an LTE Positioning Protocol (LPP), which may be defined in 3GPP TS 37.355. Here, LPP messages may be transferred between the UEs 105 and the LMF 120 via the AMF 115 and the serving gNB 110*a*, 110*b* or the serving ng-eNB 114 for the UEs 105. For example, LPP messages may be transferred between the LMF 120 and the AMF 115 using service operations based on the Hypertext Transfer Protocol (HTTP) and may be transferred between the AMF 115 and the UEs 105 using a 5G Non-Access Stratum (NAS) protocol.

The LPP protocol may be used to support positioning of the UEs 105 using UE-assisted and/or UE-based position methods such as A-GNSS, RTK, TDOA, AOA, AOD, and/or E-CID. The NRPPa protocol may be used to support positioning of the UEs 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional Synchronization Signal (SS) transmissions from the gNBs 110*a*, 110*b*, and/or the ng-eNB 114. The LMF 120 is illustrated in FIG. 1 as being located in the core network 140, but may be external to the core network 140, e.g., in an NG-RAN. For example, the LMF 120 may be co-located or integrated with a gNB, or may be disposed remote from the gNB and configured to communicate directly or indirectly with the gNB.

With a UE-assisted position method, the UE, e.g., UE 105A or UE 105B may obtain location measurements and send the measurements to a location server (e.g., the LMF 120) for computation of a location estimate for the UE. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ), AOA, AOD, for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE, e.g., UE 105A or UE 105B, may obtain location measurements (e.g., which may be the same as or similar to location measurements for a UE-assisted position method) and may compute a location of the UE (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114), may obtain location measurements (e.g., measurements of RSSI, RTT, RSRP, RSRQ, AOA, AOD, or Time of Arrival (ToA) for signals transmitted by the UE, e.g., UE 105A or UE 105B) and/or may receive measurements obtained by the UE. The one or more base stations or APs may send the measurements to a location server (e.g., the LMF 120) for computation of a location estimate for the UE.

As noted, while the communication system 100 is described in relation to 5G technology, the communication system 100 may be implemented to support other communication technologies, such as GSM, WCDMA, LTE, etc., that are used for supporting and interacting with mobile devices such as the UEs 105 (e.g., to implement voice, data, positioning, and other functionalities). For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125.

Positioning for UEs in a radio network, such as communication system 100 shown in FIG. 1, typically uses Uu interfaces, i.e., a radio interface between a UE 105 and the radio access network, for DL PRS and/or UL PRS. Positioning for UEs may also or instead use sidelink PRS (SL PRS), which may be a specific sidelink defined reference signal for positioning or may reuse Uu PRS, e.g., UL PRS, sometimes referred to as Sounding Reference Signal for positioning (SRSPos), or other reference signals may be transmitted in the sidelink channel. Sidelink positioning may enhance UE positioning by providing additional transmission (or reception) nodes. A UE, such as UE 105B, with a known position may be used to support position determination of another target UE, such as UE 105A, where the UE 105B is sometimes referred to as an anchor node.

With a sidelink positioning method, a UE 105A for example may transmit a sidelink PRS or sidelink SRS signal which is received and measured by another UE 105B. In addition or instead, the UE 105B for example may transmit a sidelink PRS or sidelink SRS signal which is received and measured by the UE 105A. A sidelink PRS may be similar to a PRS (e.g. DL PRS) transmitted by a gNB 110, e.g. as described previously. A sidelink SRS may be similar to an SRS (e.g. uplink) SRS transmitted by a UE 105 for measurement by a gNB 110, e.g. as described previously. SL PRS may be transmitted over separate short periods (e.g. of around 1 millisecond in duration) referred at as "SL PRS occasions" or as "SL PRS positioning occasions". Measurements of SL PRS or SL SRS signals may include a reception to transmission time difference (Rx-Tx), time of arrival (TOA), reference signal receive power (RSRP), reference signal receive quality (RSRQ), angle of arrival (AOA) and reference signal time difference (RSTD). SL position methods may include SL round trip signal propagation time (RTT) (also referred to as ranging), SL AOA and SL AOD.

In some scenarios, a group of UEs 105 may support SL positioning. In this case, one UE in the group (e.g. UE 105A) may transmit an SL PRS or SL SRS signal which may be measured by some or all of the other UEs 105 in the group (e.g. UEs 105B and 105C). Some or all of the other UEs 105 in the group may also each transmit an SL PRS or SL SRS signal (e.g. with each UE 105 transmitting SL SRS or SL PRS at a different time or times than times at which other UEs 105 in the group transmit SL PRS or SL SRS) which may be measured by some or all other UEs 105 in the group different to the UE 105 transmitting the UL PRS or ULS SRS. Measurements made by UEs 105 applicable to transmission of SL PRS or SL SRS by a group of UEs 105 may include Rx-Tx, TOA, RSTD, AOA, RSRP, RSRQ. Position methods supported by these measurements may include sidelink RTT (e.g. ranging), sidelink AOA, sidelink AOD, sidelink TDOA (SL-TDOA). Based on the measurements and the position methods(s), each UE 105 may determine location results for itself and/or for one or more other UEs 105 in the group. As described previously, the location results for a UE 105 may include a range or distance between the UE 105 and each of one or more other UEs 105 in the group, a direction from the UE 105 to each of one or more other UEs 105 in the group, a direction to the UE 105 from each of one or more other UEs 105 in the group, a location of the UE 105 relative to a location of some other UE 105 in the group, a location of the UE 105 relative to some other known location, an absolute location of the UE 105, a velocity of the UE 105 or a velocity of the UE 105 relative to some other UE 105.

Sidelink positioning may be used for positioning of UEs independently of a core network (e.g. 5GC 140) or a serving PLMN. One example implementation of sidelink positioning may be found in vehicular communication systems, such as V2X, which may be used for safety related applications, such as safety warnings, traffic congestion (e.g., automated traffic control), and coordinated or automated vehicle maneuvering. One aspect of sidelink positioning that may require a solution for standardization is a sidelink positioning protocol (SLPP) that can be used between UEs, including between an RSU and UEs, and location servers. The SLPP, for example, may support sidelink positioning between UEs, RSUs, and PRUs with network access independence. The SLPP may provide support for sidelink positioning for a pair of UEs (e.g., ranging), groups of UEs (V2X), and for UEs that are members of multiple different groups. By way of example, SLPP may provide support for various position techniques currently standardized for UE-based and UE-assisted support by a location server (e.g. LMF 120) such as PRS RTT, AOA, Differential AOA (DAOA), AOD, Differential AOD (DAOD), but may also enable the support of other PRS and SRS based position methods and non-PRS methods such as RTK at a later time. By enabling the addition of new capabilities and methods at a later time, the SLPP may avoid the need to define separate new positioning protocols different to SLPP. By way of example, additional position methods that may be included in SLPP at a later time may include RTK, Wi-Fi, Ultra-Wideband (UWB), BT positioning methods.

The SLPP may enable direct sidelink operation initially (where UEs communicate and coordinate positioning by exchanging SLPP messages using sidelink signaling), and may be extended later to sidelink operation via relays and operation via a network, where UEs may exchange SLPP messages via a network or via intermediate relay UEs. For example, this might be used to coordinate positioning of two vehicles on a collision course at a corner where direct SL signaling between the two vehicles is not possible. Thus, SLPP may define support for SL PRS based positioning initially in a generic manner to simplify extension to support of other position methods later. For example, SLPP may define generic SLPP messages similar to generic LPP messages defined for LPP in 3GPP TS 37.355. SLPP may support separate position methods (e.g. SL PRS RTT, SL PRS AOA, SL PRS AOD) using common procedures and common parameters where feasible. SLPP may define procedures that can be reused for multiple position methods and are not limited to just one or a few position methods. SLPP may be enabled to be transferred and used by various entities, such as UEs, RSUs, PRUs, and location servers, such as LMFs and SUPL SLPs. The location server (e.g., LMF and SUPL SLP) usage may transfer SLPP messages inside LPP messages to enable UE-assisted positioning by an LMF or SUPL SLP. Alternatively, the location server (e.g., LMF and SUPL SLP) usage may transfer SLPP messages not in association with LPP messages to enable UE-assisted positioning by an LMF or SUPL SLP. SLPP may further support relative (local) and global positioning.

Figure 2:
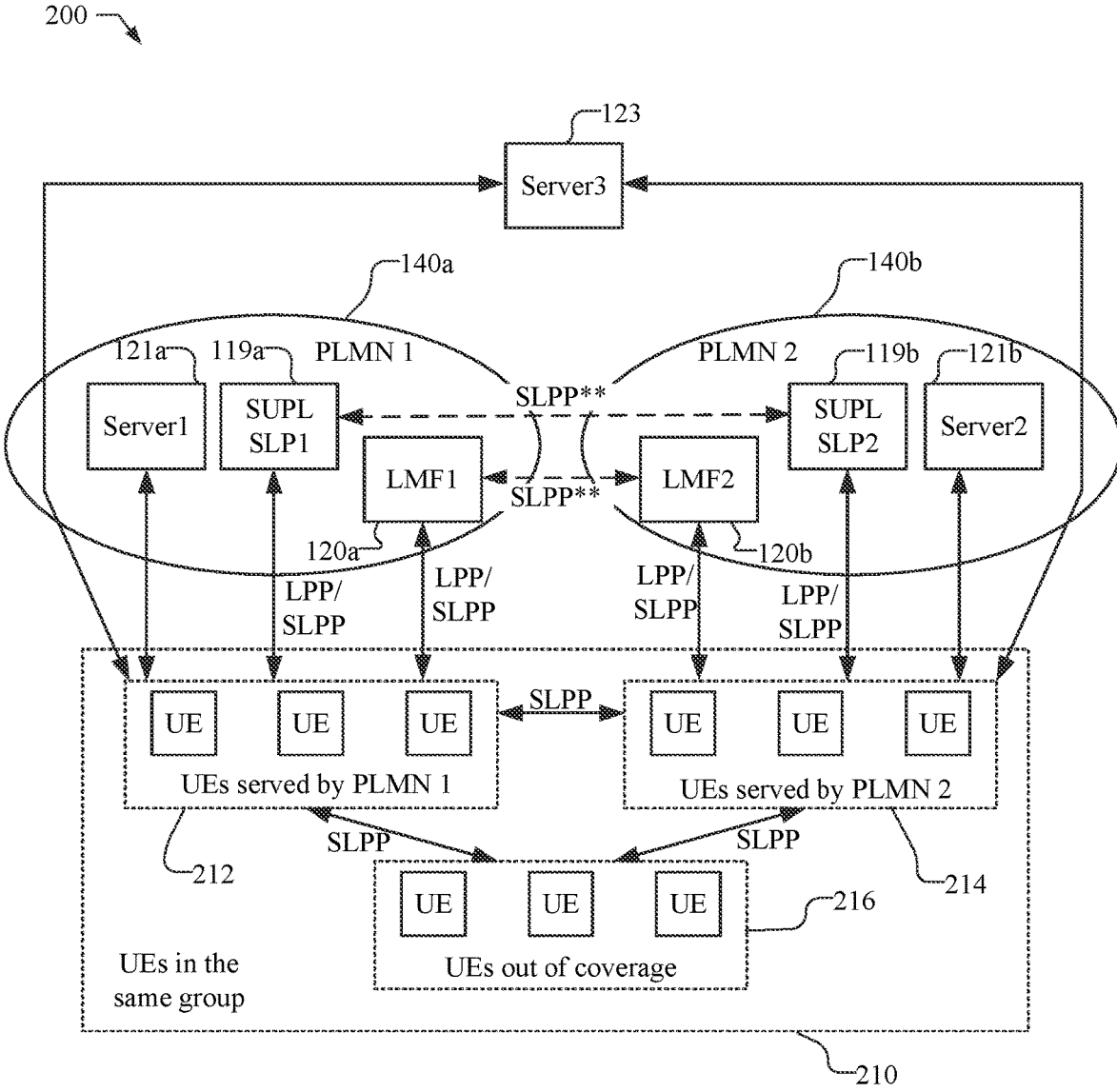
FIG. 2 shows an architecture of a communication system for network-supported sidelink positioning.

FIG. 2, by way of example, shows an architecture of a communication system 200 capable of network-supported sidelink positioning. As illustrated in FIG. 2, a number of UEs may be combined within a same group 210 for sidelink positioning. Within the group 210, various subgroups of UEs may be present. For example, the group 210 of UEs may include a first subgroup 212 of UEs that is served by a first network (PLMN1 140*a*), while a second subgroup 214 of UEs is served by a second (different) network (PLMN2 140*b*), and a third subgroup 216 of UEs is out of coverage of and is not served by either network. One or more of the UEs served by a network, e.g., the UEs in subgroup 212 served by PLMN1 140*a*, or the UEs in subgroup 214 served by PLMN2 140*b*, may include RSUs.

A location server in a serving network, e.g., LMF1 120*a*, SUPL SLP1 119*a*, or Server1 121*a* in the serving PLMN1 140*a*, LMF2 120*b*, SUPL SLP2 119*b*, or Server2 121*b* in the serving PLMN2 140*b*, and Server3 123 (communicating to UEs via PLMN1 140*a* and/or PLMN2 140*b*), may assist some or all UEs in a group that are served by the network (PLMN), e.g., subgroups 212 and 214, respectively. As illustrated, the location servers may support UEs by communicating with the UEs using "LPP/SLPP," which represents communicating using LPP, SLPP, embedding SLPP in LPP, or a combination thereof. For example, LMF1 120*a* and LMF2 120*b* may embed SLPP in LPP while supporting UEs in subgroups 212 and 214, respectively (e.g. where each SLPP message transferred between a UE and LMF1 120*a* or LMF2 120*b* is embedded in one LPP message and where one LPP message may include one or more than one embedded SLPP messages). Similarly, SUPL SLP1 119*a* and SUPL SLP2 119*b* may embed SLPP in LPP with LPP messages embedded in SUPL UserPlane Location Protocol (ULP) messages while supporting UEs in subgroups 212 and 214, respectively. Additionally or alternatively, LPP messages and/or SLPP messages may be used, where SLPP messages are not embedded in LPP messages (though LPP messages or SLPP messages may still be embedded in SUPL ULP messages). Additionally, the UEs within each subgroup, and UEs in different subgroups may exchange SLPP messages with one another to support and coordinate SL positioning.

The location server (e.g., LMF/SUPL SLP/Server1/Server2/Server3) support for a particular UE or UEs may not be visible to other UEs in the group. For example, the location server support from the PLMN1 140*a* for UEs in subgroup 212 may not be visible to UEs in subgroup 214 and may not be visible to the out of coverage UEs in subgroup 216. The support provided by location servers to the UEs may include determination or verification of SL PRS configurations and calculation of location results for UEs, including for UEs that are supported and for UEs that are not supported (e.g. such as calculating location results for UEs within a supported subgroup and for UEs within an unsupported subgroup, e.g. if position information for the UEs in the unsupported subgroup is provided to the location server). In some implementations, signaling between location servers in separate networks may be used to provide more complete network support. As illustrated, LMF-LMF or SUPL SLP-SUPL SLP signaling may use an extension of SLPP (referred to as SLPP in FIG. 2**) to enable more complete network support.

The SLPP message types may align with LPP message types to enable LPP messages to contain embedded SLPP messages and/or to enable SLPP procedures to align with LPP procedures which may reduce implementation and/or testing. FIG. 2 shows signaling (e.g. SLPP messages or SLPP messages embedded in LPP messages) between LMF1 120*a* and one or more of the UEs of subgroup 212 and signaling between LMF2 120*b* and one or more of the UEs of subgroup 214. FIG. 2 also shows SLPP messages, or LPP messages that contain embedded SLPP messages, and that are embedded in SUPL ULP messages that are exchanged between SUPL SLP1 119*a* and one or more of the UEs of subgroup 212 and between SUPL SLP2 119*b* and one or more of the UEs of subgroup 214. SLPP may include messages that are analogous to an LPP Request Capabilities message and an LPP Provide Capabilities message, which, for example, in SLPP may be called "Request Capabilities and Resources" and "Provide Capabilities and Resources". The Request/Provide Capabilities and Resources in SLPP may be restricted to NR SL PRS capabilities and resources initially, but may be extended later to capabilities and resources for LTE SL PRS, RTK, Wi-Fi, BT, etc.

In another example, SLPP may include a message that is analogous to an LPP Provide Assistance Data message, which, for example, in SLPP may be called a "Provide Positioning Signal Configuration" (or just a "Provide Assistance Data"). The Provide Positioning Signal Configuration in SLPP may include one or more of, e.g., the SL PRS Configuration to be transmitted by each UE and measured by other UEs, a start time and duration of the transmission, and conditions for termination of the transmission, and the types of SL PRS measurements requested, such as Rx-Tx, AOA, RSRP, RSRD, TOA, TDOA. In some implementations, the Provide Positioning Signal Configuration in SLPP may be extended to define other types of signals, such as RTK signals to be measured, Wi-Fi signal to be transmitted and measured etc. The Provide Positioning Signal Configuration in SLPP may include additional information, for example, to assist UEs in acquiring and measuring signals (e.g. SL PRS signals) and to determine times of transmission and measurement.

In another example, SLPP may include a message such as a "Confirm Positioning Signal Configuration" (or a "Provide Assistance Data Confirm"), which does not have an analogous LPP message. The Confirm Positioning Signal Configuration in SLPP, for example, may confirm whether a Provide Positioning Signal Configuration (or a Provide Assistance Data) is agreeable. If the Provide Positioning Signal Configuration is (partly) not agreeable, a different configuration may be provided as a Provide Positioning Signal Configuration. Because LPP does not have an analogous message, a new LPP message type may be added to carry the Confirm Positioning Signal Configuration SLPP message in the case that SLPP messages are embedded in LPP messages. However, such a new LPP message type may not be needed when SLPP messages are not embedded in LPP messages.

In another example, SLPP may include a message that is analogous to an LPP Provide Location Information message, which, for example, in SLPP may be called a "Provide Location Information" message. The Provide Location Information message in SLPP may include and provide SL PRS measurements obtained by a UE for SL PRS transmitted by one or more other UEs and/or may include and provide location results obtained for the UE and/or for other UEs. The Provide Location Information in SLPP may be extended to include and provide other measurements, such as measurements of RTK, Wi-Fi, BT etc.

As illustrated in FIG. 2, UEs within each subgroup and UEs in different subgroups may signal each other using SLPP (e.g. where a UE sends an SLPP message to one or more other UEs). Additionally, location servers (e.g., LMF, SUPL SLP, or Server1-3) may support UEs using SLPP (as discussed above). As previously noted, SLPP may be embedded in LPP or embedded in both LPP and SUPL, or may be sent without embedding in LPP according to some embodiments. Accordingly, a first UE may receive a first SLPP message from a second UE and may send the first SLPP message to a location server that supports the first UE.

The first UE may receive a second SLPP message from the location server in response to the first SLPP message and may send the second SLPP message to the second UE.

Figure 3:
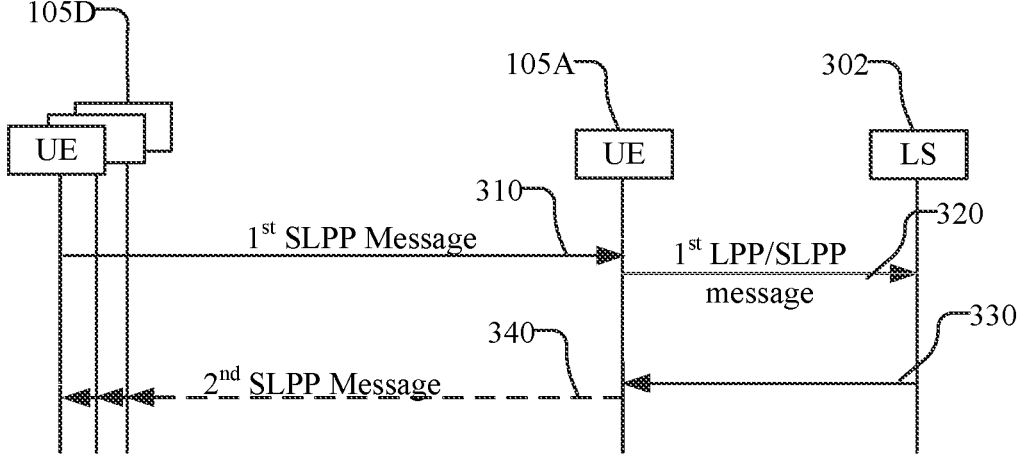
FIG. 3 is a signal flow illustrating signaling between UEs and a location server for network-supported sidelink positioning.

FIG. 3, by way of example, is a signal flow 300 illustrating the signaling between a UE 105A and UEs 105B, 105C, and 105D and a location server 302 for network supported sidelink positioning, as discussed herein. The UEs 105A, 105B, 105C, and 105D, may belong to the same group, and may be, e.g., the UEs 105 illustrated in FIG. 1 or any of the UEs illustrated within network supported subgroups 212 and 214 in FIG. 2. The location server 302 may be any of the LMF 120, SUPL SLP 119, Server 121, or Server 123 shown in FIG. 1 or the LMF1 120a or SUPL SLP1 119a shown in FIG. 2.

As shown in FIG. 3, at 310, the UE 105A receives a first sidelink positioning message from the UE 105B. The first sidelink positioning message, for example, may be an SLPP message, as discussed above, and may be any of the message types discussed above. The first sidelink positioning message may be sent based on SL multicasting (also referred to as SL groupcasting) if the group contains more than two UEs, e.g., as illustrated in FIG. 3, or may be sent based on SL unicasting. With SL multicasting (also referred to as SL groupcasting), a sidelink positioning message (e.g. an SLPP message) may be transmitted containing a group destination address (e.g. which may be partly or completely included in a layer 1 protocol header and/or in a layer 2 protocol header in the sidelink positioning message). A recipient UE (e.g. UE 105A) that belongs to a group which has this group destination address then recognizes the group destination address in the sidelink positioning message and receives, decodes and processes the sidelink positioning message. With SL unicasting, the sidelink positioning message may be transmitted containing a UE destination address (e.g. a layer 2 address assigned to UE 105A) and is received, decoded and processed only by the UE (e.g. UE 105A) whose destination address is included.

In 320, the UE 105A sends a first LPP/SLPP message (e.g., a first SLPP message or the first SLPP message embedded in an LPP message, as previously noted) to the location server 302, where the first SLPP message is based on or comprises the first sidelink positioning message.

In 330, the UE 105A receives a second LPP/SLPP message from the location server 302 in response to the first LPP/SLPP message from 320. The second LPP/SLPP message may be a second SLPP message or the second SLPP message embedded in an LPP message, as discussed above, and may be any of the message types discussed above. The second LPP/SLPP message (e.g. the second SLPP message) may include location results for at least one UE in the group (e.g. UE 105A or UE 105B). For example, location results for at least one UE in the group may comprise at least one of a range between the at least one UE and another UE, a direction from the at least one UE to another UE, a location of the at least one UE relative to the location of another UE, a velocity of the at least one UE, a relative velocity of the at least one UE relative to the velocity of another UE, or some combination of these.

In 340, the UE 105A may send a second sidelink positioning message to one or more of the UEs 105B, 105C, and 105D in the group. The second sidelink positioning message may be an SLPP message and may be based on or may comprise the second SLPP message received at 330. The second sidelink positioning message may be sent based on SL multicasting if the group contains more than two UEs, e.g., as illustrated in FIG. 3.

The sidelink positioning messages in signal flow 300 may be any of the message types as discussed above. For example, the first sidelink positioning message at 310 and the first LPP/SLPP message at 320 may include sidelink positioning capabilities, sidelink positioning resources or both for at least one UE in the group, e.g., UE 105B. The first LPP/SLPP message at 320 may include an LPP Provide Capabilities message and/or an SLPP Provide Capabilities message (e.g. where the SLPP Provide Capabilities message may be embedded in the LPP Provide Capabilities message). The second LPP/SLPP message at 330 and the second sidelink positioning message at 340 may include sidelink positioning capabilities, sidelink positioning resources or both for the UE 105A. The second LPP/SLPP message at 330 may include an LPP Provide Capabilities message and/or an SLPP Provide Capabilities message.

In another example, the first sidelink positioning message at 310 and the first LPP/SLPP message at 320 may include an SL Positioning Reference Signal (PRS) configuration for at least one UE in the group, e.g., UE 105A and/or UE 105B. The first LPP/SLPP message at 320 may include an LPP Request Assistance Data message, an LPP Provide Assistance Data message, an SLPP Request Assistance Data message and/or an SLPP Provide Assistance Data message (e.g. where an SLPP message may be embedded in an LPP message of the same type). The second LPP/SLPP message at 330 and the second sidelink positioning message at 340 may include an SL Positioning Reference Signal (PRS) configuration for at least one UE in the group, e.g., UE 105A or UE 105B. The second LPP/SLPP message at 330 may include an LPP Provide Assistance Data message and/or an SLPP Provide Assistance Data message (e.g. where the SLPP Provide Assistance Data message may be embedded in the LPP Provide Assistance Data message).

In another example, the first sidelink positioning message at 310 and the first LPP/SLPP message at 320 may include sidelink positioning measurements obtained by at least one UE in the group, e.g., UE 105B. The first LPP/SLPP message at 320 may include an LPP Provide Location Information message and/or an SLPP Provide Location Information message (e.g. where the SLPP Provide Location Information message may be embedded in the LPP Provide Location Information message). The second LPP/SLPP message at 330 may include the location results for the at least one UE in the group, where the second LPP/SLPP message includes an LPP Provide Location Information message and/or an SLPP Provide Location Information message (e.g. where the SLPP Provide Location Information message may be embedded in the LPP Provide Location Information message).

The location server 302 may be an LMF or a SUPL SLP. If the location server 302 is a SUPL SLP, the first LPP/SLPP message is sent by the UE 105A to the location server 302 at 320 as part of a first SUPL message, and the second LPP/SLPP message is received by the UE 105A at 330 from the location server 302 as part of a second SUPL message. The first SUPL message and the second SUPL message may each include a SUPL POS message.

Figure 4A:
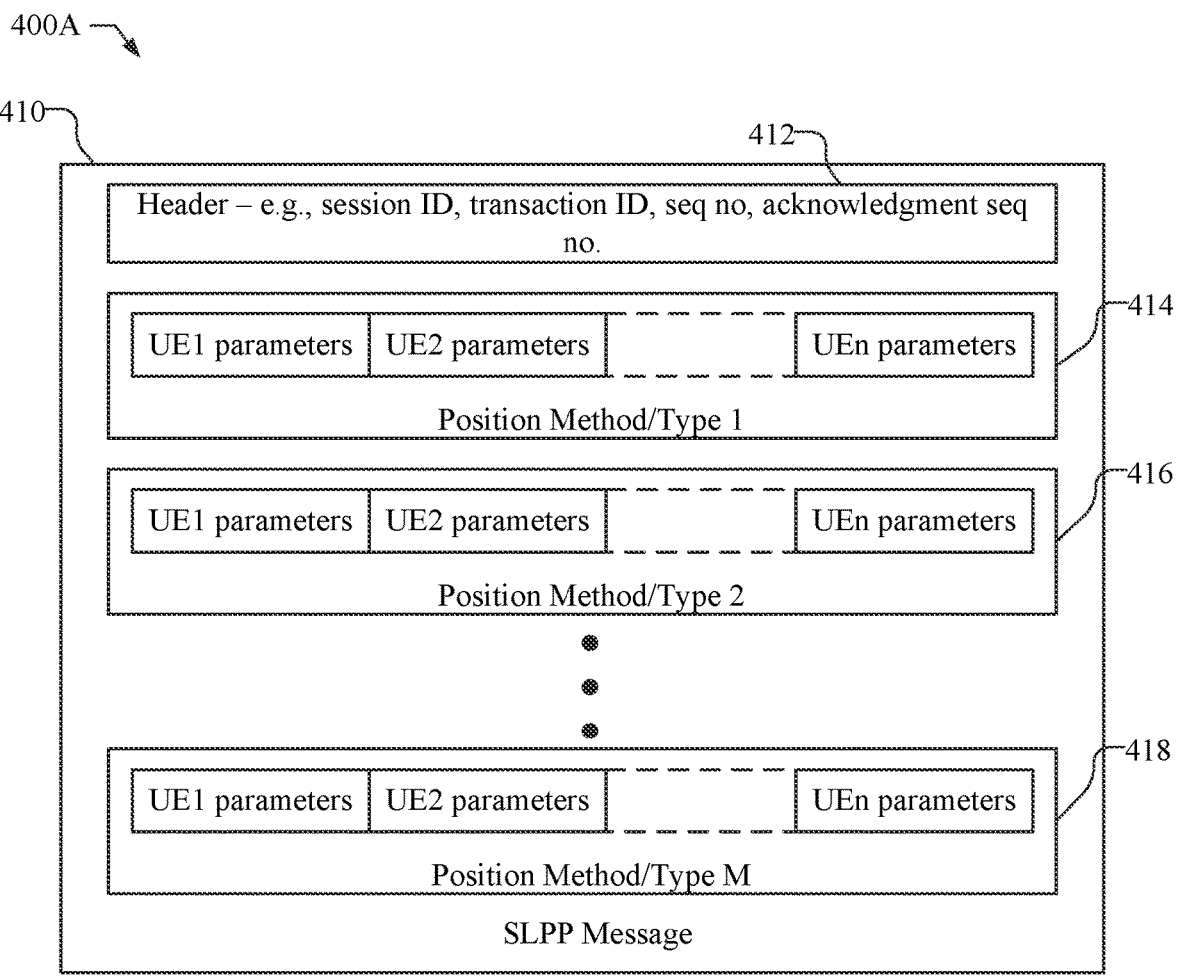
FIGS. 4A and 4B are block diagrams illustrating implementations of the structure of a sidelink positioning protocol (SLPP) message.

FIG. 4A, by way of example, is a block diagram 400A illustrating one implementation of the structure of an SLPP message 410. As illustrated, the SLPP message 410 includes a header 412, which may include a session ID, a transaction ID, a sequence number (seq no), an acknowledge (or acknowledgment) sequence number (acknowledgment seq no), etc. The SLPP message 410 allows for one or more position methods or position method types. For example, the SLPP message 410 includes, as entries, a position method/ type 1 414, a position method/type 2 416, and a position method/type M 418 (e.g. where M could be equal to three or more). A position method, for example, may use a specific signal type or types (e.g., SL NR PRS, SL LTE PRS, Wi-Fi or GPS L1-L5) and supports one method of determining location for that specific signal type (e.g. one of RTT, AOA, RSRP or TDOA). A position method type, on the other hand, uses a specific signal type or types and supports multiple position methods for that signal type or types. For example, a position method type could use SL PRS signals (e.g. either SL NR PRS signals or both SL NR PRS and SL LTE PRS signals) and support multiple position methods that use these SL PRS signals (e.g. could support all of RTT, AOA, RSRP and TDOA). Another position method type could use GNSS signals and support multiple position methods that use GNSS signals (e.g. could support GNSS code phase based positioning and GNSS carrier phase based positioning such as RTK).

Figure 4B:
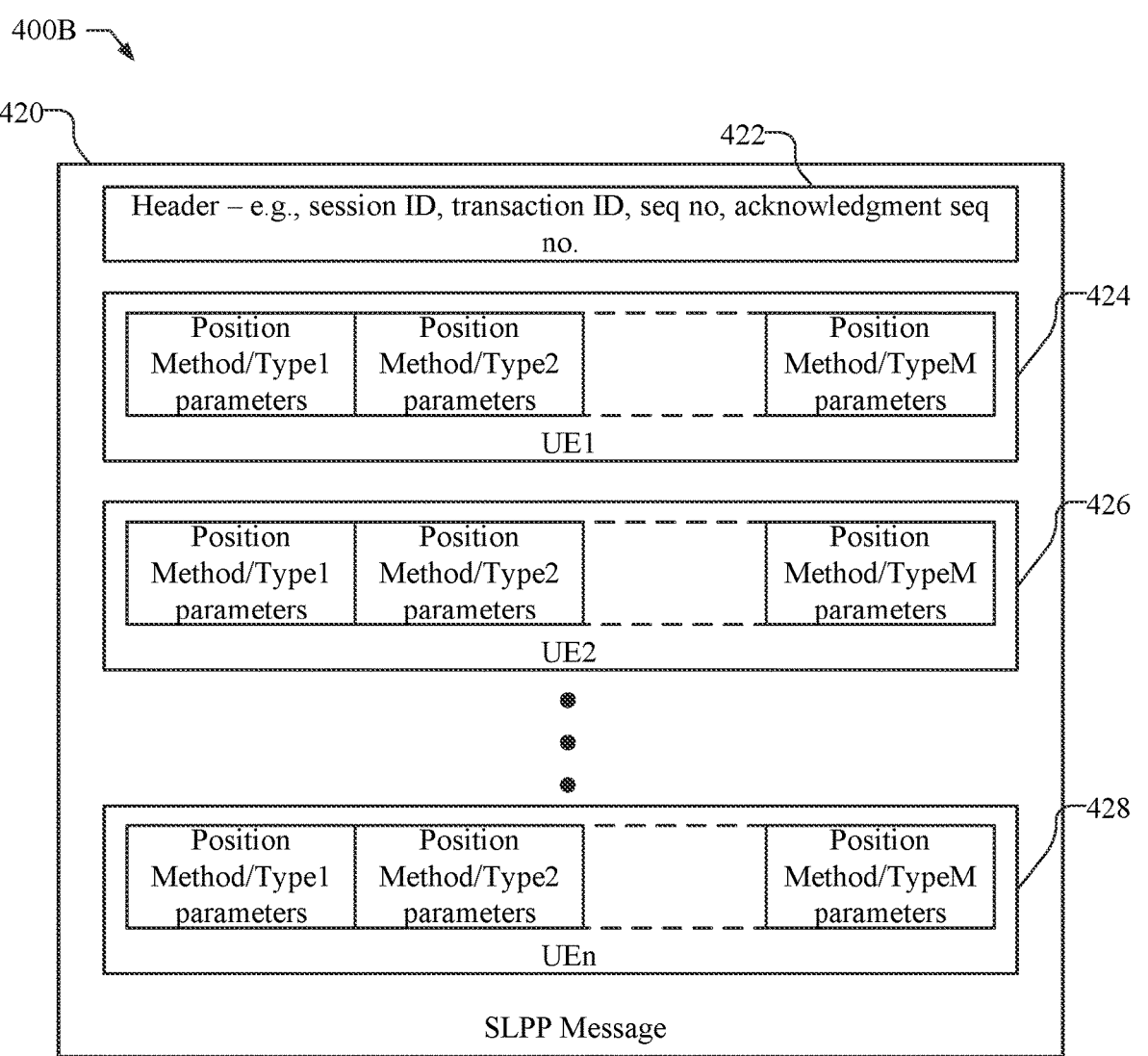

The SLPP message 410 may be configured to support position methods or position method types (also referred to as position types), or both position methods and position method types. As illustrated, each position method/type 414, 416, and 418 in the SLPP message 410 may include parameters for each UE in a group, which are illustrated as being identified by member IDs, e.g. UE1, UE2, . . . UEn. It is possible that not all UEs in a group support the same position methods/types, which could mean that parameters for a UE not supporting a position method/type 414, 416, or 418 might not be present for that position method/type in the SLPP message 410. Support for multiple position methods or position method types in the SLPP message 410 may be advantageous when UEs do not all support the same position methods or same position method types. e.g. where some UEs may support positioning using RTK and SL PRS, while some other UEs only support RTK. In some implementations, however, the SLPP message 410 may provide support for only one position method (e.g. NR SL PRS RTT) or one position method type (e.g., NR SL PRS). FIG. 4B is a block diagram 400B illustrating another implementation of the structure of an SLPP message 420. Similar to the block diagram 400A of FIG. 4A, the SLPP message 420 includes a header 422, which may include similar information to the header 412 in FIG. 4A. Here, however, data may be structured such that each UE in a group of n UEs has a separate message portion 424, 426, and 428 in the SLPP message 420 that each include parameters for that UE for each position method/type 1-M supported by that UE.

The SLPP messages 410 and 420 shown in FIGS. 4A and 4B may include other information at other protocol levels used to transmit (and transport) the SLPP message such as a level 2 address of a UE sending or receiving the SLPP message and/or a level 2 group address for a group of UEs to which the SLPP message is sent by multicast (also referred to as groupcast).

It is noted that the SLPP messages shown in FIGS. 4A and 4B may be used for positioning of UEs. SLPP messages that are not directly used for positioning of UEs but are instead used to manage SLPP sessions (e.g. to start, modify or terminate an SLPP session as described later for FIGS. 11-18) may include other parameters such as IDs and addresses for UEs participating in an SLPP session and may not include parameters for SL position methods and position method types as shown in FIGS. 4A and 4B. However, such "non-positioning" SLPP messages may still include the header 412 shown in FIGS. 4A and 4B.

Figure 5:
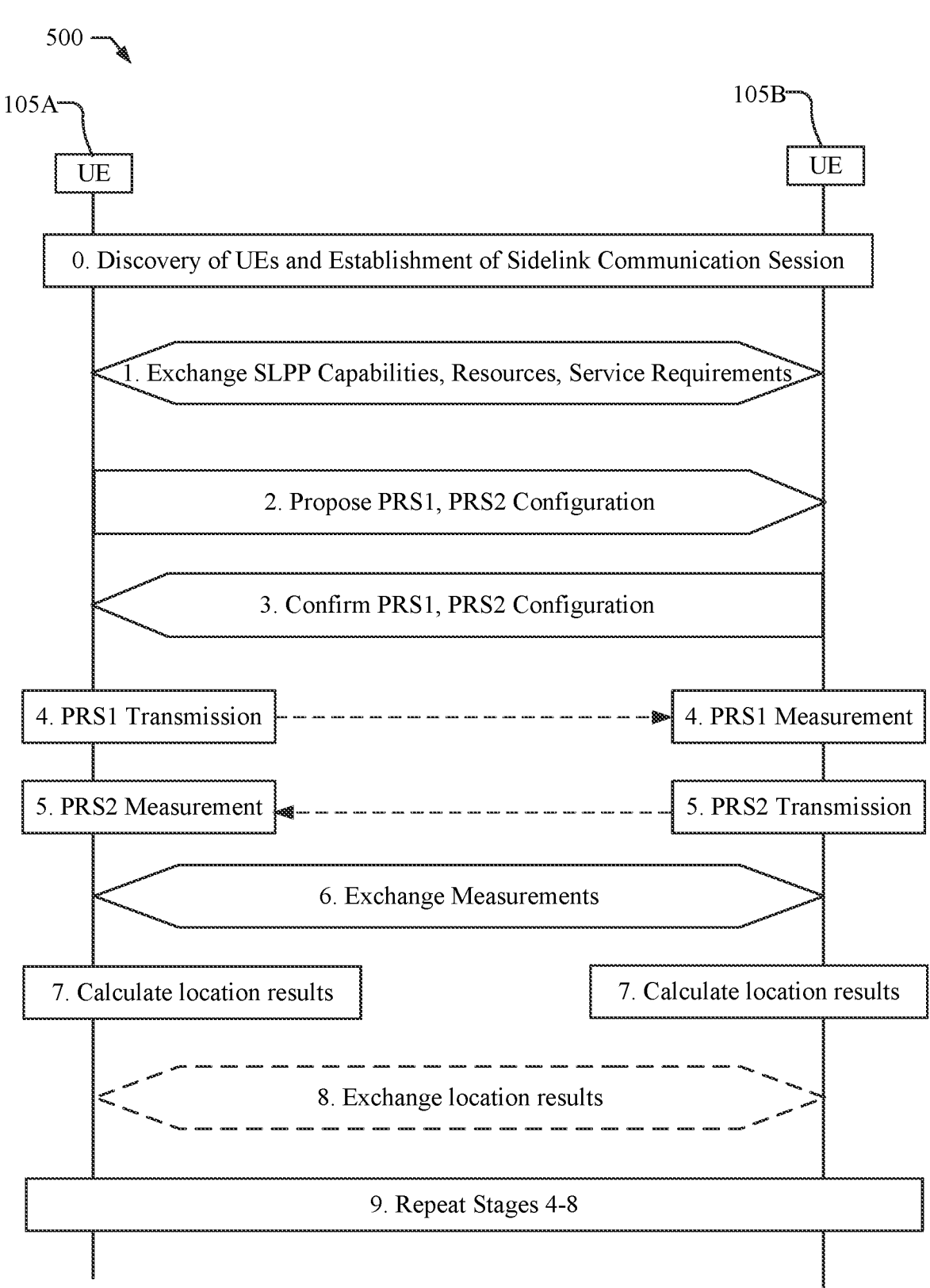
FIG. 5 is a signal flow illustrating the signaling between a pair of UEs for pairwise sidelink positioning.

FIG. 5 by way of example, is a signal flow 500 illustrating the signaling between UE 105A and UE 105B for pairwise sidelink positioning involving just two UEs. The UE 105A and UE 105B, for example, may be, e.g., the UEs illustrated in FIG. 1 or any two of the UEs illustrated in group 210 shown in FIG. 2. The sidelink positioning illustrated in FIG. 5 can be independent of a network and thus, the UEs shown in FIG. 5 may be the out-of-coverage UEs in subgroup 216. The signaling performed in signal flow 500 may be similar to or the same as the SLPP signaling discussed above in reference to FIG. 2. The signal flow 500 illustrates a simple type of SLPP session between UE 105A and UE 105B in which there may or may not be explicit session establishment and session termination.

At stage 0 of FIG. 5, the discovery of UEs and establishment of a sidelink communication session or sidelink positioning session may be performed. The discovery process may be request-response or announcement based. The discovery phase, for example, may be implemented by one or both of UEs 105A and 105B to detect other UEs that are available for sidelink positioning. For example, discovery messages may be exchanged between UE 105A and/or UE 105B to determine nearby UEs that are available to participate in sidelink positioning. For example, UE 105A may broadcast a discovery based message using sidelink signaling which UE 105B may receive and respond to by transmitting a similar discovery based response message back to UE 105A using sidelink signaling. Additional messages may be exchanged between UE 105A and UE 105B to explicitly establish a sidelink communication or positioning session between UEs 105A and 105B. For example, UE 105A may send a request (e.g. an SLPP request) to UE 105B to start an SLPP positioning session and UE 105B may return a response (e.g. an SLPP response) to UE 105A agreeing to start the SLPP positioning session.

At stage 1, the UEs 105A and 105B may exchange SLPP capabilities, resources and service requirements, which may include Quality of Service (QoS), for example, using SLPP Request Capabilities and Resources and SLPP Provide Capabilities and Resources messages as discussed above. Exchanging SLPP capabilities, resources and service requirements may include both of UE 105A and UE 105B sending their capabilities, resources and service requirements to the other UE or just one of UE 105A or UE 105B sending its capabilities, resources and service requirements to the other UE. The capabilities that are exchanged may define what each of the UEs 105A and 105B is implemented to support. The resources that are exchanged may define what capabilities each of the UEs 105A and 105B is permitted to support, and/or what capabilities each of the UEs 105A and 105B is not permitted to support, or both. The sidelink positioning capabilities that a UE is permitted to support or not permitted to support may include permission or restrictions on one or more of a sidelink PRS transmission time, sidelink PRS measurement time, sidelink PRS transmission duration, sidelink PRS measurement duration, bandwidth of sidelink PRS that can be transmitted, bandwidth of sidelink PRS that can be measured, RF frequency of sidelink PRS that can be transmitted, RF frequency of sidelink PRS that can be measured, signal coding of sidelink PRS that can be transmitted, signal coding of sidelink PRS that can be measured, periodicity of sidelink PRS transmissions, periodicity of sidelink PRS that is measured, transmission power for sidelink PRS transmission, transmission power for sidelink PRS that is measured, or any combination thereof.

Sidelink positioning capabilities may be fixed and static (e.g. dependent on UE implementation which may never change or may be changed infrequently via a software upgrade to the UE). Sidelink positioning resources may depend on available spectrum for SL PRS (e.g. whether PLMN licensed spectrum, unlicensed spectrum or Intelligent Transportation System (ITS) spectrum for V2X is available and permitted to be used) and/or on pre-existing positioning sessions and/or positioning procedures that a UE may already be supporting or part of. The pre-existing positioning sessions and/or positioning procedures may mean that a UE is not able to transmit and/or measure SL PRS at certain times for a new SL positioning session because at these times the UE needs to be transmitting and/or measuring SL PRS for the pre-existing positioning sessions and/or positioning procedures. Similarly, certain SL PRS characteristics like frequency or coding that are already in use for the pre-existing positioning sessions may not be available to be used for the new SL (or SLPP) positioning session. For example, usage of certain SL PRS characteristics for a new positioning sessions that are already in use for the pre-existing positioning sessions might prevent SL PRS transmissions for the new positioning session or pre-existing positioning sessions from being uniquely identified by UEs involved in the new positioning session or pre-existing positioning sessions which could then cause errors in location measurements and location results. Controlling the usage of SL PRS characteristics for a new positioning session by exchanging sidelink positioning resources that are allowed and/or not allowed may prevent such errors from occurring.

The service requirements that are exchanged at stage 1 may include an indication of at least one of an immediate (e.g. single) location at a current time, a deferred location (e.g. at a later time), a periodic location, a triggered location, a type or types of location result (e.g. relative location, global location, range, direction), a QoS of location results (e.g. location result accuracy, location result response time or latency, location periodicity, location reliability), or some combination of these. The service requirements that are exchanged may define the type(s) of location (e.g., single or periodic), accuracy, latency, periodicity, reliability that each UE requires or expects in the sidelink positioning session.

At stage 2, the UE 105A may send to UE 105B a proposed sidelink positioning signal configuration, e.g., PRS1, PRS2 configuration, e.g., using an SLPP Provide Positioning Signal Configuration message or SLPP Provide Assistance Data message, as discussed above. The PRS1 configuration (in this example) may define SL PRS to be transmitted later by UE 105A, while the PRS2 configuration (in this example) may define SL PRS to be transmitted later by UE 105B, The PRS1 and PRS2 configurations, for example, may be defined and proposed by UE 105A based on the capabilities, resources and service requirements exchanged at stage 1 which may include QoS of UE 105A and 105B. The PRS1 and PRS2 configurations, for example, may be the same as or similar to PRS configurations defined in 3GPP TS 37.355 for LPP except that they may refer to SL PRS transmission on a sidelink communication channel between UEs 105A and 105B. For example, the PRS1 and PRS2 configurations may each include specifications of SL PRS transmission starting time, SL PRS transmission duration, SL PRS bandwidth, SL PRS RF frequency (or frequencies), SL PRS signal coding, SL PRS transmission periodicity, SL PRS transmission power, SL PRS muting and/or SL PRS frequency hopping. Rules and guidelines may be standardized to ensure that the proposed PRS configurations PRS1 and PRS2 are compatible with the capabilities, resources and service requirement of UEs 105A and 105B, which may include QoS of both UEs.

At stage 3, the UE 105B may send a message to the UE 105A to confirm the proposed positioning signal configuration, e.g., the PRS1, PRS2 configurations, e.g., using an SLPP Confirm Positioning Signal Configuration or SLPP Provide Assistance Data Confirm, as discussed above. In some implementations, the UE 105B may instead reject the proposed positioning signal configuration at stage 3 and UE 105A may then propose a different positioning signal configuration until the UE 105A confirms the positioning signal configuration. In some implementations, the UE 105B may send to the UE 105A a modified proposed positioning signal configuration and the UE 105A may confirm the modified positioning signal configuration or may send another modified proposed positioning signal configuration to UE 105B. In some implementations, stage 3 may be omitted when the PRS1, PRS2 configurations sent at stage 2 are acceptable to UE 105B, which may reduce signaling.

At stage 4, the UE 105A transmits SL positioning signals corresponding to the PRS1 configuration and the UE 105B measures these positioning signals (e.g. based on UE 105B already knowing the PRS1 configuration). The UE 105B, for example, may measure one or more of a receive time-transmission time difference (Rx-Tx), a round trip signal propagation time (RTT), a reference signal received power (RSRP), a reference signal received quality (RSRQ), an angle of arrival (AOA), and a time of arrival (TOA) of the PRS1 transmitted by UE 105A.

At stage 5, the UE 105B transmits SL positioning signals corresponding to the PRS2 configuration and the UE 105A measures these positioning signals (e.g. based on UE 105A already knowing the PRS2 configuration). The UE 105A, for example, may measure one or more of an RTT, Rx-Tx, RSRP, RSRQ, AOA, AOD, and TOA of the PRS2 transmitted by UE 105B.

At stage 6, the UE 105A and UE 105B exchange measurements obtained at stage 4 and stage 5. The exchange of measurements, for example, may indicate a revised SL PRS configuration used at stage 4 or stage 5 for transmission of SL PRS if there was any difference to the PRS1 and/or PRS2 configuration (e.g. concerning an exact time or duration of SL PRS transmission) and may further provide the measurements generated at stage 4 or stage 5. As an example, if the SL positioning signals (SL PRS) transmitted by UE 105A at stage 4 corresponding to the PRS1 configuration sent by UE 105A at stage 2 do not exactly match the PRS1 configuration (e.g. because UE 105A slightly delayed the SL PRS transmission because some other UE was transmitting at the transmission time(s) indicated in the PRS1 configuration), then UE 105A may include in the revised SL PRS configuration sent by UE 105A at stage 6, the correct transmission time(s) actually used by UE 105A at stage 4. The UE 105B may then use the correct transmission time(s) for UE 105A received in the revised SL PRS configuration at stage 6 at a later time when calculating any location results (e.g. at stage 7). Exchanging measurements at stage 6 may include both of UE 105A and UE 105B sending their measurements and/or revised SL PRS configurations to the other UE or just one of UE 105A or UE 105B sending its measurements and/or revised SL PRS configuration to the other UE.

At stage 7, the UE 105A and UE 105B may each calculate location results, e.g., range and/or direction between UE 105A and 105B, relative locations, absolute locations, velocities, relative velocities, or any combination thereof, based on the measurements generated at stages 4 and 5 and received (or sent) at stage 6 and/or the revised SL PRS configurations received (or sent) at stage 6. For example, the UEs may determine a range between UE 105A and UE 105B based on Rx-Tx measurements of the PRS signals or based on equivalent TODi and TOAi measurements for the PRSi signals (where i=1 for PRS transmitted by UE 105A in stage 4 and i=2 for PRS transmitted by UE 105B in stage 5, and c represents the speed of transmission of an electromagnetic wave, e.g., speed of light) as:

$$Range = \left| \frac{(TOA_2 - TOD_1) + (TOA_1 - TOD_2)}{2c} \right| \qquad \text{Eq. 1}$$

The location result(s) determined at stage 7 may then be exchanged, at stage 8. Exchanging location results at stage 8 may include both of UE 105A and UE 105B sending their location results to the other UE or just one of UE 105A or UE 105B sending its location results to the other UE. In the latter case, just the UE which sends its location results to the other UE may calculate its location results at stage 7.

As illustrated in stage 9, stages 4-8 may be repeated as desired by UE 105A and UE 105B. For example, stages 4-8 may be repeated at stage 9 to enable periodic or triggered location results for UE 105A and UE 105B.

Figure 6A:
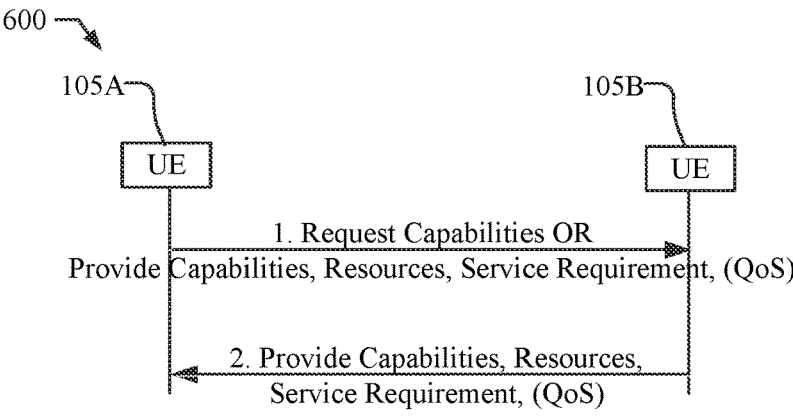
FIG. 6A is a signal flow illustrating the signaling between UEs for a sidelink positioning capabilities exchange, including the exchange of capabilities, resources, and service requirements.

FIG. 6A is a signal flow 600 illustrating the signaling between UE 105A and UE 105B for a sidelink positioning capabilities exchange, including the exchange of capabilities, resources, and service requirements, which may include QoS, which may correspond to stage 1 of FIG. 5. As illustrated in signal flow 600, at stage 1, the UE 105A may send to the UE 105B a (e.g. SLPP) Request Capabilities message, a (e.g. SLPP) Provide Capabilities message or a (e.g. SLPP) Provide Capabilities, Resources, and Service Requirements message, which may include QoS. At stage 2, and in response to the Request Capabilities, the Provide Capabilities or the Provide Capabilities, Resources, and Service Requirements message, the UE 105B may send a (e.g. SLPP) Provide Capabilities message or a (e.g. SLPP) Provide Capabilities, Resources, and Service Requirements message, which may include QoS, to the UE 105A.

Figure 6B:
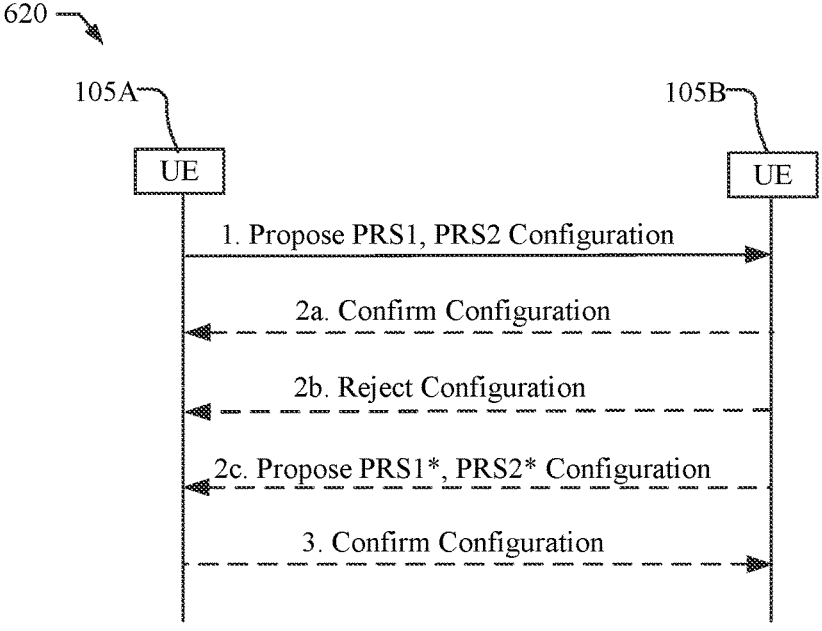
FIG. 6B is a signal flow illustrating the signaling between UEs for a positioning signal configuration and confirmation exchange.

FIG. 6B is a signal flow 620 illustrating the signaling between UE 105A and UE 105B for a positioning signal configuration and confirmation exchange and may correspond to stages 2 and 3 of FIG. 5. As illustrated, at stage 1 of signal flow 620, the UE 105A sends to UE 105B a proposed positioning signal configuration, e.g., PRS1, PRS2 configuration, which corresponds to stage 2 of FIG. 5 and may be included in an SLPP Provide Assistance Data message or an SLPP Provide Positioning Signal Configuration message. At stage 2a, the UE 105B may send to UE 105A a confirm configuration message, which corresponds to stage 3 of FIG. 5 and may be an SLPP Confirm Positioning Signal Configuration message or an SLPP Provide Assistance Data Confirm message. Alternatively, at stage 2b, the UE 105B may send to UE 105A a reject configuration message which may be an SLPP Reject Positioning Signal Configuration message or an SLPP Provide Assistance Data Reject message. In response to the reject configuration message from stage 2b, the UE 105A may prepare another positioning signal configuration and stages 1 and 2a or 2b are repeated. In another implementation, at stage 2c, the UE 105B may send to UE 105A a modified positioning signal configuration, e.g., with proposed modified PRS1*, PRS2* configurations, which may be included in an SLPP Provide Assistance Data message or an SLPP Provide Positioning Signal Configuration message. In response to stage 2c, the UE 105A may send a confirm configuration message to UE 105B at stage 3, which may be an SLPP Confirm Positioning Signal Configuration message or an SLPP Provide Assistance Data Confirm message. Alternatively, the UE 105A may further modify the positioning signal configuration by repeating stages 1 and 2a or 2b.

Figure 6C:
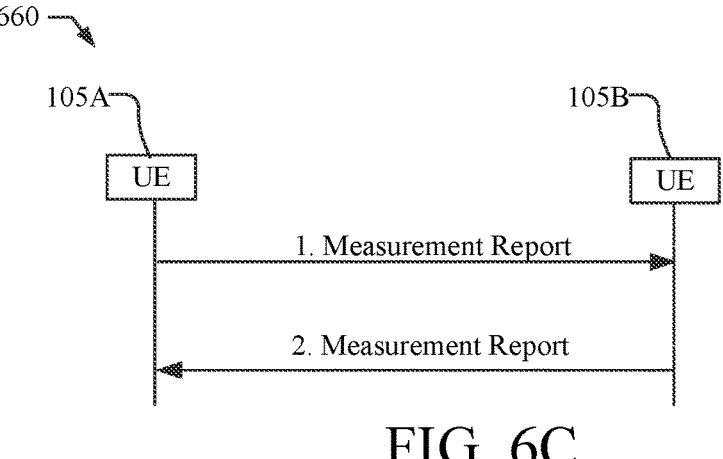
FIG. 6C is a signal flow illustrating the signaling between UEs for a measurement exchange.

FIG. 6C is a signal flow 660 illustrating the signaling between UE 105A and UE 105B for a measurement exchange, and may correspond to stage 6 of FIG. 5. As illustrated in signal flow 660, at stage 1, the UE 105A may send to the UE 105B a measurement report, which may include information related to the PRS transmitted by the UE 105A at stage 4 of FIG. 5, such as an exact time or times of transmission, etc. and may further include measurements generated by the UE 105A of the PRS transmitted by the UE 105B at stage 5 of FIG. 5. The measurement report for stage 1 may be an SLPP Provide Location Information message.

Similarly, at stage 2, the UE 105B may send to the UE 105A a measurement report, which may include information related to the PRS transmitted by the UE 105B at stage 5 of FIG. 5, such as an exact time or times of transmission, etc. and may further include measurements generated by the UE 105B of the PRS transmitted by the UE 105A at stage 4 of FIG. 5. The measurement report for stage 2 may be an SLPP Provide Location Information message.

Thus, as discussed for stage 1 of FIG. 5, as well as discussed for stage 1 shown in FIG. 6A, a sidelink positioning message sent by the UE 105A may include sidelink positioning capabilities and sidelink positioning resources of the UE 105A. The sidelink positioning message may further include the sidelink positioning Service Requirement of the UE 105A as discussed for stage 1 of FIG. 5 and FIG. 6A.

Moreover, the UE 105A may receive a second sidelink positioning message from the UE 105B. For example, as discussed for stage 1 of FIG. 5, as well as discussed for stage 2 shown in FIG. 6A, the second sidelink positioning message received from UE 105B may include the sidelink positioning capabilities and sidelink positioning resources of UE 105B. The second sidelink positioning message received from UE 105B may further include the sidelink positioning Service Requirement of UE 105B as discussed for stage 1 of FIG. 5 and stage 2 of FIG. 6A.

As illustrated for stages 2-8 of FIG. 5, the UE 105A may exchange additional sidelink positioning messages with UE 105B, which may be based on the sidelink positioning capabilities and the sidelink positioning resources of UE 105B. Each of the additional sidelink positioning messages may be further based on the sidelink positioning Service Requirement of the UE 105B. For example, as discussed for stages 2-8 of FIG. 5, as well as discussed in signal flows 620 and 660 of FIGS. 6B and 6C, the additional sidelink positioning messages exchanged with UE 105B may include proposed positioning signal configurations, confirmation (or rejection or modification) of the proposed positioning signal configurations, requests for measurements and/or measurements of sidelink positioning PRS and location results determined from the measurements of sidelink positioning PRS.

As illustrated by stage 7 of FIG. 5, the UE 105A may determine the location of the UE 105B based on the additional sidelink positioning messages.

The pairwise sidelink positioning illustrated in FIGS. 5, 6A, 6B, and 6C may be expanded and extended for group operation, e.g., with a group of UEs, e.g., as illustrated by the UE group 210 in FIG. 2. The group of UEs, for example, may be sufficiently small that direct discovery and direct sidelink signaling are possible between UEs in the group of UEs. Various sidelink positioning messages sent by the UEs in the group may be transmitted using groupcast or multicast so that each sidelink positioning message is broadcast once using sidelink signaling to all recipient UEs.

Figure 7:
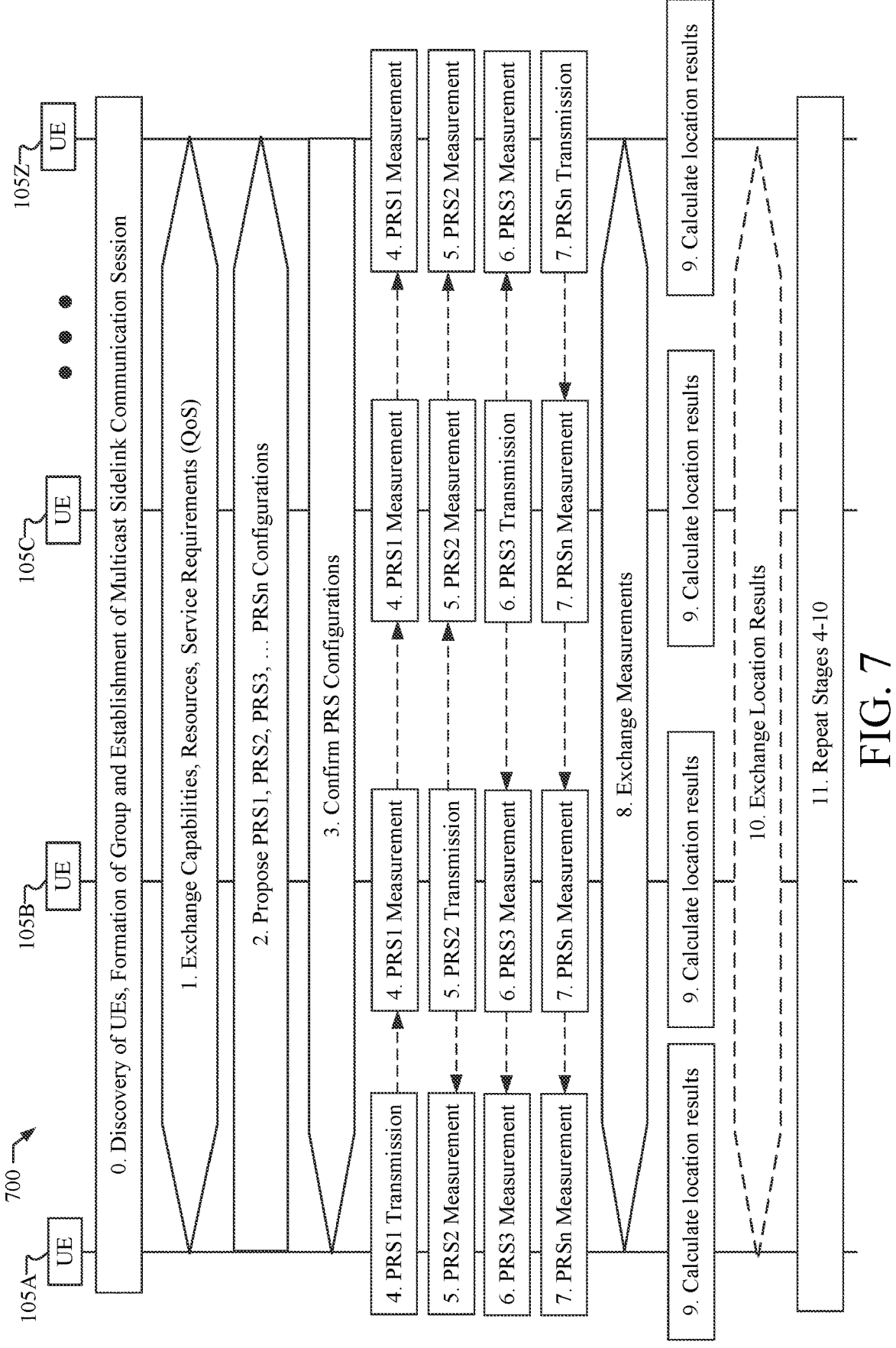
FIG. 7 is a signal flow illustrating the signaling for group operation of sidelink positioning for a plurality of UEs.

FIG. 7 by way of example, shows a signal flow 700 illustrating the signaling for group operation of sidelink positioning for a plurality of UEs, illustrated as UE 105A, 105B, 105C, . . . 105Z, sometimes collectively referred to as UEs 105. The group of UEs 105 may comprise a small number of UEs (e.g., up to 20) for which direct discovery and direct SL signaling are possible. The UEs 105, for example, may be, e.g., the UEs illustrated in FIG. 1 or any of the UEs illustrated in group 210 shown in FIG. 2. The sidelink positioning illustrated in FIG. 7 is independent of a network and thus, the UEs shown in FIG. 7 may be the out of coverage UEs in subgroup 216 in FIG. 2. The signaling performed in signal flow 700 may be similar to or the same as the SLPP signaling discussed above in reference to FIG. 2 and as illustrated in signal flow 500 in FIG. 5, except that the SLPP signaling can involve a larger number of UEs. If desired, the signaling may be performed directly, as illustrated or via relays and/or via a network. It is noted that the number of UEs in signal flow 700 is typically more than two though in a limiting case might be two (in which case two of the UEs shown in FIG. 7 are not present).

The signal flow 700 illustrates a simple type of SLPP session between the UEs 105 in which there may or may not be explicit session establishment and session termination. When the signal flow 700 is performed with explicit session establishment and session termination, stages 1-11 of FIG. 7 could be performed as part of signal flow 1100 described later for FIG. 11 where stages 1-11 of FIG. 7 replace stages 9-13 in FIG. 11.

At stage 0 of FIG. 7, discovery of UEs 105, formation of the group, and establishment of a multicast sidelink communication session is performed. The discovery process may be request-response or announcement based. The discovery phase, for example, may be implemented by one or more UEs 105 to detect other UEs 105 that are available for sidelink positioning and are suitable for joining the group. For example, discovery messages may be exchanged between the UEs 105 to determine nearby UEs 105 that are available to participate in sidelink positioning. For example, UE 105A may broadcast a discovery based message using sidelink signaling which UEs 105B, 105C and 105Z may each receive and respond to by each transmitting a similar discovery based response message back to UE 105A using sidelink signaling. The UEs 105 may also exchange (or may be pre-configured with) one or more group criteria parameters for group formation, such as an approximate maximum distance between pairs of UEs (to help ensure UEs 105 can communicate directly with one another), a minimum period of time that any UE 105 is likely to be in communication with other UEs 105 (to help ensure that UEs 105 can communicate directly with one another for some minimum time period), and/or a common direction and/or common range of speed of the UEs 105 (to help ensure that UEs 105 will remain nearby to one another). Based on the group criteria parameters, the UEs 105 may determine whether to form a group, which UEs 105 should or should not belong to the group or whether and when to add additional UEs 105 later to the group and/or to remove an existing UEs 105 from the group. For example, the UEs 105 may determine a group status indication for each UE 105 indicating inclusion in the group or exclusion from the group. In FIG. 7, for example, it is assumed that all UEs 105A, 105B, 105C, . . . 105Z meet the one or more group criteria and are included in the group. Additional messages may be exchanged between the UEs 105 to explicitly establish a sidelink communication or positioning session between the UEs 105. For example, UE 105A may multicast a single request (e.g. an SLPP request) to UEs 105B, 105C and 105Z to start an SLPP positioning session and UEs 105B, 105C and 105Z may each return a response (e.g. an SLPP response) to UE 105A agreeing to start the SLPP positioning session.

At stage 1, the UEs 105 may exchange SLPP capabilities, resources, and service requirements, which may include QoS, for example, using SLPP Request Capabilities and Resources and SLPP Provide Capabilities and Resources messages as discussed above. The exchange of capabilities, resources, and service requirements, which may include QoS, may be similar to the signal flow 600 illustrated in FIG. 6A, but with additional UEs. For example, the UEs 105 may initially exchange capabilities by each sending a single groupcast SLPP message from each UE 105 to all the other UEs 105. The capabilities that are exchanged may define what each of the UEs 105 is implemented to support. The resources that are exchanged may define what capabilities each of the UEs 105 is permitted to support and/or is not permitted to support. The sidelink positioning capabilities that a UE 105 is permitted to support or not permitted to support may include permission or restrictions on one or more of a sidelink PRS transmission time, sidelink PRS measurement time, sidelink PRS transmission duration, sidelink PRS measurement duration, bandwidth of sidelink PRS that can be transmitted, bandwidth of sidelink PRS that can be measured, RF frequency of sidelink PRS that can be transmitted, RF frequency of sidelink PRS that can be measured, signal coding of sidelink PRS that can be transmitted, signal coding of sidelink PRS that can be measured, periodicity of sidelink PRS transmissions, periodicity of sidelink PRS that is measured, transmission power for sidelink PRS transmission, transmission power for sidelink PRS that is measured, or any combination thereof. Sidelink positioning capabilities may be fixed and static as discussed for stage 1 of FIG. 5. Sidelink positioning resources may depend on available spectrum for SL PRS and/or on preexisting positioning sessions and/or positioning procedures that a UE 105 may already be supporting or part of as discussed for stage 1 of FIG. 5. The service requirements of each of the UEs 105 may be as described for stage 1 of FIG. 5.

At stage 2, the UE 105A may send to the other UEs 105 a proposed positioning signal configuration, e.g., PRS1, PRS2, PRS3, . . . PRSn configuration, e.g., using an SLPP Provide Positioning Signal Configuration message or SLPP Provide Assistance Data message, as discussed above. The PRS1 configuration (in this example) may define SL PRS to be transmitted later by UE 105A, the PRS2 configuration (in this example) may define SL PRS to be transmitted later by UE 105B, the PRS3 configuration (in this example) may define SL PRS to be transmitted later by UE 105C, and the PRSn configuration (in this example) may define SL PRS to be transmitted later by UE 105Z, The PRS1, PRS2, PRS3 and PRSn configurations, for example, may be defined and proposed by UE 105A based on the capabilities, resources and service requirements exchanged at stage 1 which may include QoS of each of the UEs 105. The PRS1, PRS2, PRS3 and PRSn configurations, for example, may each be as described for PRS1 and PRS2 for stage 2 of FIG. 5.

At stage 3, each of the UEs 105B, 105C, . . . 105Z may send a message to the UE 105A to confirm the proposed positioning signal configuration, e.g., the PRS1, PRS2, PRS3, . . . PRSn configurations, e.g., using an SLPP Confirm Positioning Signal Configuration or SLPP Provide Assistance Data Confirm, as discussed above. In some implementations, a UE 105 (e.g. UE 105B) may instead reject the proposed positioning signal configuration at stage 3 and may further indicate which PRS configuration(s) are being rejected. and UE 105A may then propose a different positioning signal configuration (or just different PRS configurations for the PRS configuration(s) which are being rejected) until each of the other UEs 105 confirms the positioning signal configuration. In some implementations, a UE 105 (e.g. UE 105B) may send to the UE 105A and to other UEs 105 in the group a modified proposed positioning signal configuration and the UE 105A and the other UEs 105 may confirm the modified positioning signal configuration or may send another modified proposed positioning signal configuration to other UEs 105. In some implementations, stage 3 may be omitted when the PRS1, PRS2. PRS3, . . . PRSn configurations sent at stage 2 are acceptable to each of the UEs 105B, 105C, . . . 105Z which may reduce signaling.

At stage 4, the UE 105A transmits SL positioning signals corresponding to the PRS1 configuration and UEs 105B, 105C, . . . 105Z each measure these positioning signals (e.g. based on UE 105B, UE 105C, . . . UE 105Z already each knowing the PRS1 configuration). The UEs 105B, 105C, . . . 105Z, for example, may each measure one or more of a reference signal time difference (RSTD), RTT, Rx-Tx, RSRP, RSRQ, AOA, AOD, TOA of the PRS1 transmitted by UE 105A.

At stage 5, the UE 105B transmits positioning signals PRS2 and the remaining UEs 105 each measure the positioning signals PRS2, similar to PRS1 measurement at stage 4.

At stage 6, the UE 105C transmits positioning signals PRS3 and the remaining UEs 105 measure the positioning signals PRS3, similar to PRS1 measurement at stage 4.

At stage 7, the UE 105Z transmits positioning signals PRSn and the remaining UEs 105 measure the positioning signals PRSn. similar to PRS1 measurement at stage 4.

At stage 8, the UEs 105 exchange measurements. The exchange of measurements may be similar to the signal flow 660 illustrated in FIG. 6C, but with additional UEs, and with the measurements, for example, exchanged via a single groupcast SLPP message sent by each UE 105 to all the other UEs 105 in the group. The exchange of measurements, for example, may indicate a revised SL PRS configuration used by a UE 105 for transmission of SL PRS (e.g. as discussed for stage 6 of FIG. 5), and may further provide the measurements obtained by the UE 105—e.g. at one of stages 4, 5, 6 or 7.

At stage 9, each UE 105 may determine location results, e.g., range and/or direction between the UE 105 and each of one or more other UEs 105 in the group, relative locations of one or more of the UEs 105, absolute locations, velocities, relative velocities, or any combination thereof, based on the measurements generated at stages 4-7 and received (or sent) at stage 8 and/or the revised SL PRS configurations received (or sent) at stage 8. In some embodiments, only one UE 105 (e.g. UE 105A) or a subset of the UEs 105 may determine location results.

The location result(s) determined at stage 9 may then be exchanged, at stage 10. Exchanging location results at stage 10 may include each of UEs 105A, 105B, 105C . . . 195Z sending its location results to all the other UEs 105 in the group, or just one UE 105 (e.g. UE 105A) or a subset of the UEs 105 sending location results to the other UEs 105. In the latter case, just the UE 105 (or the subset of UEs 105) which sends its location results to the other UEs 105 may calculate location results at stage 9.

As illustrated at stage 11, stages 4-10 may be repeated as desired by the UEs 105. For example, stages 4-10 may be repeated at stage 11 to enable periodic or triggered location results for the UEs 105 to be obtained.

Thus, as shown in FIG. 7 when a UE 105, such as UE 105A, belongs to a group of UEs that contains two or more UEs, the UE 105A may send a sidelink positioning message to all other UEs in the group of UEs, e.g., UEs 105B, 105C, . . . 105Z, e.g., based on sidelink multicasting, so that the sidelink positioning message is broadcast or multicast once using SL signaling to all recipients UEs. For example, as discussed in stage 1 of FIG. 7, as well as discussed in stage 1 shown in FIG. 6A, the sidelink positioning message sent by the UE 105A may include sidelink positioning capabilities and sidelink positioning resources of the UE 105A. The sidelink positioning message may further include the sidelink positioning Service Requirement of the UE 105A as discussed in stage 1 of FIG. 7 and FIG. 6A.

Moreover, as further discussed in stage 1 of FIG. 7, the UE 105A may receive a second sidelink positioning message from each of the other UEs in the group of UEs, e.g., UEs 105B, 105C, . . . 105Z, e.g., based on sidelink multicasting. For example, as discussed in stage 1 of FIG. 7, as well as discussed in stage 2 shown in FIG. 6A, the second sidelink positioning message received from each of the other UEs may include sidelink positioning capabilities and sidelink positioning resources of the each UE. The second sidelink positioning message received from each UE may further include the sidelink positioning Service Requirement of the each UE as discussed in stage 1 of FIG. 7 and FIG. 6A.

As illustrated by stages 2-8 of stage 7, the UE 105A may exchange additional sidelink positioning messages with at least some UEs in the group of UEs, e.g., UEs 105B, 105C, . . . 105Z, e.g., based on sidelink multicasting. The additional sidelink positioning messages, for example, may be based on the sidelink positioning capabilities and the sidelink positioning resources of each of the at least some UEs. Each of the additional sidelink positioning messages may be further based on the sidelink positioning Service Requirements of each UE 105. For example, as discussed in stages 2-8 of FIG. 7, as well as discussed in signal flows 620 and 660 of FIGS. 6B and 6C, the additional sidelink positioning messages exchanged with at least some UEs may include proposed positioning signal configurations, may confirm (or reject or modify) the proposed positioning signal configurations, and/or may request measurements or provide measurements of SL PRS.

As illustrated by stage 9, the UE 105A may determine location results regarding the at least some of the UEs based on the additional sidelink positioning messages.

For group operation of sidelink positioning, such as illustrated in FIG. 7, the group of UEs should be initially determined and optionally formed, e.g., based on one or more criteria. Moreover, modification of the group of UEs may be necessary as UEs leave or enter the group area.

Group determination and formation for sidelink positioning may use Proximity-based Services (ProSe) or V2X services, e.g., for discovery and establishment of the group as illustrated in stage 0 of FIGS. 5 and 7. Various criteria may be used for including UEs in the same group. For example, for inclusion within a group, one criteria may be the ability for discovery via ProSe or V2X and the ability to communicate directly (via sidelink signaling) with other UEs in the group. Other criteria may include a maximum distance restriction, e.g., exclude from the group any UEs that are generally more distant from other UEs in the group than a maximum distance threshold; a time restriction, e.g., exclude from the group any UEs that are (or are likely to be) in communication with other UEs in the group for less than a minimum time duration threshold; and a direction or speed restriction, e.g., exclude from the group any UEs that are moving in a different direction than other UEs in the group or are moving at a speed that differs from the speeds of other UEs in the group by more than a maximum speed difference threshold. The criteria, e.g., thresholds to determine whether a UE meets various requirements to join the group, may be dependent on an environment and application. By way of example, the distance, time, and direction or speed criteria used in group formation for V2X highway, V2X local road, or V2X carpark applications may differ. Once a group is established, periodic ProSe or periodic V2X signaling may be used to determine when a UE should leave the group and when new UEs should join the group, e.g., based on whether the group criteria are met. Within a group, the UEs may be assigned member IDs (e.g., 1, 2, 3 etc.) for identification within the group and in SLPP messages. The group member IDs, for example, may be used to determine which UE will lead, coordinate and/or initiate an SLPP positioning session, a position method or a position method type, e.g. which UE will propose PRS configurations to other UEs, such as illustrated at stage 2 of FIGS. 5 and 7. A group may be restricted to one position method type only (e.g., SL NR PRS), while other position method types (e.g., SL LTE PRS or RTK) may be used by a different group. Restricting a group to one position method type may avoid scenarios where not all UEs in a group support the same position method types and may simplify procedures and messaging. Alternatively, to maximize signaling efficiency, the same group of UEs may employ multiple position method types and/or multiple position methods, where not all UEs in the group necessarily support exactly the same position method types or exactly the same position methods.

Figure 8:
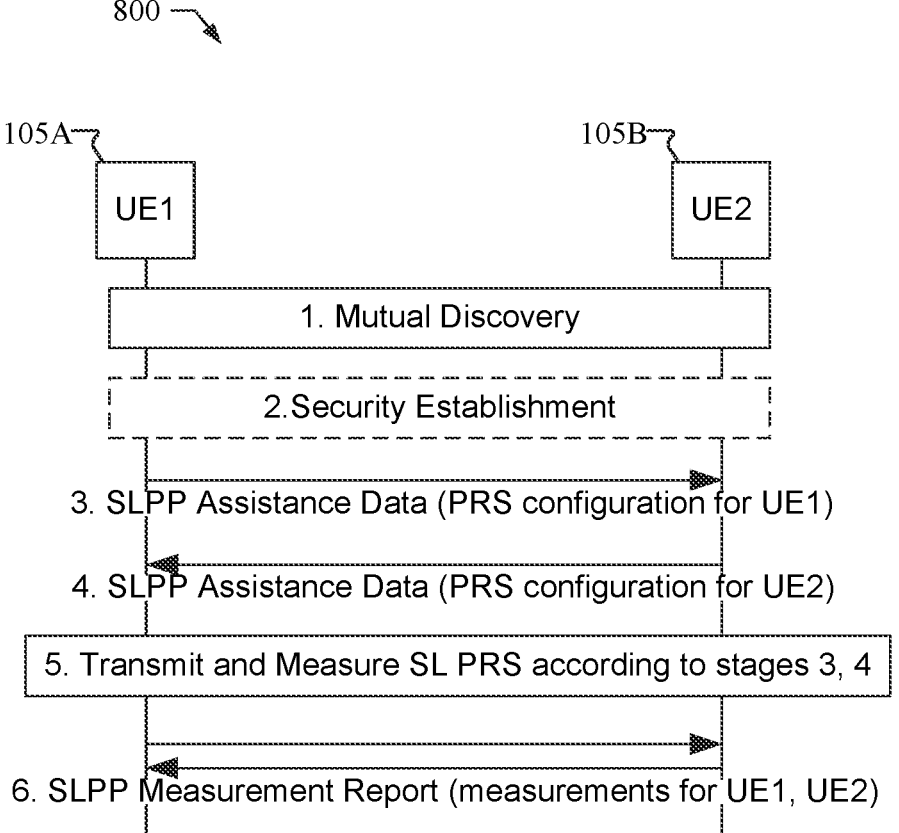
FIG. 8 is a signal flow illustrating the signaling between UEs for pairwise mode sidelink positioning, according to an embodiment.

FIG. 8, by way of example, is a signal flow 800 illustrating the signaling between UEs for pairwise mode sidelink positioning. The UE 105A and 105B, for example, may be, e.g., the UEs illustrated in FIG. 1 and any two of the UEs illustrated in group 210 shown in FIG. 2. The sidelink positioning illustrated in FIG. 8 can be independent of a network and thus, the UEs 105 shown in FIG. 8 may be the out of coverage UEs in subgroup 216. The signaling performed in signal flow 800 may be similar to or the same as the SLPP signaling discussed above in reference to FIG. 2, and as illustrated in signal flow 500 in FIG. 5. The signal flow 800 illustrates another simple type of SLPP session between UE 105A and UE 105B in which there may or may not be explicit session establishment and session termination.

At stage 1, discovery of UEs and establishment of a sidelink communication connection, association, link or session are performed. The discovery phase, for example, may be implemented by one or both of UEs 105A and 105B to detect other UEs (e.g., including detecting each other) that are available for sidelink positioning. For example, discovery messages indicating whether the UEs are permitted to support a pairwise mode sidelink positioning session may be exchanged between UE 105A and/or 105B to determine nearby UEs that are available to participate in sidelink positioning. Additional messages may optionally be exchanged to explicitly establish the sidelink positioning session between UEs 105A and 105B. In FIG. 8, for example, it is assumed that the UEs 105A and 105B both are permitted to support the pairwise mode sidelink positioning session.

In some embodiments, signal flow 800 may optionally include stage 2 where security may be established between the UEs 105A and 105B, e.g. with SLPP messages sent later at stages 3, 4 and 6 being ciphered.

At stage 3, the UE 105A may send to UE 105B a SL positioning reference signal (PRS1) configuration to be transmitted using SL by UE 105A at one or later times. This may be sent in an SLPP Provide Assistance Data message. In some embodiments, the SL PRS configuration may be included in and be unicasted to UE 105B. In some embodiments, the PRS1 configuration may include when and how the UE 105A may transmit SL PRS occasions. In some embodiments, the transmission times could be indicated using GNSS time or Coordinated Universal Time (UTC) or could be relative to a local time of a UE. For example, when using UE local time, UEs may include timestamps in transmissions indicating a local UE time at which any transmission (e.g. a particular part of the transmission such as an initial bit or initial octet) was sent or was to be sent. Each UE may then calculate real time differences (RTDs) between its own time and the local times of other UEs based on the differences between the UEs own local time and the local times of other UEs indicated in transmissions received from these other UEs and with corrections based on estimates of the propagation delays between UEs (or ignoring propagation delays and treating these as negligible). Each UE (e.g. a UE A) can then include local time timestamps in SLPP messages sent to other UEs that any other UE (e.g. a UE B) is able to convert using the RTD that the other UE (UE B) previously calculated for the pair of UEs A and B.

The PRS1 configuration, for example, may be the same as or similar to PRS configurations defined in 3GPP TS 37.355 for LPP except that it may refer to PRS transmission on a sidelink communication channel between two UEs.

At stage 4 and in response to receiving the PRS1 configuration at stage 3, the UE 105B may send a positioning reference signal (PRS2) configuration to be transmitted by UE 105B at one or later times. This may be sent in an SLPP Provide Assistance Data message. In some embodiments, the PRS2 configuration may be included in and be unicasted to UE 105A. In some embodiments, the PRS2 configuration may include when and how the UE 105B may transmit SL PRS occasions.

At stage 5, both UEs 105A and 105B transmit and measures the SL PRSs (e.g., the PRS1, PRS2). For example, the UE 105A transmits SL positioning signals PRS1 and the UE 105B measures the positioning signals PRS1. The UE 105B, for example, may measure RSSI, RTT, RSRP, RSRQ, AOA, AOD, TOA, of the PRS1 transmitted by UE 105A. The UE 105B also transmits SL positioning signals PRS2 and the UE 105A measures the positioning signals PRS2. The UE 105A, for example, may measure RSSI, RTT, RSRP, RSRQ, AOA, AOD, TOA, of the PRS2 transmitted by UE 105B. After determining the measurements, the UE 105A and UE 105B each exchange the measurements at stage 6 by each sending an SLPP Measurement Report message or SLPP Provide Location Information message comprising the measurement obtained by the each UE. The exchange of measurements, for example, may also include revised PRS1 and PRS2 configurations that may indicate the precise transmission time, AOD, signal power, etc. of the transmitted signals (PRS1 or PRS2), and as well as providing the measurements obtained at stage 5.

Following stage 6, the UEs may determine a range between the UEs based on the measurements and/or revised PRS1 and PRS2 configurations, and/or may determine other location results such as a direction between the UEs, a relative location of one UE relative to the other UE, a relative velocity of one UE relative to the other UE, or any combination thereof, based on the measurements. For example, the range may be determined as described for stage 7 of FIG. 5.

In some embodiments, stages 5 and 6 may be repeated as desired (e.g., as indicated in stages 3 and 4).

In some embodiments, exchange of the UEs' capabilities and resources may not be needed. For example, the sidelink positioning protocol (SLPP) for a pairwise mode sidelink positioning session may define a minimum core set of capabilities and/or resources which all UEs that participate in the session should be permitted to support.

Figure 9:
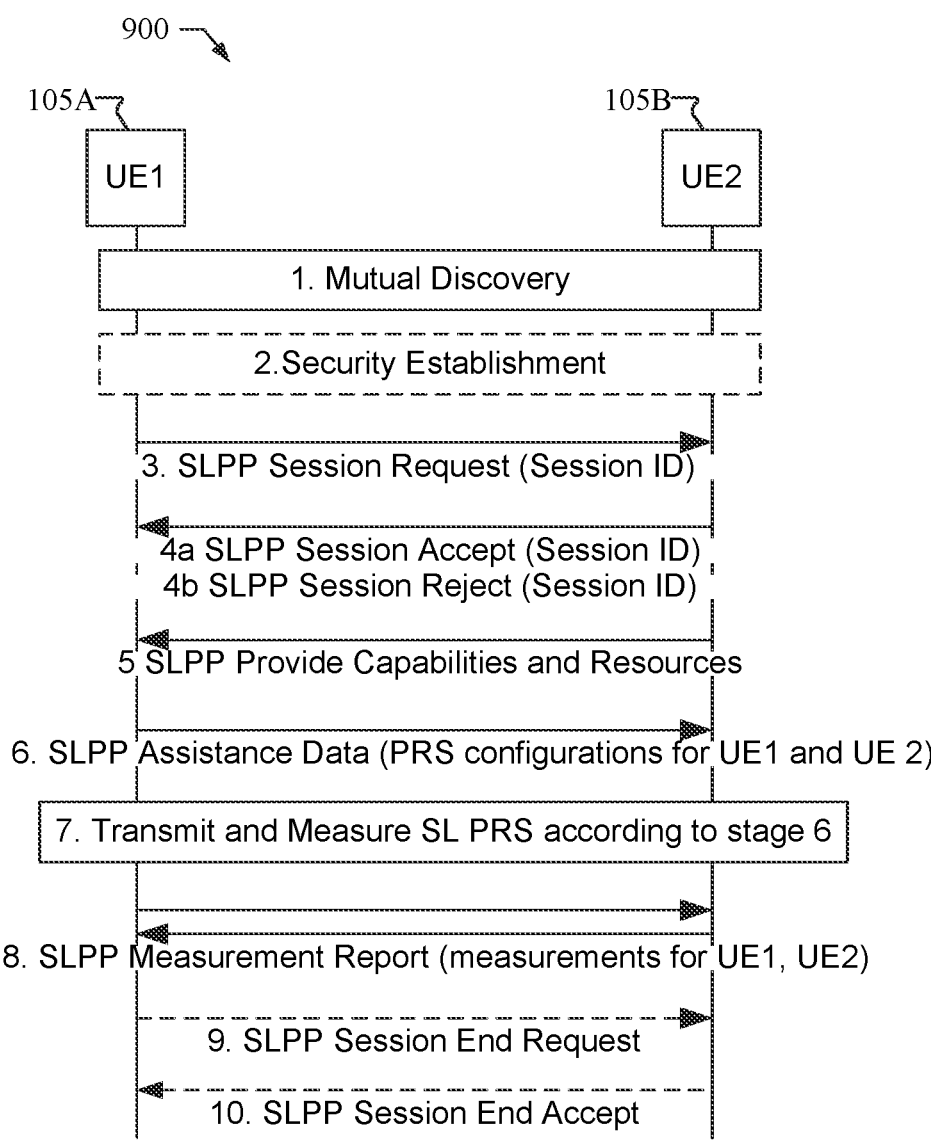
FIG. 9 is a signal flow illustrating the signaling between UEs for pairwise mode sidelink positioning, according to an embodiment.

FIG. 9, by way of example, is a signal flow 900 illustrating signaling between UEs for pairwise mode sidelink positioning. The UE 105A and 105B, for example, may be, e.g., the UEs illustrated in FIG. 1 and any two of the UEs illustrated in group 210 shown in FIG. 2. The sidelink positioning illustrated in FIG. 9 can be independent of a network and thus, the UEs shown in FIG. 8 may be the out of coverage UEs in subgroup 216. In FIG. 9, explicit signaling is used to establish and later terminate an SLPP positioning session between the UEs 105A and 105B.

At stage 1, discovery of UEs and establishment of a sidelink communication session, association, link or connection is performed. The discovery phase, for example, may be implemented by one or both of UEs 105A and 105B to detect other UEs (e.g., including detecting each other) that are available for sidelink positioning. For example, discovery messages indicating whether the UEs are permitted to support a pairwise mode sidelink positioning session may be exchanged between UE 105A and/or 105B to determine nearby UEs that are available to participate in sidelink positioning. In FIG. 9, for example, it is assumed that the UEs 105A and 105B both are permitted to support a pairwise mode sidelink positioning session.

In some embodiments, signal flow 700 may optionally include stage 2 where, security may be established between the UEs 105A and 105B, e.g. with SLPP messages sent later at stages 3, 4, 5, 6, 8, 9 and 10 being ciphered.

At stage 3, UE 105A (which may be referred to an "anchor", an "anchor UE", a "coordinating UE", a "coordinator" or an "initiating UE") may request the UE 105B to participate in a pairwise mode sidelink positioning session by e.g., transmitting (sending) to UE 105B a SLPP Session Request message that includes a session ID. In some embodiments, the SLPP Session Request message may include information regarding parameters for the duration, the number of measurement reports, QoS, normal end of the session, etc.

At stage 4, the UE 105B may accept or reject the request by e.g., transmitting an SLPP Session Accept (stage 4a) or SLPP Session Reject (stage 4b) message. As illustrated in FIG. 7, for example, it is assumed that the UE 105B accepts the participation request (e.g., stage 4a). Following stage 4a, an SLPP positioning session may be established between UEs 105A and 20B.

At stage 5, the UE 105B may send its sidelink positioning capabilities and/or resources to the UE 105A. In some embodiments, the sidelink positioning capabilities may include capabilities, resources (e.g. available times for transmitting and/or measuring SL PRS), and service requirements, which may include QoS. In some embodiments, the UE 105A may first send to the UE 105B a request capabilities message.

At stage 6, the UE 105A may determine and send to UE 105B proposed SL positioning reference signal (PRS) configurations, e.g., PRS1, PRS2 configurations, e.g., using an SLPP Provide Assistance Data message. The PRS1 and PRS2 configurations, for example, may be defined and proposed by UE 105A based on the capabilities, resources (and possibly service requirements) received by UE 105A at stage 5. The PRS1 and PRS2 configurations, for example, may be the same as or similar to PRS configurations defined in 3GPP TS 37.355 for LPP except that they may refer to PRS transmission on a sidelink communication channel between two UEs or between a group of UEs. Rules and guidelines may be standardized to ensure that proposed SL PRS configurations are compatible with the capabilities, resources and service requirement, which may include QoS of both UEs. The PRS1 configuration may be indicated to be transmitted by UE 105A and the PRS2 configuration to be transmitted by UE 105B.

At stage 7, both UEs 105A and 105B transmit and measures the SL PRSs (e.g., the PRS1 is transmitted by UE 105A and measured by UE 105B and PRS2 is transmitted by UE 105B and measured by UE 105B) in accordance with the SL PRS configurations sent by UE 105A at stage 6. For example, the UE 105A transmits positioning signals PRS1 and the UE 105B measures the positioning signals PRS1. The UE 105B, for example, may measure Rx-Tx, RSSI, RTT, RSRP, RSRQ, AOA, AOD, TOA, of the PRS1 transmitted by UE 105A. The UE 105B also transmits positioning signals PRS2 and the UE 105A measures the positioning signals PRS2. The UE 105A, for example, may measure Rx-Tx, RSSI, RTT, RSRP, RSRQ, AOA, AOD, TOA, of the PRS2 transmitted by UE 105B.

At stage 8, the UE 105A and UE 105B may determine and exchange SLPP measurement reports (or SLPP Provide Location Information messages) containing the measurements obtained at stage 7. The exchange of measurements, for example, may also include revised PRS1 and PRS2 configurations, e.g. indicating the actual transmission time(s), AOD, signal power, etc. of the transmitted PRS1 and PRS2 signals. The UEs may then determine a range based on the measurements and/or may determine other location results such as a direction between the UEs, a relative location of one UE relative to the other UE, a relative velocity of one UE relative to the other UE, or any combination thereof, based on the measurements. For example, a range may be determined as described for stage 7 of FIG. 5.

In some embodiments, stages 7 and 8 may be repeated periodically as desired.

At stages 9 and 10, the UE 105A and/or UE 105B may explicitly end the pairwise mode sidelink positioning session if the session needs to end at a time different from (e.g., before or after) any scheduled end as indicated in e.g., the session request transmitted at stage 3. For example, the UE 105A and/or UE 105B may transmit an end request indicating the end of the pairwise mode sidelink positioning session to the other UE and end the session accordingly.

Figure 10:
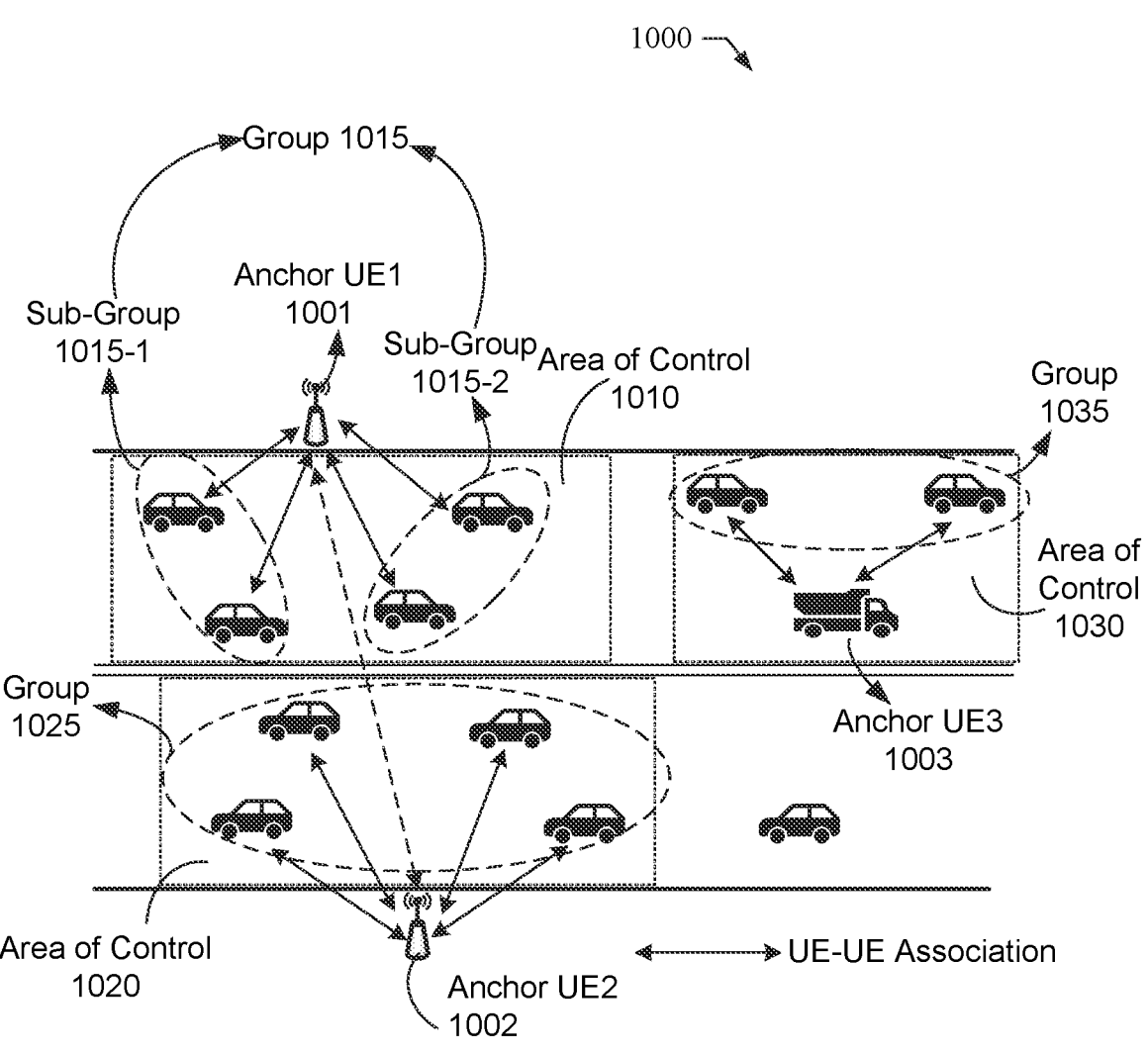
FIG. 10 is a diagram illustrating one implementation of a group mode sidelink positioning system, according to an embodiment.

FIG. 10 is, by way of example, a diagram 1000 illustrating one implementation of a group mode sidelink positioning system, according to an embodiment. The UE1, UE2, and UE3, for example, may be, e.g., the UEs 105A, 105B and 105C illustrated in FIG. 1 and any three of the UEs illustrated in group 210 shown in FIG. 2. The sidelink positioning illustrated in FIG. 10 can be independent of a network and thus, the UEs shown in FIG. 10 may be the out of coverage UEs in subgroup 216. The signaling performed in diagram 1000 may be similar to or the same as the SLPP signaling discussed above in reference to FIG. 2, and as illustrated in signal flow 700 in FIG. 7 and signal flows 1100, 1200, 1300, 1400, 1500, 1600, 1700 and 1800 described later for FIGS. 11-18.

As illustrated in FIG. 10, three anchor (or "coordinating") UEs (e.g., UE1, UE2, and UE3) may each cover and manage a corresponding area of control (e.g., areas of control 1010, 1020, and 1030). Within each area of control, other UEs that have been discovered by the anchor UE associated with the area of control and that are located in the area of control may be grouped into a single group or several sub-groups by the anchor UE (e.g., group 1015 for UE1 and comprising sub-groups 1015-1 and 1015-2, group 1025 for UE2, and group 1035 for UE3). In some embodiments, the corresponding anchor UE may coordinate group mode sidelink positioning session(s) for the group UEs or for each separate sub-group of UEs. In some embodiments, different areas of control may overlap. For example, group 1015 could overlap with group 1025 and/or group 1035.

In some embodiments, the anchor (or coordinating) UE may be a UE having an anchor (or coordinating) UE capability. For example, the anchor capability may include having an accurately known location and superior capabilities to other UEs (e.g., GNSS capabilities, multiple antennas, more processing and storage resources, etc.). In some embodiments, the anchor UE may be a roadside unit (RSU) for V2X, a truck, a bus, etc. In some embodiments, more than one UE having the anchor UE capability may be grouped into a same group performing a same group mode sidelink positioning session. In that case, either one of the UEs having the anchor UE capability may act as the anchor UE for the group (e.g., through negotiation).

Within each group or sub-group (e.g., group 1015, sub-group 1015-1, subgroup 1015-2, group 1025, and/or group 1035), a group mode sidelink positioning session may be managed completely by the corresponding anchor UE (e.g., UE1 for group 1015 or sub-groups 1015-1 and 1015-2, UE2 for group 1025, and UE3 for group 1035), and the other UEs within the group may perform the positioning (e.g., by participating in the group mode sidelink positioning session) by associating with the corresponding anchor UE. In some embodiments, the association between the anchor UE and the other UEs within the group may be configured to manage the positioning of the group mode sidelink positioning session.

In some embodiments, each group may be arranged into one or more sub-groups (e.g., sub-group 1015-1 and sub-group 1015-2) based on e.g., the location of the UEs (e.g., the area of control may be divided into different sub-areas, each corresponds to a sub-group of the group mode sidelink positioning session).

Figure 11:
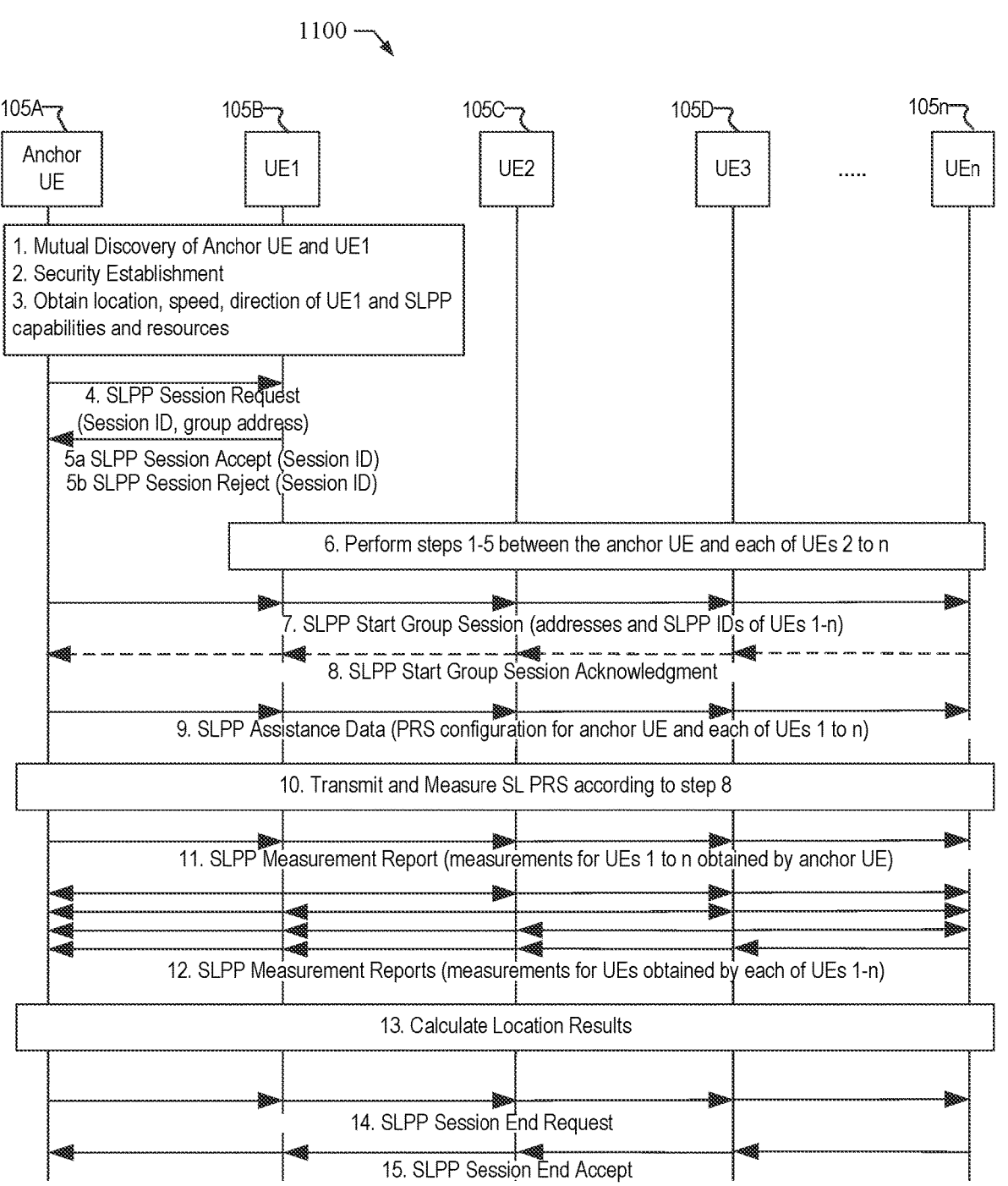
FIG. 11 is a signal flow illustrating the signaling between UEs for group mode sidelink positioning, using an SLPP session, according to an embodiment.

FIG. 11 shows a signal flow 1100 illustrating the signaling between UEs for group mode sidelink positioning for a plurality of UEs, illustrated as UE 105A, 105B, 105C, 105D, . . . 105*n*, sometimes collectively referred to as UEs 105. The group of UEs may comprise a small number of UEs (e.g., up to 20) for which direct discovery and direct sidelink signaling are possible. The UEs 105, for example, may be, e.g., the UEs 105 illustrated in FIG. 1 and any UEs illustrated in group 210 shown in FIG. 2. The sidelink positioning illustrated in FIG. 11 can be independent of a network and thus, the UEs shown in FIG. 11 may be the out of coverage UEs in subgroup 216. The signaling performed in signal flow 1100 may be similar to or the same as the SLPP signaling discussed above in reference to FIG. 2, and as illustrated in signal flow 700 in FIG. 7. If desired, the signaling may be performed directly, as illustrated or via relays and/or via a network. As noted previously, only some of the group of UEs may be target UEs, but the signal flow 1100 shown in FIG. 11 can be almost the same regardless of whether only some of the group of UEs 105 or all of the group of UEs 105 are target UEs. In particular, the number of target UEs 105 for the signal flow 1100 can exceed one.

Signal flow 1100 includes an explicit establishment of an SLPP session between the plurality of UEs 105. An SLPP session may also be referred to as a session, a group session, an SLPP group session, an SLPP group mode session, a sidelink positioning session or a group mode sidelink positioning session.

At stage 1 in FIG. 11, the anchor UE 105A discovers UE1 105B or vice versa. For example, discovery messages may be exchanged between the UEs to determine nearby UEs that are available to participate in sidelink positioning. In some embodiments, an anchor UE (e.g., the UE 105A) broadcasts a discovery request and indicates anchor status and SLPP support and/or group mode SLPP support, and an available nearby UE (e.g., the UE 105B) may transmit a discovery response (e.g., through unicast) and indicate SLPP and/or group mode SLPP support. In FIG. 11, for example, it is assumed that all UEs 105A, 105B, 105C, . . . 105*n* are able to participate in the group mode sidelink positioning session.

At stage 2, optionally, security establishment may be performed between UEs 105A and 105B. In some embodiments, in network assisted UE mode if a serving PLMN is configured with anchor UE security data (e.g., cipher keys), security may be established. For example, if for a first UE (e.g., one of the UEs 105B, 105C, 105D, . . . 105*n*) and the anchor UE (e.g., UE 105A) both UEs are in PLMN coverage, proximity services security can be used for unicast SLPP messages to enable (i) ciphering of unicast SLPP messages, (ii) authentication of the anchor UE by the first UE, and (iii) validation of multicast messages sent by the first UE or anchor UE to the other party using a digital signature. For another example, if the first UE but not the anchor UE is in PLMN coverage, a trusted source (e.g. the PLMN or a local authority for RSUs accessible via the PLMN) could provide a cipher key ID and corresponding cipher key to the first UE, e.g., the anchor UE and trusted source could use a common secret key to cipher the cipher key ID into the cipher key to be used for the first UE to anchor UE association. The cipher key ID can be pseudo-random (e.g. 128 bits) assigned by the trusted source unique to the first UE (e.g., with no two UEs using the same cipher key ID). This could enable (i) ciphering of unicast SLPP messages, (ii) authentication of the anchor UE by the first UE, and (iii) validation of multicast messages sent by the first UE or anchor UE by the other party using a digital signature. For a further example, certain secure UEs (e.g., for public safety and law enforcement) can be configured with security and key information for certain classes of anchor UEs (e.g., RSUs) which can support security as in the two examples above. In some embodiments, multicast messages could be ciphered if the criteria set forth in any of the above-mentioned examples is supported by all UEs participating in the group mode sidelink positioning session (also referred as "group member UEs"), but not otherwise.

At stage 3, UE 105B may provide one or more of its location, capabilities and available resources to the anchor UE 105A. For example, as illustrated in FIG. 11, UE1 may send its current location (e.g. latitude and longitude) to the anchor UE (e.g., UE 105A) using V2X signaling. In some embodiments, the anchor UE may start a pairwise mode sidelink positioning session with UE1 105B to obtain the location and SLPP capabilities and resources of the UE1, as illustrated above with respect to FIG. 8. In some embodiments, the resources might include sidelink PRS configurations which UE1 is already using (e.g., using for other communication in other group mode sidelink positioning sessions). Accordingly, the anchor UE may verify that UE1 is within the area controlled by the anchor UE and assigns UE1 to a particular group(s) or sub-group(s) for group mode sidelink positioning session as illustrated in FIG. 10.

At stage 4, the anchor UE 105A determines to establish (or initiate) a session for a sidelink positioning protocol (SLPP) for the group of UEs 105. For example, UE 105A may be configured at an application layer to establish an SLPP session for a group of UEs 105 when certain criteria for the group of UEs 105 are met as discussed for FIGS. 7 and 10. The group of UEs 105 may be determined by the anchor UE 105A without initially notifying the other UEs 105, or all UEs 105 may participate in determining and forming a group of UEs 105. UE 105A may also or instead determine to establish (or initiate) the session for SLPP based on a service request received from a network entity (e.g. an LMF 120 or AMF 115), where the service request may indicate the group of UEs 105 to which the service request applies. UE 105A may then send a request to UE1 to join a group mode sidelink positioning session. In some embodiments, the request may include a common group address (e.g., a level 2 group address supported by 3GPP physical and MAC sidelink protocol layers) for the group mode sidelink positioning session.

At stage 5, the UE1 may respond to the request with an acceptance (e.g., as indicated in stage 5a) or a rejection (e.g., as indicated in stage 5b) to the request.

At stage 6, stages corresponding to stages 1-5 may be repeated for each of the other UEs 2-n (e.g., UEs 105C, 105D, . . . 105n). In some embodiments, each stage of the stages 1-5 may be performed using unicast.

At stage 7, the anchor UE 105A starts the group mode sidelink positioning session by transmitting a start message (e.g. an SLPP Start Group Session message) to each of the UEs that accepted the request at stage 5. In some embodiments, the anchor UE 105A may multicast the start message to all the group member UEs of the session (e.g., UE1, UE2, . . . UEn) based on the group address. In some embodiments, the start message includes the UE addresses (e.g. level 2 address and/or application level address or ID) of each UE participating in the group mode SLPP session. In some embodiments, the anchor UE 105A may include a group ciphering key for all of the UEs in the SLPP session, which may be used by UEs to cipher some or all SLPP messages sent later at stages 9, 11, 12, 14 and 15.

In response, at stage 8, each UE receiving the start message at stage 7 may respond with an acknowledgement (e.g. an SLPP Start Group Session Acknowledgment message) for receiving the start message which may be unicast just to UE 105A or may be multicast to UE 105A and all other UEs in the SLPP session. In some embodiments, the acknowledgement may include data that was included in the start message (e.g., the addresses of the group member UEs) and may then be multicast to all group member UEs. Accordingly, a UE that misses the start message may still receive the information in the start message (e.g., through receiving the acknowledgement(s) from other UE(s)). Stage 8 is optional and may not always be performed.

In some embodiments, a UE address (e.g. as sent at stage 7) may include a level 2 address and/or an application-level address of the UE. In some embodiments, the SLPP messages transmitted in the group mode sidelink positioning session (e.g. at stages 7, 8, 9, 11, 12, 14, 15) may include a local UE ID (used within SLPP messages) and also referred to as an SLPP UE ID for each of the group member UEs in the session. For example, each of the group member UEs may be indexed (e.g., from 0 to n) and the local (SLPP) UE ID may correspond to the index of the UE. The start message sent at stage 7 can indicate the correspondence of the SLPP UE ID for each group member UE to other addresses for that UE such as a level 2 address or application level address. SLPP UE IDs can be used in SLPP messages (e.g. at stages 9, 11 and 12) to identify particular UEs and information (in the SLPP messages) for those UEs using fewer signaling bits than needed for a level 2 address or application level address and may thus reduce SLPP signaling.

At stage 9, the anchor UE 105A may determine and transmit SL PRS configuration data (e.g., SL PRS configurations to be used for the group mode sidelink positioning session) to all the group member UEs. For example, the SL PRS configuration data may include a SL PRS configuration to be transmitted one or more times by each UE (anchor UE, UE1, UE2, UE3, UEn). The SL PRS configuration to be transmitted by each UE may be distinct from the SL PRS configuration to be transmitted by any other UE—e.g. at least the transmission times and/or codes may be different. For example, SL PRS configurations PRS0, PRS1, PRS2, PRS3, PRSn may be sent by the anchor UE where the anchor UE will transmit PRS0, UE1 will transmit PRS1, UE2 will transmit PRS2, UE3 will transmit PRS3 and UEn will transmit PRSn. In some embodiments, if one of the group member UEs is already transmitting SL PRS(s) with the anchor UE for another group (e.g., the UE is in more than one group/sub-group controlled by the anchor UE), the anchor UE may include the SL PRS configuration used for the other group as the SL PRS configuration data for that UE.

At stage 10, all group member UEs of the group mode sidelink positioning session may transmit and measure the SL PRS(s). For example, each group member UE of the group mode sidelink positioning session may transmit and measures the SL PRSs in accordance with the SL PRS configuration determined and sent by the anchor UE at stage 9. For example, each UE may transmit its own SL PRS (e.g. the anchor UE transmits PRS0, UE1 transmits PRS1, UE2 transmits PRS2, UE3 transmits PRS3 and UEn transmits PRSn) and all other UEs except the transmitting UE measure the SL PRS being transmitted. In some embodiments, the measurements may include a Received Signal Strength Indicator (RSSI), a round trip signal propagation time (RTT), a reference signal received power (RSRP), a reference signal received quality (RSRQ), an angle of arrival (AOA), an angle of departure (AOD), a time of arrival (TOA), a receive time-transmission time difference (Rx-Tx) and a reference signal time difference (RSTD) of the PRS transmitted.

At stages 11 and 12, each UE participating in the group mode sidelink positioning session may determine and send (to the other UEs) SLPP measurement reports (or SLPP Provide Location Information messages) containing the measurements obtained at stage 10. In some embodiments, an SLPP measurement report message sent by a UE 105 may include a revised SL PRS configuration corresponding to SL PRS actually transmitted by the UE 105 at stage 10 and indicating the exact SL PRS configuration used by the UE 105 at stage 10. For example, in the case of UE1 105B, UE1 105B receives an SL PRS configuration PRS1 at stage 9 from the anchor UE 105A indicating the SL PRS configuration intended to be used at stage 10 by UE1, but UE1 105B may need to slightly change this configuration at stage 10 due to SL PRS transmission or other interference from other UEs or other RF conditions. For example, the UE1 105B might have changed the bandwidth or exact time(s) of PRS1 transmission(s). UE1 105B can then include a revised PRS1 configuration in a measurement report sent at stage 12 indicating the changes to the PRS1 configuration that were used to transmit PRS1 at stage 10. Others of the anchor UE 105A and the UEs 2 to n can do the same for each of their PES configurations PRS0, PRS2, PRS3 to PRSn. The measurement reports may indicate precise SL PRS transmission times and receive times for measurements and revised SL PRS configurations using a global time (e.g. GNSS or UTC time). In some embodiments, each UE may multicast the SLPP measurement report to all other group member UEs and may indicate from which other group member UEs the each UE is able to receive measurement reports. This may help the anchor UE 105A decide on group member changes.

At stage 13, one or more of the UEs participating in the group mode sidelink positioning session (referred to as participating UEs) determines location results for the participating UEs (e.g. for participating UEs that are target UEs), such as a range between a target UE and another participating UE, a direction to or from a target UE from or to, respectively, another participating UE, a location of a target UE relative to a location of another participating UE, a velocity of a target UE relative to a velocity of another participating UE, an absolute location of a target UE, an absolute velocity of a target UE, or some combination thereof. The determined location results may then be sent to other UEs for the SLPP session.

Stages 10 to 13 may be repeated—e.g. if that was indicated by the anchor UE 105A at stage 4 or stage 7.

Note that the SLPP messages sent at stages 7, 8, 9, 11, 12, 14 and 15 may be structured or partly structured as described for FIGS. 4A and 4B and may thus each include one or more of a session ID, a transaction ID, a sequence number (seq no) and an acknowledge (or acknowledgment) sequence number, In some embodiments, the anchor UE 105A may decide on group member changes (e.g., move UEs between different sub-groups and/or assign a UE to more than one subgroup) during the session. For example, if a UE participating in a group mode sidelink positioning session travels within/out of the area of control of the anchor UE (e.g., areas of control of group 1015, 1025, and/or 1035 as illustrated in FIG. 10), the anchor UE may adjust the group status of the UE accordingly (e.g., reassign the UE to another group/subgroup and or remove the UE from any group or sub-group controlled by the anchor UE). Accordingly, stages 7 and 8 may be repeated for those affected groups (e.g., groups that have UE(s) being removed and/or added), or signal flow 1500 described later for FIG. 15 may be used.

At stages 14 and 15 in FIG. 11, the anchor UE can terminate the group mode sidelink positioning session by multicasting an end session request, and the group member UEs may accept the request to end the group mode sidelink positioning session.

Messages described above for stages 1 to 6 in FIG. 11 can be sent between UEs (e.g. anchor UE 105A and another UE 105) using unicast in which a message includes an address (e.g. a level 2 address) of a particular destination UE. Messages described above for stages 7 to 15 in FIG. 11 can be sent between UEs (e.g. anchor UE 105A and other UEs 105) using multicast in which a message includes the group address (e.g. a level 2 group address) applicable to all the UEs 105, which can enable each of the UEs 105A, 105B, 105C, 105D, 105n that is not the sender of the message to receive the message.

Figure 12:
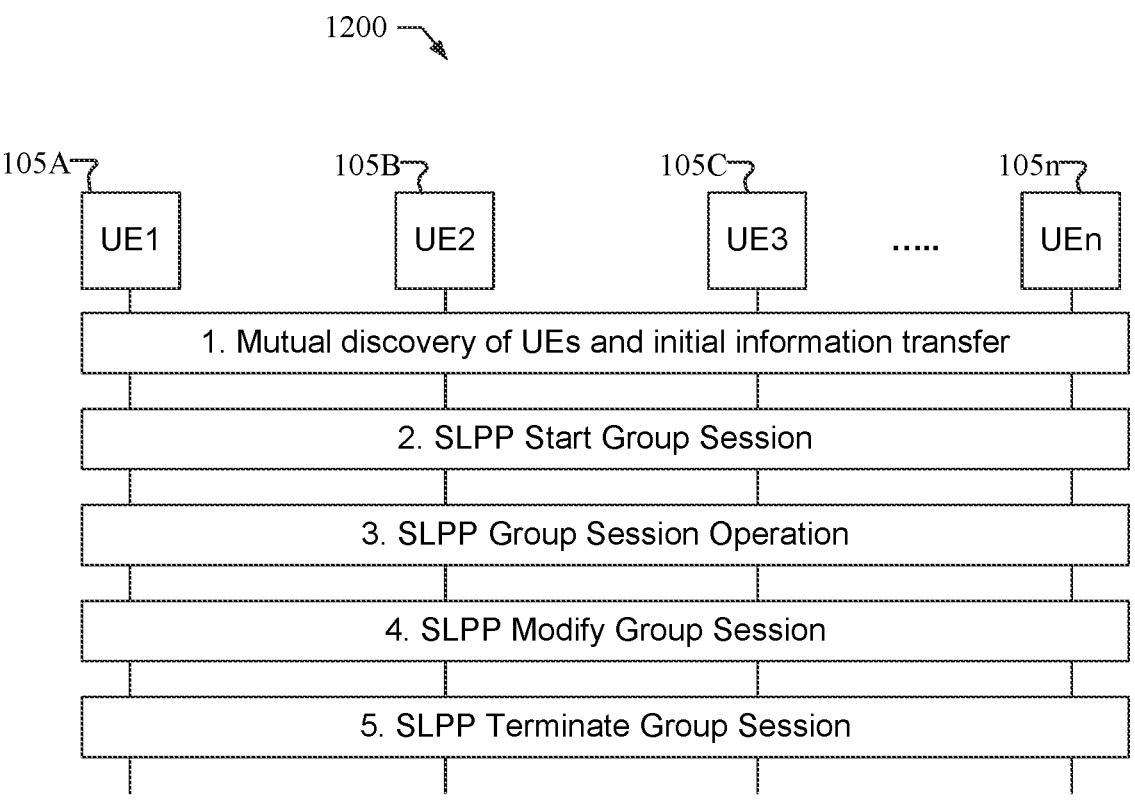
FIG. 12 is a signal flow illustrating the signaling between UEs for group mode sidelink positioning, using an SLPP session, according to an embodiment.

FIG. 12 is a signal flow illustrating the signaling between UEs for a group mode sidelink positioning session for a plurality of UEs, illustrated as UE 105A, 105B, 105C, . . . 105n, sometimes collectively referred to as UEs 105. The group of UEs may comprise a small number of UEs (e.g., up to 20) for which direct discovery and direct sidelink signaling are possible. The UEs 105, for example, may be, e.g., the UEs illustrated in FIG. 1 and any of the UEs illustrated in group 210 shown in FIG. 2. The sidelink positioning illustrated in FIG. 12 can be independent of a network and thus, the UEs shown in FIG. 12 may be the out of coverage UEs in subgroup 216. If desired, the signaling may be performed directly, as illustrated or via relays and/or via a network.

In some embodiments, group mode sidelink positioning as illustrated in FIG. 12 may be an extension of the group mode sidelink positioning illustrated in FIG. 11 where the role of the anchor UE may be changed and where the other UEs participating in the group mode sidelink positioning (e.g., the group member UEs) may have more control over the positioning process.

For example, as illustrated in FIG. 12, signal flow 1200 may include stages 1-5. At stage 1 of signal flow 1200, a mutual discovery of the UEs and initial information transfer may be performed. In some embodiments, operations in stage 1 of signal flow 1200 may be similar to operations in stages 1-3 and part of stage 6 of signal flow 1100 shown in FIG. 11, except that one or more of the UEs (e.g., any of the UEs 105) may be the anchor UE. In some embodiments, the process may be performed based on proximity or V2X services. In some embodiments, the discovery request and response messages for the discovery request may indicate support of SLPP and/or group mode sidelink positioning and whether a UE has the capability to act as an anchor UE. In some embodiments, the messages transmitted at stage 1 of signal flow 1200 may also include IDs for all group mode sidelink positioning sessions to which each UE (e.g., any of the UEs 105) belongs and the anchor UE address for each group mode sidelink positioning session.

In some embodiments, a UE that discovers many nearby UEs belonging to a same group for group mode sidelink positioning can then request to join the group and may avoid starting another group for group mode sidelink positioning. In some embodiments, UEs performing the group mode sidelink positioning may also determine ranges, bearings, speeds for other UEs individually using a pairwise mode sidelink positioning session as illustrated above with respect to FIGS. 5 and 8 to help decide which UEs should be included in a group for group mode sidelink positioning. In some embodiments, security establishment may also be optionally established, subject to limitations similar to stage 2 of signal flow 1100.

At stage 2 of signal flow 1200, a start session of the group mode sidelink positioning may be performed which may be the same as or similar to stages 4 to 8 of FIG. 11 or may be as described below with respect to FIG. 13.

At stage 3 of signal flow 1200, group mode sidelink positioning may be performed. In some embodiments, operations in stage 3 of signal flow 1200 may be similar to or the same as operations in stages 9-13 of signal flow 1100 shown in FIG. 11 or stages 1 to 11 of signal flow 700 shown in FIG. 7 with the same or additional stages. Stage 3 is described in more detail below with respect to FIG. 14.

At stage 4 of signal flow 1200, a modify group session for changing group members (e.g., the UEs participating in the group mode sidelink positioning session) and/or the anchor UE of the group may be performed. Stage 4 is described in more detail below with respect to FIG. 15.

At stage 5 of signal flow 1200, a terminate session for terminating the group mode sidelink positioning session may be performed. In some embodiments, operations in stage 5 of signal flow 1200 may be the same as or similar to operations in stages 14-15 of signal flow 1100 shown in FIG. 11. Stage 5 is described in more detail below with respect to FIG. 18.

FIG. 13 is a signal flow 1300 illustrating the signaling between UEs for a start session of group mode sidelink positioning session, according to an embodiment and illustrates stage 2 in FIG. 12. Signal flow 1300 is similar to stages 4-5 and 7-8 of FIG. 11 but contains some enhancements for added flexibility After mutual discoveries and initial information transfer (e.g., stage 1 of signal flow 1200), a UE (e.g., UE1 105A here) with anchor capability may decide to create a new group for performing group mode sidelink positioning and to act as the anchor UE for the group mode sidelink positioning.

At stage 1 of FIG. 13, UE1 sends an SLPP Session Request unicast to each of the other UEs (UE2, UE3 to UEn). A level 2 group address is included in the SLPP Session Request. All UE addresses (e.g. level 2 addresses and/or application level addresses of UEs 2, 3 to n) may also be included to allow each UE to see which other UEs will be in the group.

Each of the other UEs (UE2, UE3, to UEn) provides one of two responses at stage 2a or stage 2b. At stage 2a, a UE can send an Accept indication to UE1 for the SLPP group session plus optionally include addresses of additional UEs which may be added to the group (e.g. an address for a UEm which was not included at stage 1). Alternatively at stage 2b, a UE can send a Reject indication for the SLPP session to UE1 and optionally indicate one or more existing group sessions which UE1 might join. UE1 may then join the other group session(s) and/or end the new group session.

At stage 3, UE1 sends an SLPP Session Request unicast to each of any additional UEs indicated at stage 2a (e.g. UEm). Each of the additional UEs (e.g. UEm) may then indicate an accept (stage 4a) or reject (stage 4b) of the session back to UE1 as at stage 2 and may optionally include addresses of additional UEs which may be added to the group as at stage 2. In order to prevent additional UEs being returned indefinitely (as at stages 2 and 4), an SLPP Session Request sent by UE1 may indicate whether a recipient UE is or is not allowed to return addresses of additional UEs. UE1 can then disallow sending of addresses of additional UEs (e.g. at stage 3 or subsequent to stage 4).

UEs accepting the request at stages 2a and 4a may be included in the group mode sidelink positioning session. UEs rejecting the group mode sidelink positioning session at stages 2b and 4b may be excluded from the group mode sidelink positioning session.

At the end of stage 2 or stage 4 of signal flow 1300, the anchor UE1 starts the group mode sidelink positioning session at stage 5 similar to an anchor UE starting a group mode sidelink positioning session with regard to stage 7 of signal flow 1100. In response, at stage 6 which can be optional, each UE receiving the start message at stage 5 may respond with an acknowledgement as for stage 8 of signal flow 1100.

Figure 14:
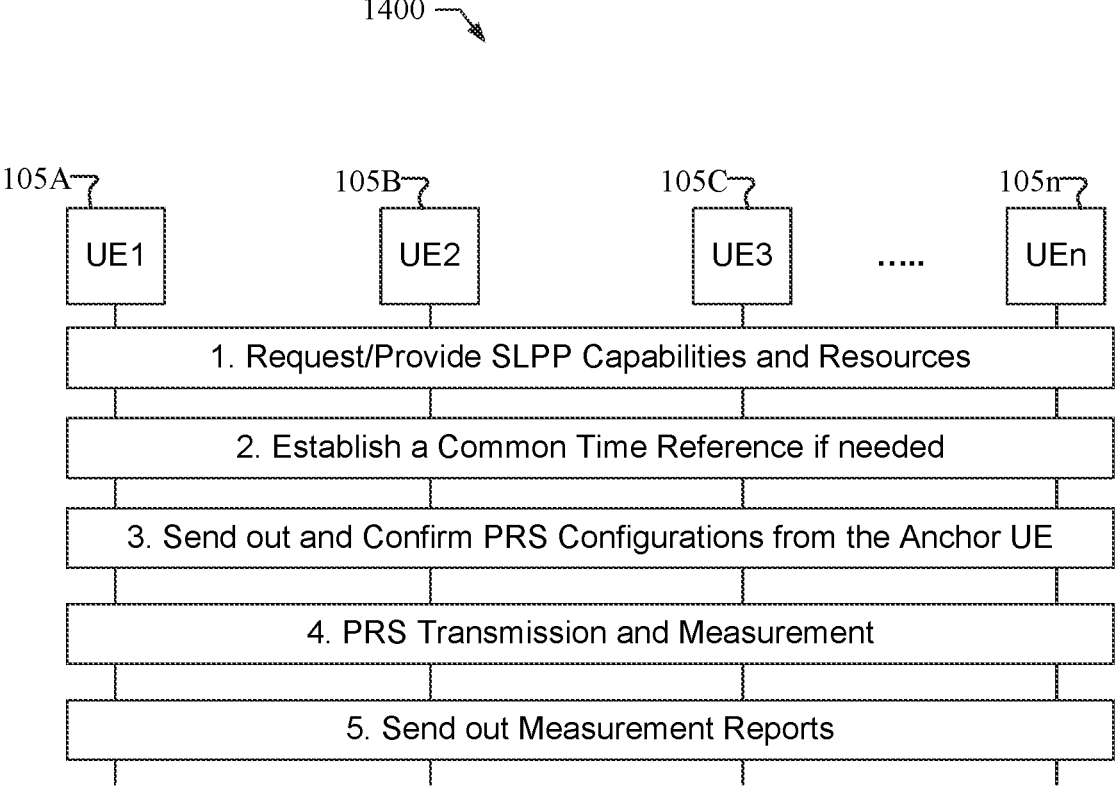
FIG. 14 is a signal flow illustrating the signaling between UEs for group session operation of sidelink positioning, according to an embodiment.

FIG. 14 is a signal flow 1400 illustrating the signaling between UEs for group mode sidelink positioning, according to an embodiment and illustrates stage 3 in FIG. 12.

As illustrated in FIG. 14, at stage 1 of signal flow 1400, each UE participating in the group mode sidelink positioning session (e.g., UEs that accept the request at stage 2 or stage 4 of signal flow 1300) transmits its sidelink positioning capabilities and resources to all the other participating UEs via e.g., multicast. Optionally, anchor UE1 may first multicast a request for the capabilities of each UE to all others UEs in the group.

At stage 2 of signal flow 1400, a common time reference may be established for conducting the SL PRS measurements (as described in more detail below).

At stage 3 of signal flow 1400, the anchor UE sends out SL PRS configurations for each of the group member UEs of the group mode sidelink positioning session, via e.g., multicast. Each UE receiving the SL PRS configurations may confirm receipt. In some embodiments, the confirmations may repeat/include all the received SL PRS configurations. The SL PRS configurations sent at stage 3 may include a distinct SL PRS configuration for each of the UEs in the group (e.g. UE1, UE2, UE3, UEn) to be transmitted at one or more later times by that UE. The SL PRS configurations can thereby indicate a SL PRS configuration to be transmitted by each UE and SL PRS configurations for other UEs in the group which each UE can measure. The anchor UE may also indicate measurements to be obtained by each UE of the SL PRS configurations to be transmitted by other UEs.

At stage 4 of signal flow 1400, all group member UEs perform SL PRS transmission and measurement according to the SL PRS configurations received at stage 3. For example, the measurements may include a Received Signal Strength Indicator (RSSI), a round trip signal propagation time (RTT), a reference signal received power (RSRP), a reference signal received quality (RSRQ), an angle of arrival (AOA), an angle of departure (AOD), a time of arrival (TOA), a receive time-transmission time difference (Rx-Tx) and a reference signal time difference (RSTD).

At stage 5 of signal flow 1400, each UE participating in the group mode sidelink positioning session multicasts measurement reports to all other UEs participating in the group mode sidelink positioning session, which may include measurements obtained at stage 4 and revised PRS configurations used at stage 3. In some embodiments, each measurement report may indicate from which UE(s), the UE transmitting the measurement report may be able to receive measurement report(s) from. In some embodiments, the measurement report may also include a vote for selecting an anchor UE for the group mode sidelink positioning session. Stages 4 and 5 may be repeated—e.g. periodically. Stages 3 to 5 in FIG. 14 may be similar to stages 1 to 11 in FIG. 7 and stages 9 to 13 in FIG. 11, both of which include additional details, actions and signaling which may be used in FIG. 14.

Figure 15:
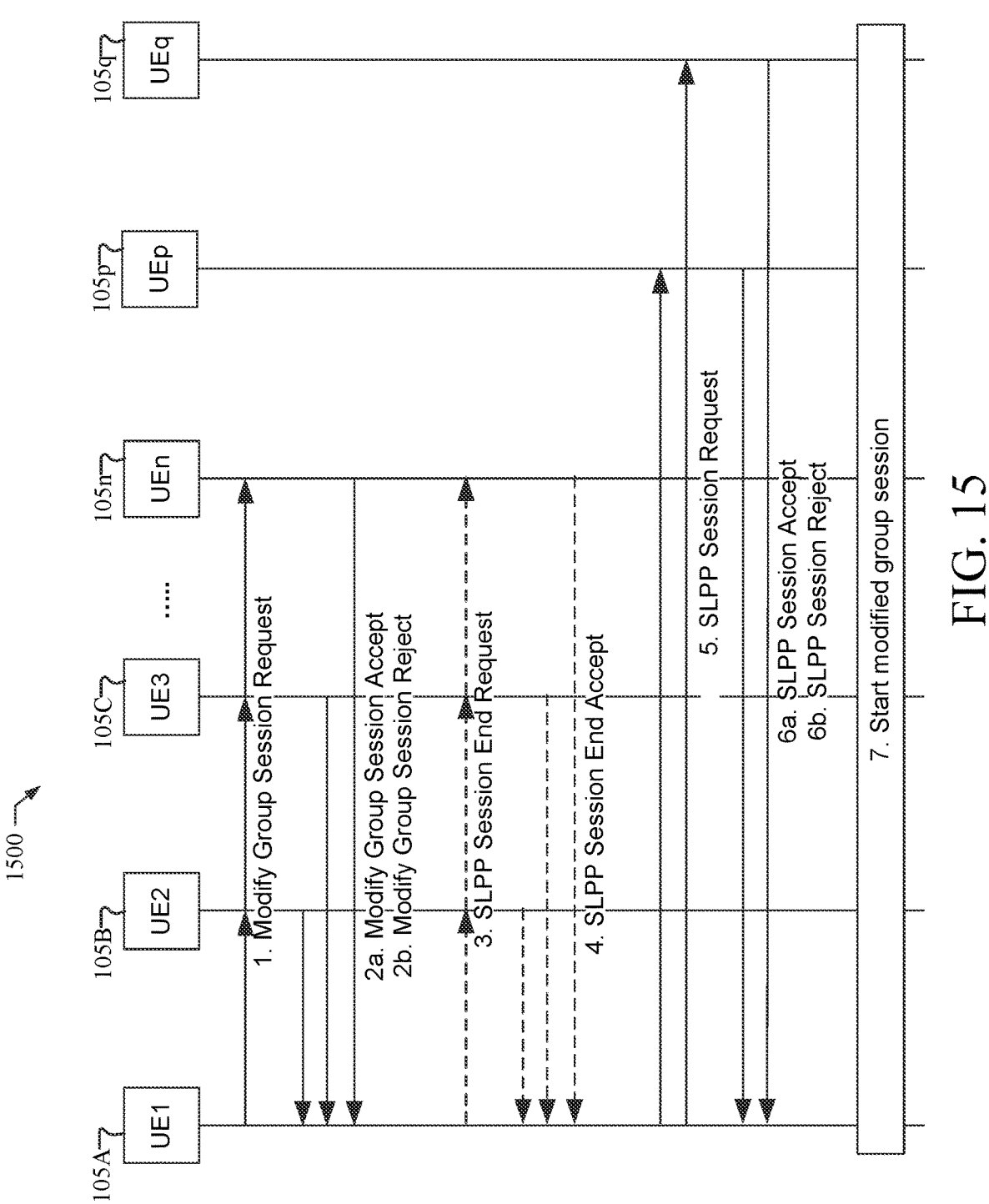
FIG. 15 is a signal flow illustrating the signaling between UEs to modify a sidelink positioning session, according to an embodiment.

FIG. 15 is a signal flow 1500 illustrating the signaling between UEs to enable modification of an SLPP group session, which may have been established as described for FIG. 11 or FIG. 13. In FIG. 15, the UEs 1 to n (105A, 105B, 105C, 105n) are existing UEs already part of an SLPP group session, while UEs p and q (105p and 105q) are new UEs that are not yet part of the SLPP group session. While FIG. 15 shows two new UEs, there may be more than two new UEs or fewer than two new UEs including no new UEs.

Modification of an SLPP session may be initiated by the anchor UE1 105A or a new anchor UE (e.g., voted on by the group member UEs of the SLPP positioning session, and having the anchor UE capabilities) to modify the members of the group. For example, the group members may be modified by adding one or more new UEs to the group, removing one or more existing UEs from the group, and/or changing the anchor UE of the group. In some embodiments, the newly added UE(s) may first receive the group address from the anchor UE, e.g., as described below for FIG. 16.

As illustrated in FIG. 15, at stage 1 of signal flow 1500, after determining modified members of the group, the anchor UE1 multicasts a modify group session request message to all the other current group member UEs indicating the address(es) of all the group member UEs to be included in the modified group (which can include both current group member UEs and new group member UEs) and identifying the anchor UE of the group (e.g., the existing anchor UE or a newly changed anchor UE). The modify group session request message may include the current SLPP session ID, a new SLPP session ID to be used for the modified SLPP session and/or a new SLPP UE ID for each of the modified group member UEs to be used for the modified SLPP session.

At stage 2, each of the other group member UEs multicasts (or unicasts) an acceptance (stage 2a) or a rejection (stage 2b) in response to receiving the modify group session request. In some embodiments, the acceptance or rejection includes the addresses of all the new group member UEs and identifies the anchor UE. In some embodiments, if a rejection is transmitted (e.g., as indicated in stage 2b of signal flow 1500) or if no response is transmitted, the member UE may be excluded from the modified group.

In an optional embodiment, the modify group session request is only sent at stage 2 to UEs that are to be included in the modified group session and is not sent to UEs that are to be excluded from the modified group session. In this embodiment, at stage 3, the anchor UE1 multicasts an SLPP session end request to all UEs that will be excluded from the modified group session or unicasts a separate SLPP session end request to each UE that will be excluded from the modified group session. Each UE that will be excluded from the modified group session then returns an SLPP session end accept to the anchor UE1 105A.

If there is at least one new UE to be added to the modified group session then, at stage 5, the anchor UE1 unicasts a SLPP session request to each of the new UEs (UEp and UEq in the example in FIG. 15). Each new UE then returns an SLPP session accept (stage 6a) or session reject (stage 6b) to the anchor UE1. A new UE that returns a session reject or does not respond is then not included in the modified session. Note that stages 5 and 6 are not performed for any new UE that requests to join the group session according to signal flow 1600 described next for FIG. 16, as signal flow 1600 makes stages 5 and 6 unnecessary for such a new UE.

At stage 7, the anchor UE1 performs a start session to start the modified SLPP group session. Starting may be as described for stages 7 and 8 in FIG. 11.

Figure 16:
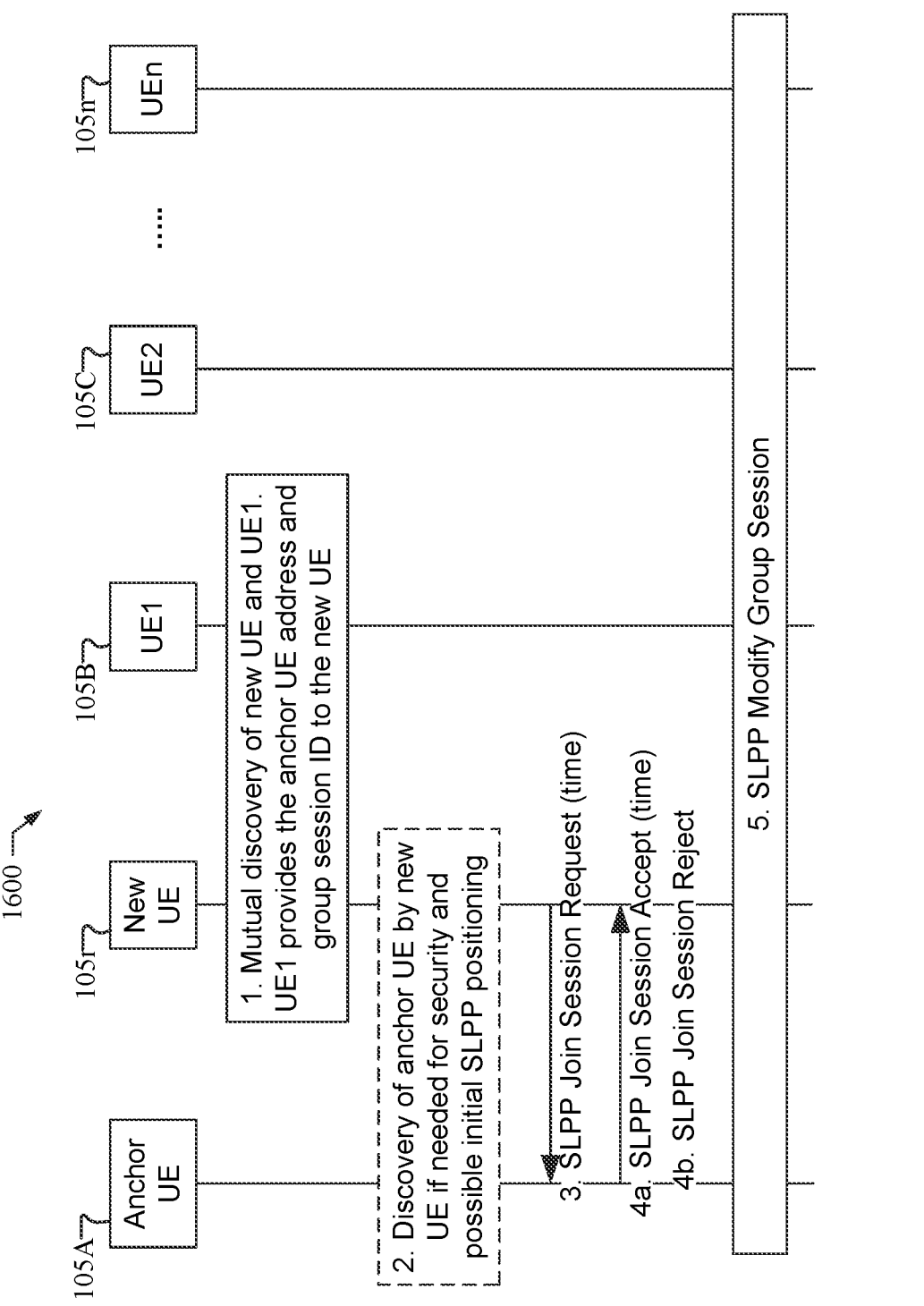
FIG. 16 is a signal flow illustrating the signal flow between UEs for joining a session for group mode sidelink positioning, according to an embodiment.

FIG. 16 is a signal flow 1600 illustrating the signaling between UEs for joining a group mode SLPP session, according to an embodiment. As illustrated in FIG. 16, at stage 1 of signal flow 1600, a mutual discovery may be performed by a new UE 105r (e.g., not currently being a group member UE) and a group member UE (e.g., UE1 as an example in FIG. 16). For example, the new UE 105r may discover the group member UE1 (or vice versa) and the group member UE1 may provide the new UE with the group session ID (e.g. an SLPP session ID) and the anchor UE address (e.g. level 2 address and/or application level address).

At stage 2 of signal flow 1600, the new UE 105r may go through a formal discovery procedure with the anchor UE based on the anchor UE address received at stage 1. In some embodiments, there may be some sidelink positioning session (e.g. as in FIG. 8) to enable both UEs to verify their range, bearing and speeds.

At stage 3 of signal flow 1600, the new UE 105r unicasts a join session request to the anchor UE.

At stage 4 of signal flow 1600, the anchor UE 105A may either accept (e.g., respond with an acceptance message as indicated in stage 4a) or reject (e.g., respond with a rejection message as indicated in stage 4b) the request. In some embodiments, the acceptance message includes details for the group mode sidelink positioning session (e.g. includes a level 2 group address and possibly addresses of other group member UEs).

At stage 5 of signal flow 1600, the anchor UE 105A may perform a modify group session as illustrated in FIG. 15 to collectively process all joining and/or leaving requests after a predetermined time period (e.g., after a few other UEs have requested to join or leave the group). The request and response sent at stages 3 and 4 may either or both include a time parameter that indicates a time when the anchor UE is expected to perform the modify group session at stage 5. For example, this may assist a new UE 105r to know when it will join the group session and may assist the anchor UE 105A by indicating how long the new UE can wait to join the group session.

Figure 17:
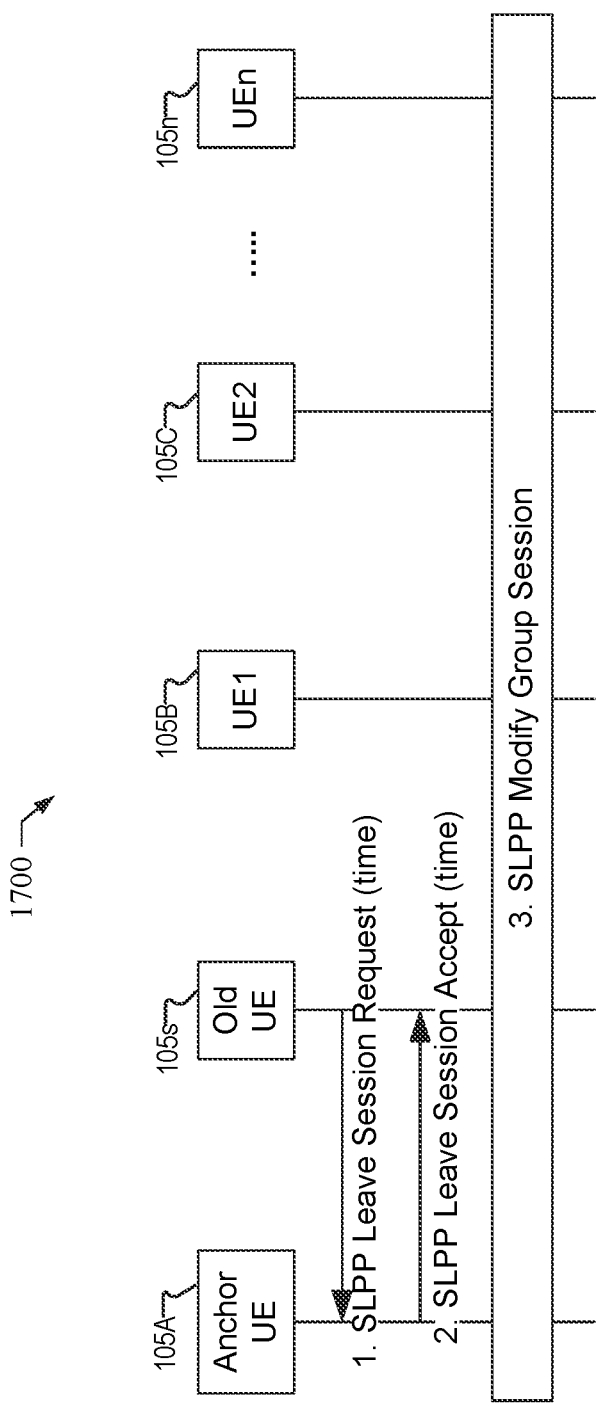
FIG. 17 is a signal flow illustrating the signaling between UEs for leaving a session for group mode sidelink positioning, according to an embodiment.

FIG. 17 is a signal flow 1700 illustrating the signaling between UEs for a leaving a group mode SLPP session according to an embodiment. When an existing group member UE 105s, referred as a "leaving UE", decides to leave the group session (e.g., if now distant from other group members), as illustrated in FIG. 17, at stage 1 of signal flow 1700, the leaving UE 105s unicasts a leave session request to the anchor UE 105A and may include a time at which leaving the session is requested to become effective.

At stage 2 of signal flow 1700, the anchor UE 105A returns an accept and may include a time that is the same as or different than the one proposed by the leaving UE 105s at stage 1, indicating a time at which leaving the session will become effective.

At stage 3 of signal flow 1700, the anchor UE 105A may perform a modify group session as illustrated in FIG. 15 to collectively process all joining and/or leaving requests after a predetermined time period (e.g., after a few other UEs have requested to join or leave the group). The time at which stage 3 will be performed may be included by the anchor UE 105A at stage 2.

In some embodiments, the leaving UE 105s may leave a group if an acceptance of the leaving request is not received from the anchor UE 105A or if the UE 105s is unable to receive other SLPP messages for the group mode sidelink positioning session from the anchor UE 105A. The anchor UE 105A can assume an existing group member UE has left after failing to receive SLPP measurement reports for a predetermined period of time from the existing group member UE.

Figure 18:
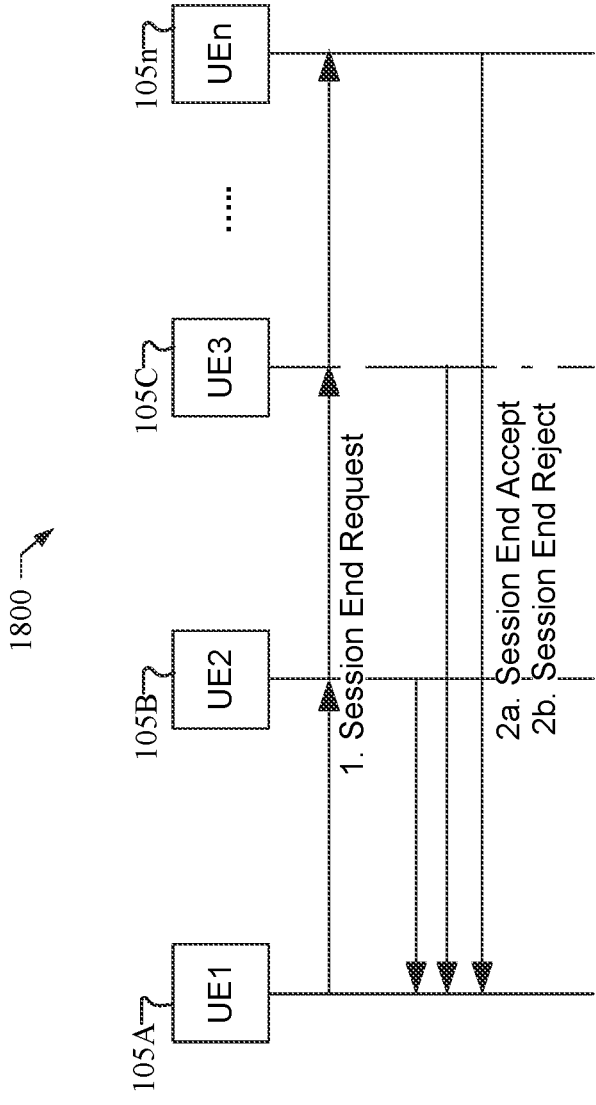
FIG. 18 is a signal flow illustrating the signaling between UEs for terminating a session for group mode sidelink positioning, according to an embodiment.

FIG. 18 is a signal flow 1800 illustrating the signaling between UEs for a terminating a group mode sidelink positioning session, according to an embodiment, and illustrates stage 5 in FIG. 12. When the anchor UE 105A decides to terminate the group mode sidelink positioning session (e.g., due to problems in exchanging SLPP messages with group members), as illustrated in FIG. 18, at stage 1 of signal flow 1800, the anchor UE 105A may multicast a request to all other UEs in the session terminate the group mode SLPP session.

At stage 2 of signal flow 1800, each of the other group member UEs may multicast an acceptance (e.g., as illustrated in stage 2a of signal flow 1800) or a rejection (e.g., as illustrated in stage 2b of signal flow 1800). For those UEs accepting the request, the accepting UEs leave the group mode sidelink positioning session. For those UEs rejecting the request, the rejecting UEs may remain group member UEs. In some embodiments, the rejecting UEs include in the rejection a vote for a new anchor UE. The UE with the most votes then performs a modify group session as illustrated in FIG. 15 if two or more UEs remain being group member UEs (e.g., rejected the request).

It is noted that SLPP messages transferred between UEs (e.g. in FIGS. 5, 7, 8, 9 and 11-18) may include a session identifier (ID) (also referred to as a session identity) to identify an SLPP session to UEs participating in the session which may enable these UEs to recognize SLPP messages applicable to the SLPP session. For example, an anchor UE may assign the session ID and provide the session ID to the other UEs participating in the SLPP session. Some SLPP messages shown as transferred between UEs for an SLPP session may be replaced in some embodiments by messages for a supplementary services protocol—e.g. a protocol defined in 3GPP Technical Specification (TS) 24.080. This may enable a greater number of parameters to be included which may not be possible or suitable for a positioning protocol like SLPP. As an example, the SLPP Session Request and Accept described for FIG. 9, the SLPP Start Group Session and its response described for FIG. 11 and the SLPP Modify Group Session request and response described for FIG. 15 might each be replaced by a similar message for a supplementary services protocol (which could also include an embedded SLPP message or messages).

The previous description (e.g. for FIGS. 11-18) has assumed that, in order to perform SL positioning for a group of UEs, a session or SLPP session is first established between all UEs in the group, or between all UEs in the group that accept the establishment of the session. The SL positioning is then performed by exchanging SLPP messages between UEs in the group where the SLPP messages belong to and are part of the session. However, establishing and later modifying and/or terminating an SLPP session requires exchanging additional SLPP messages to establish, modify and/or terminate the SLPP session that are not directly used for positioning. In addition, UEs that are not part of an SLPP session would be excluded from the positioning even though they might be nearby to the UEs that belong to the session and might usefully contribute to the SL positioning. In order to reduce the amount of SLPP signaling needed to perform SL positioning and allow all UEs that are nearby to one another to participate in SL positioning, an alternative sessionless mode of SLPP may be used where there no SLPP session between UEs participating in SL positioning. The sessionless mode of SLPP may also avoid the need for UEs to discover one another which can further reduce the amount of signaling and allow SL positioning to occur with reduced latency and allow a greater number of UEs to perform SL positioning with one another compared to using SLPP sessions. The sessionless mode of SLPP may be likened to having an SLPP session that includes all UEs and is permanently established with no need for any signaling for establishment or termination. A special reserved session ID could then be included in SLPP messages sent for the sessionless mode of SLPP that indicates sessionless mode.

Figure 19:
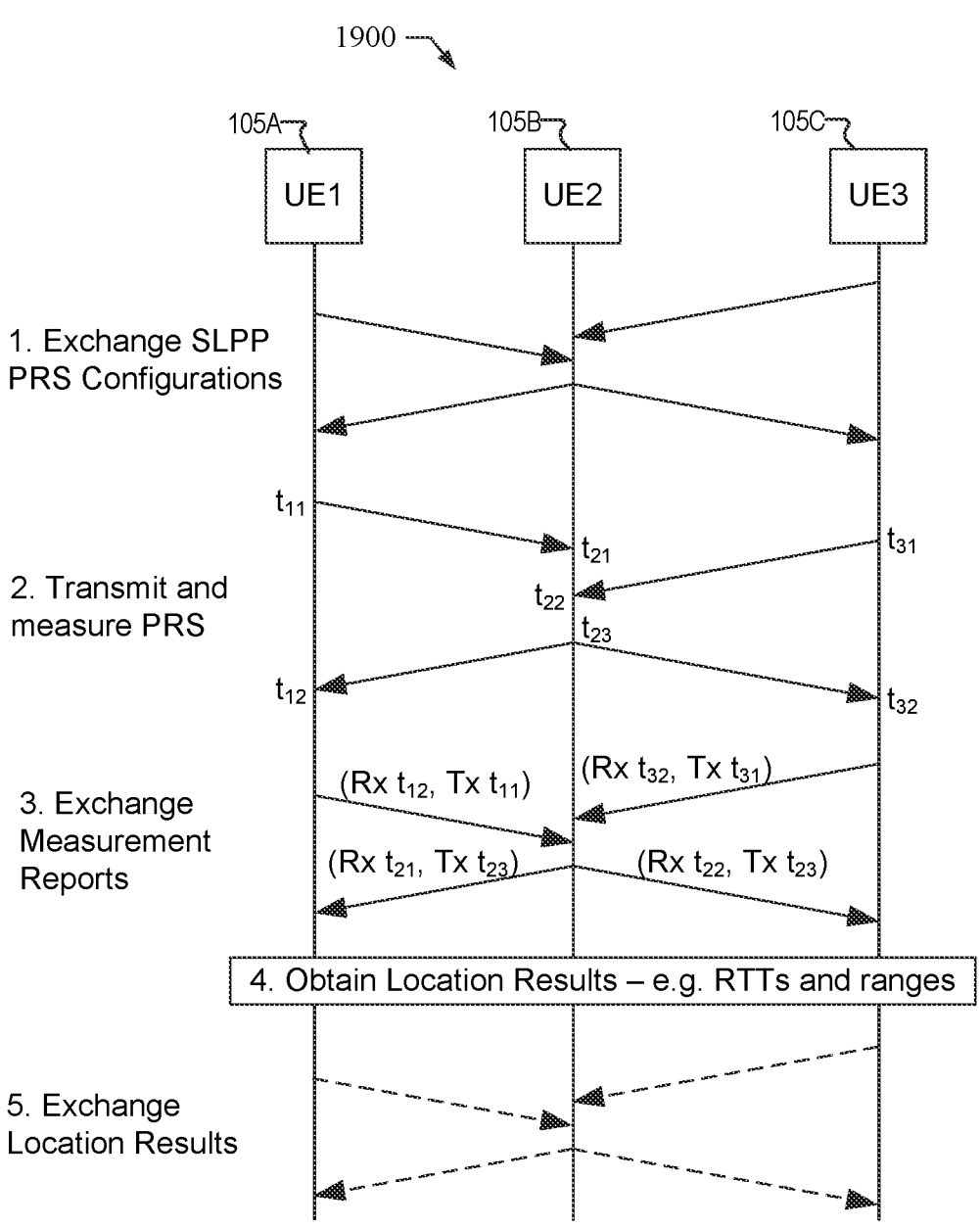
FIG. 19 is a signal flow illustrating the signaling between UEs for sessionless mode sidelink positioning, according to an embodiment.

FIG. 19 shows a signal flow 1900 illustrating SL positioning for a sessionless mode of SLPP, also referred to as broadcast mode sidelink positioning or non-session based sidelink positioning, for a plurality of UEs, illustrated as UE

105A, 105B, 105C sometimes collectively referred to as UEs 105. The UEs 105, for example, may be, e.g., the UEs illustrated in FIG. 1 and any of the UEs illustrated in group 210 shown in FIG. 2. The sidelink positioning illustrated in FIG. 19 can be independent of a network and thus, the UEs shown in FIG. 19 may be the out of coverage UEs in subgroup 216. The signaling performed in signal flow 1900 may be similar to or the same as the SLPP signaling discussed above in reference to FIG. 2. It is noted that while only three UEs 105 are shown in FIG. 19, the techniques shown in FIG. 19 may be performed by any number of two or more UEs 105 including hundreds or even thousands of UEs 105 (e.g. as for SL positioning for V2X on a busy highway or highways). In FIG. 19, it is unnecessary for the different UEs 105 to discover one another and no SLPP session may be established between any of the UEs 105. It is also noted that only some of the UEs 105 may be target UEs, though it is also possible that all UEs 105 are target UEs.

Each UE 105 shown in FIG. 19 may determine to perform SL positioning for the sessionless mode of SLPP based on receiving SLPP messages from other UEs (e.g. at stages 1 and 3 in FIG. 19) indicating sessionless mode SLPP positioning or based on a determination that a number of nearby UEs is too great to effectively support SLPP in session mode. Based on such a determination and as illustrated at stage 1 of signal flow 1900, each of UEs 105 broadcasts SLPP assistance data message(s). In some embodiments, the SLPP assistance data message sent by a UE includes a sidelink PRS configuration to be transmitted by the UE and expected times of sidelink PRS transmission from the UE (according to the sidelink PRS configuration) and optionally sidelink PRS configuration data received from other UEs 105. A sidelink PRS configuration may indicate a frequency range or band, a coding, a bandwidth, a duration of transmission, a periodicity of transmission and/or other parameters intended to be used by the sending UE 105 for SL PRS transmitted at stage 2. In some embodiments, a UE may indicate different transmission times and/or different (e.g. orthogonal) codes than other UEs. Different (e.g. orthogonal) codes may allow some simultaneous transmission by multiple UEs. In some embodiments, the SL PRS transmission times indicated in an SLPP assistance data message may be indicated using a common time (e.g., GNSS) or may be relative to a transmission time for the SLPP assistance data message. An SLPP assistance data message may also include a level 2 address and/or application level address of the sending UE 105. An SLPP assistance data message may be broadcast by a UE 105 to all other UEs 105 that are able to receive the message and may not be sent using unicast or multicast.

At stage 2 of signal flow 1900, each UE 105 broadcasts SL PRS according to the SL PRS configuration sent by the UE 105 at stage 1 (e.g., using Intelligent Transport Systems (ITS) spectrum, unlicensed spectrum or PLMN operator spectrum) and measures SL PRS being broadcast by other UEs. For example, the measurements may include one or more of a Received Signal Strength Indicator (RSSI), a round trip signal propagation time (RTT), a reference signal received power (RSRP), a reference signal received quality (RSRQ), an angle of arrival (AOA), an angle of departure (AOD), a time of arrival (TOA), a receive time-transmission time difference (Rx-Tx) and a reference signal time difference (RSTD). The measurements may be based on the sidelink PRS configurations and expected times of sidelink PRS transmissions received from other UEs at stage 1. Each UE may also record (e.g. timestamp) its own SL PRS transmission times and the times when SL PRS is received from other UEs as illustrated by the timestamps $t_{ij}$ (i, j=1, 2 or 3) in FIG. 19.

At stage 3 of signal flow 1900, each of the UEs 105 broadcasts SLPP measurement report message(s) containing measurements (e.g. of Rx-Tx) obtained at stage 2 for SL PRS received from other UEs 105 and/or containing the recorded timestamps. In some embodiments, an SLPP measurement report message sent by a UE 105 may include a revised SL PRS configuration corresponding to SL PRS already transmitted by the UE 105 at stage 2 and indicating the exact SL PRS configuration used by the UE 105 at stage 2. For example, while the UE 105 may already have sent an SL PRS configuration at stage 1 indicating the configuration intended to be used later at stage 2, the UE 105 may have changed this configuration due to SL PRS transmission from other UEs, interference or other RF conditions. For example, the UE 105 might have changed the bandwidth or exact time of PRS transmission(s).

UEs 105 which receive and measure SL PRS at stage 2 may identify SL PRS transmissions and determine which UE 105 sent any SL PRS transmission by matching a received and measured SL PRS configuration with an intended SL PRS configuration received at stage 1 or (preferably) a revised SL PRS configuration received at stage 3. For example, SL PRS frequency, bandwidth, coding, transmission duration and transmission times may be matched. Thus, as an example, if UE1 105A receives and measures SL PRS at stage 2 that has a particular SL PRS configuration and if UE2 105B (but no other UE) indicates at stage 1 or stage 3 the exact same SL PRS configuration is about to be transmitted or has already been transmitted, respectively, by UE2 105B, then UE1 105A may assume that the SL PRS that it received and measured was transmitted by UE2 105B and not by some other UE.

The SL PRS transmission times may be indicated using global times. Global times can be mappings from UE local time or may be UTC or GNSS times. An SLPP measurement report message may include a level 2 address and/or application level address of the sending UE 105 and a level 2 address and/or application level address for each UE 105 for which measurements of SL PRS are included in the SLPP measurement report message.

At stage 4, one or more of the UEs 105 (e.g. each of the UEs 105) determines location results for UEs 105 that are target UEs (e.g. which may be all of the UEs 105). The location results may include RTTs between pairs of UEs 105, a range between a target UE 105 and another UE 105; a direction to or from a target UE 105 from or to, respectively, another UE 105, a location of a target UE 105 relative to a location of another UE 105, a velocity of a target UE 105 relative to a velocity of another UE 105, an absolute location of a target UE 105, an absolute velocity of a target UE 105, or some combination thereof. The location results may be determined at stage 4 by any UE 105 based on one or more of the measurements and revised SL PRS configurations received from other UEs 105 in SLPP measurement report message(s) at stage 3, the SL PRS measurements obtained by the UE 105 at stage 2 and the revised SL PRS configuration for the UE 105 sent by the UE at stage 3.

At stage 5, the UEs 105 may optionally send location results obtained at stage 4 to other UEs 105. In that case, an SLPP message sent at stage 5 may include a level 2 address and/or application level address of the sending UE 105 and a level 2 address and/or application level address for each UE 105 for which location results are included.

Note that the SLPP messages sent at stages 1, 3 and 5 may be structured or partly structured as described for FIGS. 4A and 4B and may thus each include one or more of a session ID, a transaction ID, a sequence number (seq no) and an acknowledge (or acknowledgment) sequence number. The session ID may be a reserved value that indicates that the SLPP message is being used for SLPP sessionless mode. Alternatively, an SLPP header for each SLPP message may indicate sessionless mode in some other way—e.g. using a separate parameter or flag in an SLPP message header. It may be important that SLPP messages sent at stages 1, 3 and 5 indicate sessionless mode in order that receiving UEs can associate these SLPP messages with the procedure shown in FIG. 19 and can know that sessionless mode is being used by the other UEs.

In some embodiments for V2X support, when performing signal flow 1900, the broadcast of the SLPP assistance data at stage 1, the measurement report messages at stage 3 and location results at stage 5 may be transmitted on ITS spectrum while the SL PRS signals are transmitted in unlicensed spectrum. In some embodiments, UEs 105 may include level 2 addresses and application identities in SLPP messages to allow location measurements and locations to be associated with specific UEs which may be tracked over a period of time. The identities of the UEs 105 may correspond to identities of the UEs 105 used by these UEs 105 for other V2X communication. When there is congestion (e.g. as indicated to a UE 105 by a higher interference level and/or more detected SL PRS transmission from other UEs), UEs 105 can reduce the frequency of sending SLPP messages (e.g. at stages 1, 3, and 5) and the frequency or overall quantity of SL PRS transmission at stage 2.

In an open environment (e.g. for signal flow 1900), security establishment may not be performed. However, UEs 105 can still hide their global identities which may only be provided to certain other UEs after going through a PLMN controlled proximity services or VX security procedure or after authenticating a status of another UE (e.g. such as being a registered user or UE for ITS). In signal flow 1900, for example, each UE 105 may provide a temporary (e.g. application level) ID in SLPP messages sent at stages 1, 3 and 5 which may be used for the duration of a road trip by the UE 105 in the case of V2X and then changed for any new road trip. In signal flow 1900, UEs 105 may not exchange SLPP capabilities and resources. Instead a definition (e.g. in a 3GPP TS or ITS standard) could define a minimum core set of positioning capabilities which all UEs should support for participating in sessionless mode sidelink positioning.

When performing e.g., stage 1 of signal flow 1900, a common time reference may be established where UEs 105 may know accurately when to transmit SL PRS and when to perform SL PRS measurements.

In some embodiments, the common time reference may be established based on use of UTC or GPS/GNSS time assuming that all UEs 105 are able to obtain GNSS time from navigation signals received from a Global Navigation Satellite System (GNSS) like GPS, Galileo, GLONASS or Beidou.

In some other embodiments, the common time reference may be established based on use of RSUs with RSU times synchronized to one another and/or aligned with UTC/GNSS (e.g. where RSUs are able to obtain timing from a GNSS).

In some embodiments, the common time reference may be established based on use of per UE local timestamps. For example, a first UE may include timestamps in transmissions (e.g. at stage 1, stage 3 and/or stage 5 in signal flow 1900) indicating a first UE local time at which a particular part of any transmission from the first UE (e.g. a first bit or first octet of the transmission) was (or was to be) transmitted. A second UE may then calculate the real time difference (RTD) between its own local time and the local time indicated by the first UE. The RTD may equal the local time indicated by the first UE plus an estimated propagation delay from the first UE to the second UE minus the local time at the second UE at which the particular part of the transmission from the first UE is received. Alternatively, the RTD may be calculated as the negative of this addition and subtraction. In some cases, propagation delay between pairs of UEs may be ignored (i.e. assumed to be zero) in this addition and subtraction as propagation delay will normally be very small (e.g. less than 1 microsecond for most UE pairs for V2X). Each UE can then include timestamps and transmissions times according to that UE's own local time in SLPP messages that any other UE is able to convert to its own local time (by adding or subtracting the RTD between the pair of UEs).

In some embodiments, the common time reference may be established based on use of a group RTT procedure. For example, one source UE (at a time) multicasts or broadcasts an SLPP RTT request message to other UEs containing a local transmission time(stamp) for that UE. Each of the other UEs replies at different times with an RTT response message containing a local time (for the each UE) indicating the local time when the SLPP RTT request message was received and a local transmission time(stamp) (for the each UE) indicating the local time when the RTT response message was to be transmitted. The source UE then determines RTTs and RTDs to the other UEs. This may enable very accurate time synchronization and can be part of an SLPP RTT/AoA procedure to establish ranges and bearings. The procedure can be extended to all UEs by having one set of RTT requests first transmitted by all UEs followed by another set of RTT responses transmitted by all UEs, where each RTT response includes a local transmission time(stamp) and local receive times indicating when each of the RTT requests was received by the sending UE.

In some embodiments, the SL PRS measurements may be reported based on the common time reference. For example, each UE may maintain an accurate local time X for that UE with low time drift (e.g., may use RSUs/gNBs as a clock source). The UE may also maintain a separate common time reference T (e.g., based on GNSS/UTC) with lower accuracy (e.g. of about 10 μs). The common time reference T may be used to schedule SL PRS transmission and measurements and report (timestamp) when SL PRS was transmitted and when SL PRS was measured. UEs may also report TOA measurements and times of SL PRS transmission using the common time reference T. The accuracy for the common reference may be low (e.g., 10 μs error) but the precision and accuracy with respect to the local UE time X can be high. For example, assuming that a UE has a set of local transmission and receive times to report, e.g. X1, X2, X3, . . . Xn, the UE may convert these times to corresponding common times T1, T2, T3, . . . Tn via some fixed conversion algorithm (e.g., T=aX+b) that preserves the high precision of the local transmission and receive times. Accordingly, although the common times provide an accuracy of around e.g., 10 μs, the differences between the common times (e.g., for an RSTD or Rx-Tx) could be much more accurate as any common error in the common times T1, T2, T3, . . . Tn would be cancelled and removed due to using differences between the common times. This may assist other UEs to determine the source UE for SL PRS measurements and enable accurate Rx-Tx and RSTD calculations. Accordingly, this scheme can be used even when a UE has high error in its common time T.

The description of sidelink and SLPP positioning up until this point has either not indicated particular SLPP position methods or has assumed and made reference to positioning based on SL PRS transmission and measurement by participating UEs. However, the procedures for SL and SLPP positioning and associated architecture described here need not employ SL PRS transmission and measurement by participating UEs and can instead use other position methods. These may be Radio Access Technology (RAT) independent position methods in some embodiments. These other position methods may include: real time kinematic (RTK); transmission and measurement by participating UEs; transmission and measurement by participating UEs of WiFi signals, and transmission and measurement by participating UEs of ultra-wideband (UWB) signals. For example, when sidelink positioning of a plurality of UEs is performed using RTK, each UE in the plurality of UEs may measure and obtain carrier phase measurements of Global Navigation Satellite (GNSS) signals (e.g. for GPS, Galileo, GLONASS or Beidou). The carrier phase measurements obtained by the plurality of UEs may then be provided to at least one UE in the plurality of UEs, where the at least one UE determines location results for the plurality of UEs based on the carrier phase measurements obtained by the plurality of UEs. The use of RTK rather than SL PRS may have little or no impact on how SLPP sessions are established, modified and terminated in the case of FIGS. 11 to 18. However, it would no longer be necessary to send SL PRS configurations to other UEs either to be transmitted or measured and instead other assistance data could be sent to UEs such as configurations to be transmitted or measured for WiFi or UWB signals or details of GNSS signals to be measured (but not transmitted) for RTK. It would also no longer be necessary to transmit and measure SL PRS and instead either WiFi signals or UWB signals might be transmitted and measured, or, in the case of RTK, RTK signals might be measured (though not transmitted). These changes would require changes to stages 9-13 in FIG. 11, stages 3 and 4 in FIG. 14 and stages 1-4 in FIG. 19. With these changes, each of signal flows 1100, 1200, 1300, 1400, 1500, 1600, 1700, 1800 and 1900 may remain valid for these other position methods.

Figure 20:
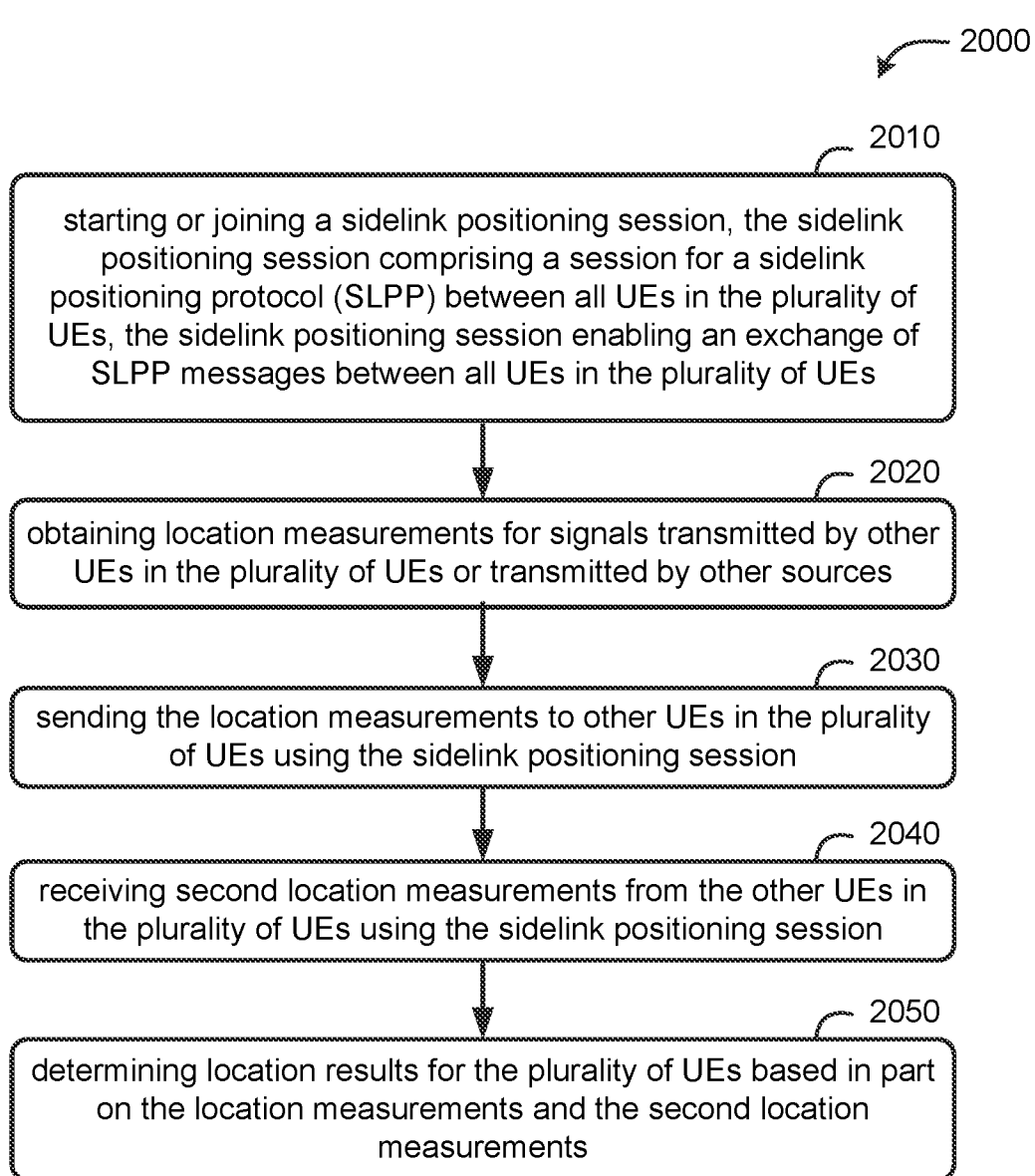
FIG. 20 is a flow diagram of a method of supporting sidelink positioning of a plurality of UEs, according to an embodiment.

FIG. 20 is a flow diagram of a method 2000 of supporting sidelink positioning of a plurality of UEs, according to an embodiment, and performed by a UE (e.g. a UE 105) in the plurality of UEs. The UE may comprise an anchor UE, coordinating UE or other UE, as described herein. Example components of a UE are provided hereafter with respect to FIG. 23 and FIG. 24.

Figure 23:
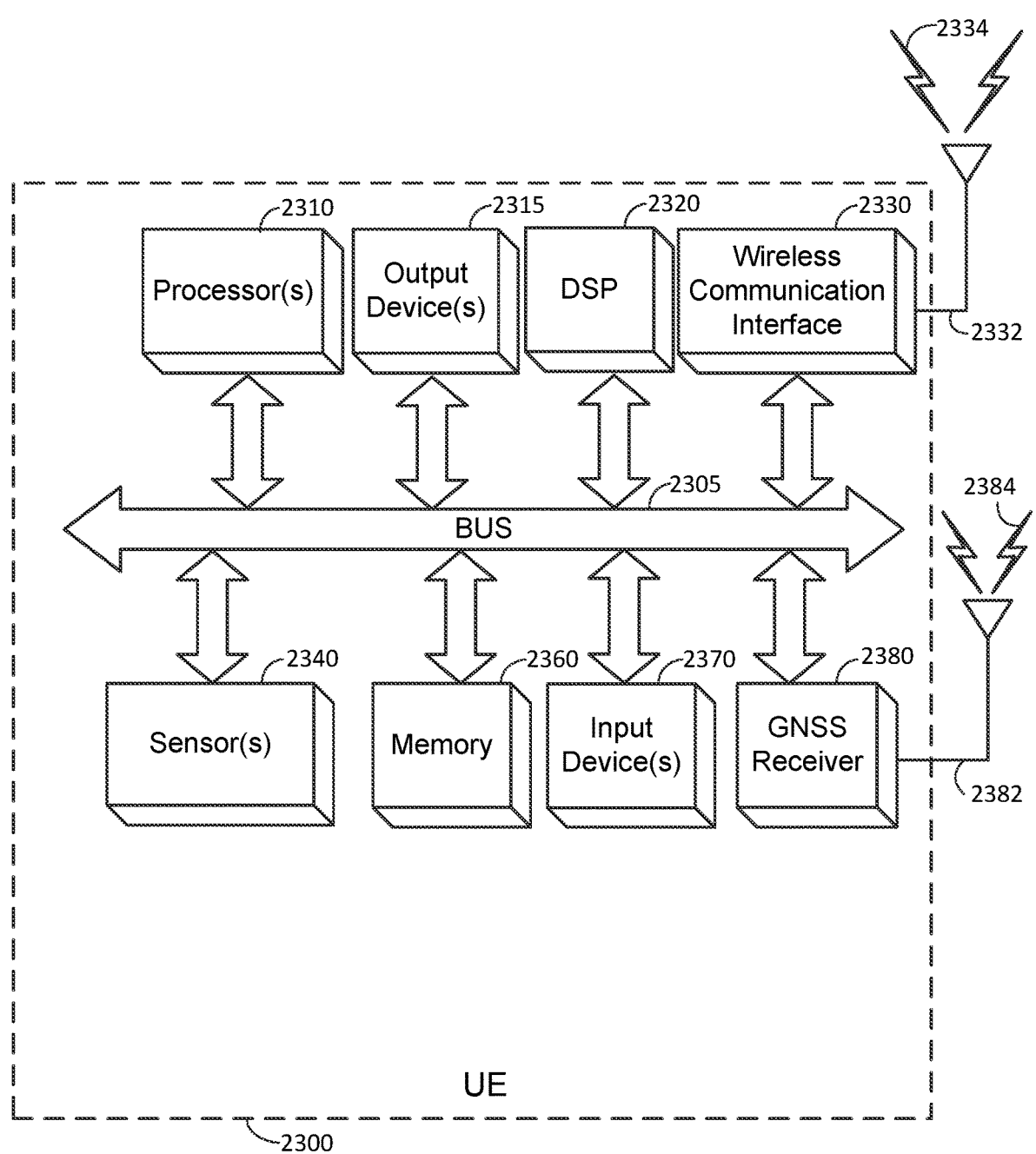
FIG. 23 is a block diagram of an embodiment of a UE, which can be utilized in embodiments as described herein.

At block 2010, the functionality comprises starting or joining a sidelink positioning session, the sidelink positioning session comprising a session for a sidelink positioning protocol (SLPP) between all UEs in the plurality of UEs, the sidelink positioning session enabling an exchange of SLPP messages between all UEs in the plurality of UEs. Means for performing functionality of block 2010 may comprise a bus 2305, processor(s) 2310, DSP 2320, wireless communication interface 2330, memory 2360, GNSS receiver 2380, and/or other components of a UE, as illustrated in FIG. 23.

At block 2020, the functionality comprises obtaining location measurements (e.g., measurements of Rx-Tx, RSTD, RSSI, RTT, RSRP, RSRQ, AOA, AOD, or Time of Arrival (ToA)) for signals transmitted by other UEs in the plurality of UEs or transmitted by other sources (e.g. GNSS SVs). Means for performing functionality of block 2020 may comprise a bus 2305, processor(s) 2310, DSP 2320, wireless communication interface 2330, memory 2360, GNSS receiver 2380, and/or other components of a UE, as illustrated in FIG. 23.

At block 2030, the functionality comprises sending the location measurements to other UEs in the plurality of UEs using the sidelink positioning session. Means for performing functionality of block 2030 may comprise a bus 2305, processor(s) 2310, DSP 2320, wireless communication interface 2330, memory 2360, GNSS receiver 2380, and/or other components of a UE, as illustrated in FIG. 23.

At block 2040, the functionality comprises receiving second location measurements from the other UEs in the plurality of UEs using the sidelink positioning session. Means for performing functionality of block 2040 may comprise a bus 2305, processor(s) 2310, DSP 2320, wireless communication interface 2330, memory 2360, GNSS receiver 2380, and/or other components of a UE, as illustrated in FIG. 23.

At block 2050, the functionality comprises determining location results for the plurality of UEs based in part on the location measurements and the second location measurements. Means for performing functionality of block 2050 may comprise a bus 2305, processor(s) 2310, DSP 2320, wireless communication interface 2330, memory 2360, GNSS receiver 2380, and/or other components of a UE, as illustrated in FIG. 23.

In some embodiments, the location measurements and the second location measurements each comprise Radio Access Technology (RAT) independent location measurements, RAT dependent location measurements, or both.

In some embodiments, the RAT independent location measurements comprise at least one of: a GNSS carrier phase measurement, a GNSS code phase measurement, a sensor measurement, or some combination of these.

In some embodiments, the RAT dependent location measurements comprise a measurement of a first sidelink PRS occasion transmitted by another UE in the plurality of UEs.

In some embodiments, the method 2000 further includes transmitting a second sidelink PRS occasion. The second location measurements may comprise measurements of the second sidelink PRS occasion obtained by the other UEs in the plurality or UEs.

In some embodiments, the method 2000 further includes receiving the first sidelink PRS occasion, wherein obtaining the location measurements comprises measuring the first sidelink PRS occasion.

In some embodiments, the method 2000 further includes obtaining PRS configurations, the PRS configurations including a PRS configuration for at least the first sideline PRS occasion or the second sidelink PRS occasion.

In some embodiments, the method 2000 further includes sending a session request message to each UE in a second plurality of UEs, the second plurality of UEs including the other UEs in the plurality of UEs, receiving a session response message from each UE in the second plurality of UEs, wherein the session response message comprises a session accept message when the each UE agrees to join the sidelink positioning session, wherein the session response message comprises a session reject message when the each UE does not agree to join the sidelink positioning session, and including the each UE in the second plurality of UEs in the sidelink positioning session when a session accept message is received from the each UE.

In some embodiments, the method 2000 further includes discovering the each UE in the second plurality of UEs, receiving an indication from the each UE in the second plurality of UEs that the each UE supports sidelink positioning, and sending the session request message to the each UE in the second plurality of UEs at least partly in response to receiving the indication that the each UE supports sidelink positioning.

In some embodiments, when method 2000 is performed for group mode sidelink positioning, the method further includes including a group address in the session request message sent to each UE in the second plurality of UEs, receiving the session accept message from each of the other UEs in the plurality of UEs, receiving the session reject message or no session response message from all UEs in the second plurality of UEs that are not part of the plurality of UEs, and sending a start group session message using sidelink multicasting to the other UEs in the plurality of UEs using the group address, wherein the start group session message includes at least one address or identity for each of the other UEs in the plurality of UEs.

In some embodiments, method 2000 further includes receiving a start group session acknowledge message using sidelink unicast or sidelink multicast from each of the other UEs in the plurality of UEs, where the start group session acknowledge message acknowledges receipt of the start group session message.

In some embodiments, the start group session acknowledge message is received from each of the other UEs in the plurality of UEs using sidelink multicast based on the group address, wherein the start group session acknowledge message includes the at least one address or identity for each of the other UEs in the plurality of UEs.

In some embodiments, when the method 2000 is performed for group mode sidelink positioning, the method 2000 further include restarting the sidelink positioning session with a third plurality of UEs including the UE, wherein the restarting the sidelink positioning session adds additional UEs to the sidelink positioning session, removes existing UEs from the sidelink positioning session, or both, wherein the third plurality of UEs includes the additional UEs when the additional UEs are added, excludes the existing UEs when the existing UEs are removed, and includes the plurality of UEs except for the existing UEs.

In some embodiments, when the method 2000 is performed for group mode sidelink positioning, the method 2000 further includes discovering each of the additional UEs when the additional UEs are added, receiving an indication of support of sidelink positioning from each of the additional UEs when the additional UEs are added, sending a session request message comprising the group address to each of the additional UEs when the additional UEs are added, receiving a session accept message from each of the additional UEs when the additional UEs are added, and sending a start group session message using sidelink multicasting to other UEs in the third plurality of UEs using the group address, wherein the start group session message includes at least one address or identity for each of the other UEs in the third plurality of UEs.

In some embodiments, when the method 2000 is performed for group mode sidelink positioning, the method 2000 further includes receiving a start group session acknowledge message using sidelink unicast or multicast from each of the other UEs in the third plurality of UEs, wherein the start group session acknowledge message acknowledges receipt of the start group session message.

In some embodiments, when the method 2000 is performed for group mode sidelink positioning, the start group session acknowledge message is received from each of the other UEs in the third plurality of UEs using sidelink multicast based on the group address, wherein the start group session acknowledge message includes the at least one address or identity for each of the other UEs in the third plurality of UEs.

In some embodiments, when the method 2000 is performed for group mode sidelink positioning, a session Accept message received from a UE in the second plurality of UEs comprises addresses of additional UEs. Method 2000 further includes sending a session request message to at least one UE of the additional UEs based on an address of the at least one UE in the Session Accept message, receiving a session response message from the at least one UE, wherein the session response message comprises a session accept message when the at least one UE agrees to join the sidelink positioning session, wherein the session response message comprises a session reject message when the at least one UE does not agree to join the sidelink positioning session, and including the at least one UE in the sidelink positioning session when the session accept message is received.

In some embodiments, when the method 2000 is performed for group mode sidelink positioning, a Session Reject message received from a UE in the second plurality of UEs comprises an indication of at least one other sidelink positioning session, the method further comprising: joining the at least one other sidelink positioning session.

In some embodiments, when the method 2000 is performed for group mode sidelink positioning, the method 2000 further includes modifying the sidelink positioning session, wherein modifying the sidelink positioning session comprises: identifying additional UEs to be added to the sidelink positioning session, identifying first UEs in the plurality of UEs to be removed from the sidelink positioning session, identifying second UEs in the plurality of UEs to be retained in the sidelink positioning session, sending a modify group session request message using sidelink multicasting to the second UEs and optionally to the first UEs in the plurality of UEs, and sending a session request message using sidelink multicasting to a first subset of the additional UEs, wherein the modify group session request message includes at least one address or identity for each of the second UEs in the plurality of UEs, wherein the first subset of the additional UEs excludes a second subset of the additional UEs comprising UEs that previously requested to join the sidelink positioning session and were accepted for the sidelink positioning session.

In some embodiments, when the method 2000 is performed for group mode sidelink positioning, modifying the sidelink positioning session further comprises: (i) receiving a modify group session response message from each of the second UEs in the plurality of UEs, wherein the modify group session response message comprises a modify group session accept message when a UE agrees to join the modified sidelink positioning session, wherein the modify group session response message comprises a modify group session reject message when a UE does not agree to join the modified sidelink positioning session; (ii) receiving a session response message from each of the first subset of the additional UEs, wherein the session response message comprises a session accept message when a UE agrees to join the modified sidelink positioning session, wherein the session response message comprises a session reject message when a UE does not agree to join the modified sidelink positioning session; (iii) identifying a third plurality of UEs to be included in the modified sidelink positioning session, wherein the third plurality of UEs comprises second UEs in the plurality of UEs from which a modify group session accept message is received, UEs in the first subset of the additional UEs from which a session accept message is received, and UEs in the second subset of the additional UEs; (iv) sending a start group session message using sidelink multicasting to the third plurality of UEs using the group address, wherein the start group session message includes at least one address or identity for each UE in the third plurality of UEs; and (v) receiving a start group session acknowledge message using sidelink unicast or multicast from each UE in the third plurality of UEs, wherein the start group session acknowledge message acknowledges receipt of the start group session message.

In some embodiments, when method 2000 is performed for group mode sidelink positioning, identifying the second subset of the additional UEs to be added to the sidelink positioning session comprises: receiving a request to join the sidelink positioning session using sidelink unicast from each UE in the second subset of the additional UEs, and sending a response to the each UE in the second subset of the additional UEs using sidelink unicast indicating the each UE in the second subset of the additional UEs may join the sidelink positioning session.

In some embodiments, when the method 2000 is performed for group mode sidelink positioning, identifying the first UEs to be removed from the sidelink positioning session comprises: receiving a request to leave the sidelink positioning session using sidelink unicast from each UE in the first UEs, and sending a response to the each UE in the first UEs using sidelink unicast indicating the each UE in the first UEs may leave the sidelink positioning session.

Figure 21:
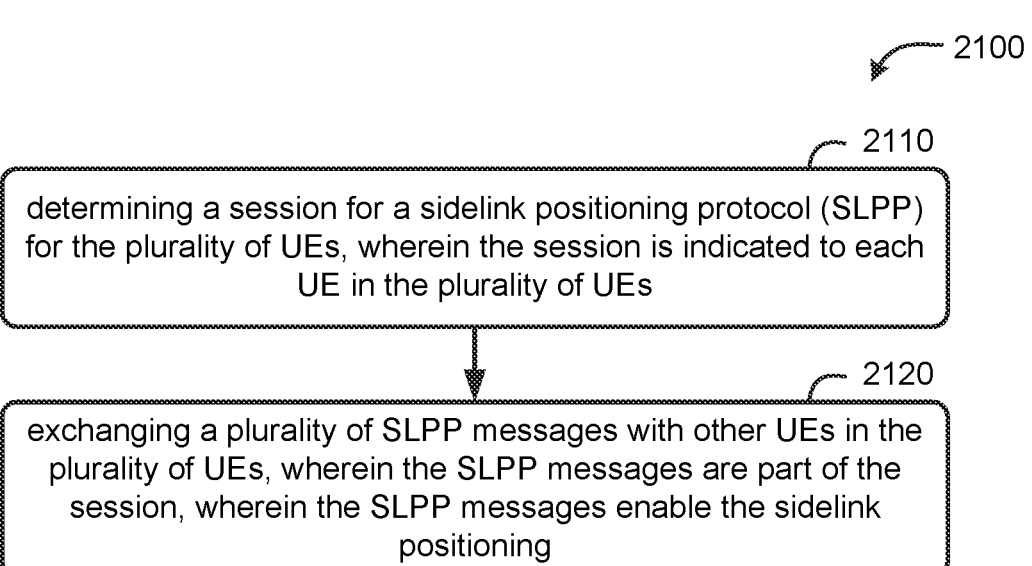
FIG. 21 is a flow diagram of a method of supporting sidelink positioning of a plurality of UEs using an SLPP session, according to an embodiment.

FIG. 21 is a flow diagram of a method 2100 of supporting sidelink positioning of a plurality of UEs (e.g. UEs 105), and performed by a UE in the plurality of UEs, according to an embodiment. Example components of a UE are provided hereafter with respect to FIG. 23 and FIG. 24.

At block 2110, the functionality comprises determining a session for a sidelink positioning protocol (SLPP) for the plurality of UEs, wherein the session is indicated to each UE in the plurality of UEs, e.g. as described for stages 4 to 6 in FIG. 11.

Means for performing functionality of block 2110 may comprise a bus 2305, processor(s) 2310, DSP 2320, wireless communication interface 2330, memory 2360, GNSS receiver 2380, and/or other components of a UE, as illustrated in FIG. 23.

At block 2120, the functionality comprises exchanging a plurality of SLPP messages with other UEs in the plurality of UEs, wherein the SLPP messages are part of the session, wherein the SLPP messages enable the sidelink positioning, e.g. as described for stages 7 to 13 in FIG. 11.

Means for performing functionality of block 2120 may comprise a bus 2305, processor(s) 2310, DSP 2320, wireless communication interface 2330, memory 2360, GNSS receiver 2380, and/or other components of a UE, as illustrated in FIG. 23.

In some embodiments, the method 2100 further comprises: obtaining location results for at least two target UEs in the plurality of UEs, wherein the location results comprise at least one of: a range between each target UE and another UE in the plurality of UEs; a direction to or from the each target UE from or to, respectively, another UE in the plurality of UEs; a location of the each target UE relative to a location of another UE in the plurality of UEs; a velocity of the each target UE relative to a velocity of another UE in the plurality of UEs; an absolute location of the each target UE; an absolute velocity of the each target UE; or some combination thereof.

In some embodiments, the plurality of SLPP messages includes at least one SLPP message sent by a sending UE to a receiving UE or receiving group of UEs, wherein the UE is either the sending UE, the receiving UE or part of the receiving group of UEs, wherein the at least one SLPP message comprises: SLPP capabilities of the sending UE; a request for SLPP capabilities of the receiving UE or receiving group of UEs; SLPP assistance data to assist the receiving UE or receiving group of UEs to transmit or measure positioning related signals; a request for SLPP assistance data from the receiving UE to assist the sending UE to transmit or measure positioning related signals; a request for measurements or some of the location results or both obtained by the receiving UE or receiving group of UEs; measurements or some of the location results or both obtained by the sending UE; or some combination of these.

In some embodiments, the method 2100 further comprises: discovering each of the other UEs in the plurality of UEs; receiving an indication from each of the other UEs in the plurality of UEs that the each of the other UEs supports SLPP; and determining to initiate the session based on a service request received from a network entity or a configuration of the UE, e.g. as described for stages 1 and 4 in FIG. 11.

In some embodiments, the method 2100 further comprises: sending a first SLPP message to each of the other UEs in the plurality of UEs comprising a request for the each UE to join the session; and receiving a second SLPP message from each of the other UEs in the plurality of UEs indicating acceptance or rejection of the request, e.g. as described for stages 4 and 5 in FIG. 11.

In some embodiments, the method 2100 further comprises including in the first SLPP message at least one of: a level 2 group address of the plurality of UEs, an SLPP session ID, or both of these.

In some embodiments, the method 2100 further comprises: sending a third SLPP message to each of the other UEs in the plurality of UEs, wherein the third SLPP message starts or restarts the SLPP session, e.g. as described for stage 7 in FIG. 11.

In some embodiments, the method 2100 further comprises including in the third SLPP message at least one of: an application level ID for each UE of the plurality of UEs, an SLPP UE ID for each UE of the plurality of UEs, a group ciphering key for the plurality of UEs, or some combination of these.

In some embodiments, the method 2100 further comprises sending a first SLPP message to at least one UE in the plurality of UEs to terminate the session at the at least one UE, e.g. as described for stage 14 in FIG. 11.

In some embodiments, the method 2100 further comprises: sending a first SLPP message to each UE except the UE in a second plurality of UEs, wherein the second plurality of UEs comprises the UE and at least some of the other UEs in the plurality of UEs, wherein the first SLPP message comprises a request for the each UE to join a modified session; sending a second SLPP message to each UE in a third plurality of UEs when the third plurality of UEs contains at least one UE, wherein the third plurality of UEs contain UEs not in the plurality of UEs, wherein the second SLPP message comprises a request for the each UE to join the modified session; receiving a third SLPP message from the each UE in the second plurality of UEs, indicating whether the each UE accepts or rejects the request; receiving a fourth SLPP message from the each UE in the third plurality of UEs when the third plurality of UEs contains at least one UE, indicating whether the each UE accepts or rejects the request; and sending a fifth SLPP message to each UE except the UE in the plurality of UEs that is not in the second plurality of UEs indicating that the session is terminated at the each UE, e.g. as discussed for FIG. 15. In these embodiments, the method 2100 may further comprise sending a sixth SLPP message to each UE in the second plurality of UEs and the third plurality of UEs when the each UE accepts the request for the each UE to join the modified session, wherein the sixth SLPP message starts the modified session, e.g. as discussed for FIG. 15. In some of these embodiments, the third plurality of UEs may contain no UEs.

In some embodiments, the method 2100 further comprises: receiving a first SLPP message from a second UE in the plurality of UEs comprising a request for the UE to join, terminate, start, modify, or leave the session or for the second UE to join the session; and sending a second SLPP message to the second UE when the first SLPP message comprises the request for the UE to join or modify the session or the request for the second UE to join the session, where the second SLPP message indicates an acceptance or rejection of the request, e.g. as described for stages 4, 5, 7 and 8 of FIG. 11, stages 1 and 2 of FIG. 15, stages 3 and 4 of FIG. 16, stages 1 and 2 of FIG. 17 and stages 1 and 2 of FIG. 18.

In some embodiments, each SLPP message in the plurality of SLPP messages includes at least one of: an SLPP session ID; an SLPP transaction ID; a level 2 address of a UE sending the SLPP message; a level 2 address of a UE or a group of UEs receiving the SLPP message; information for one or more UEs of the plurality of UEs, wherein the information includes an SLPP UE ID for each UE in the one or more UEs of the plurality of UEs; or some combination of these, e.g. as discussed for FIGS. 4A and 4B and stages 7 and 8 of FIG. 11.

In some embodiments, the sidelink positioning of the plurality of UEs is performed using at least one of: transmission and measurement of sidelink positioning reference signals (SL PRS), real time kinematic (RTK), transmission and measurement of WiFi signals, transmission and measurement of ultra-wideband (UWB) signals, or some combination of these, e.g. as discussed above following the description of FIG. 19.

In some embodiments, the sidelink positioning of the plurality of UEs is performed using RTK, wherein each UE in the plurality of UEs obtains carrier phase measurements of Global Navigation Satellite (GNSS) signals, wherein the carrier phase measurements obtained by the plurality of UEs are provided to at least one UE in the plurality of UEs, wherein the at least one UE determines location results for the plurality of UEs based on the carrier phase measurements obtained by the plurality of UEs.

In some embodiments, the sidelink positioning of the plurality of UEs is performed using transmission and measurement of SL PRS and the method 2100 may then further comprise: (i) obtaining an SL PRS transmission configuration for each UE in the plurality of UEs; (ii) obtaining SL PRS measurements for the other UEs in the plurality of UEs based on the SL PRS transmission configurations for the other UEs; (iii) transmitting SL PRS based on the SL PRS transmission configuration for the UE; and (iv) performing at least one of: sending the obtained SL PRS measurements to at least one other UE in the plurality of UEs, or receiving obtained SL PRS measurements from at least one other UE in the plurality of UEs, or both of these, wherein the obtained SL PRS measurements enable determination of location results for the target UEs, e.g. as described for FIGS. 7 and 11. The SL PRS measurements may comprise at least one of: a receive time-transmission time difference (Rx-Tx), a reference signal time difference (RSTD), a round trip signal propagation time (RTT), a reference signal received power, a reference signal received quality, an angle of arrival, or some combination of these.

FIG. 22 is a flow diagram of a method 2200 of supporting sidelink positioning of a plurality of UEs (e.g. UEs 105) and performed by a UE in the plurality of UEs, according to an embodiment. Example components of a UE are provided hereafter with respect to FIG. 23 and FIG. 24.

At block 2210, the functionality comprises determining to perform sidelink positioning of the plurality of UEs, wherein there is no discovery between the UE and at least some of the other UEs in the plurality of UEs, e.g. as discussed for FIG. 19.

Means for performing functionality of block 2210 may comprise a bus 2305, processor(s) 2310, DSP 2320, wireless communication interface 2330, memory 2360, GNSS receiver 2380, and/or other components of a UE, as illustrated in FIG. 23.

At block 2220, the functionality comprises exchanging a plurality of SLPP messages with other UEs in the plurality of UEs using broadcast or groupcast, wherein the SLPP messages are not part of a session, wherein the SLPP messages enable the sidelink positioning, e.g. as discussed for FIG. 19.

Means for performing functionality of block 2220 may comprise a bus 2305, processor(s) 2310, DSP 2320, wireless communication interface 2330, memory 2360, GNSS receiver 2380, and/or other components of a UE, as illustrated in FIG. 23.

In some embodiments, performing the sidelink positioning comprises obtaining location results for at least two target UEs in the plurality of UEs, wherein the location results comprise at least one of: a range between each target UE and another UE in the plurality of UEs; a direction to or from the each target UE from or to, respectively, another UE in the plurality of UEs; a location of the each target UE relative to a location of another UE in the plurality of UEs; a velocity of the each target UE relative to a velocity of another UE in the plurality of UEs; an absolute location of the each target UE; an absolute velocity of the each target UE; or some combination thereof, e.g. as discussed for stage 4 of FIG. 19.

In some embodiments, the plurality of SLPP messages includes at least one SLPP message sent by a sending UE to other UEs in the plurality of UEs, wherein the UE is either the sending UE or one of the other UEs, wherein the at least one SLPP message comprises: SLPP assistance data to assist the other UEs to transmit or measure positioning related signals; measurements or some of the location results or both obtained by the sending UE; a level 2 address of the sending UE; an application level address of the sending UE; or some combination of these, e.g. as described for FIG. 19.

In some embodiments, the sidelink positioning of the plurality of UEs is performed using at least one of: transmission and measurement of sidelink positioning reference signals (SL PRS); real time kinematic (RTK); transmission and measurement of WiFi signals; transmission and measurement of ultra-wideband (UBW) signals; or some combination of these, e.g. as described above following the description for FIG. 19.

In some embodiments, the sidelink positioning of the plurality of UEs is performed using RTK, wherein each UE in the plurality of UEs obtains carrier phase measurements of Global Navigation Satellite (GNSS) signals, wherein the carrier phase measurements obtained by the plurality of UEs are provided to at least one UE in the plurality of UEs, wherein the at least one UE in the plurality of UEs determines location results for some of the target UEs in the plurality of UEs based on the carrier phase measurements obtained by the plurality of UEs.

In some embodiments, the sidelink positioning of the plurality of UEs is performed using transmission and measurement of SL PRS and the method 2200 may then further comprise: receiving SL PRS transmission configurations from other UEs in the plurality of UEs; obtaining SL PRS measurements for the other UEs in the plurality of UEs based on the SL PRS transmission configurations; receiving revised SL PRS transmission configurations from the other UEs in the plurality of UEs, wherein the revised SL PRS transmission configurations correspond to SL PRS transmitted by the other UEs; sending the obtained SL PRS measurements for the other UEs to the other UEs in the plurality of UEs; transmitting SL PRS based on an SL PRS transmission configuration for the UE; sending the SL PRS transmission configuration for the UE to other UEs in the plurality of UEs prior to the transmitting SL PRS; sending a revised SL PRS transmission configuration for the UE to the other UEs in the plurality of UEs after transmitting SL PRS, wherein the revised SL PRS transmission configuration corresponds to the transmitted SL PRS; receiving SL PRS measurements obtained by the other UEs in the plurality of UEs; and determining location results for some of the target UEs based on at least one of the obtained SL PRS measurements for the other UEs, the revised SL PRS transmission configurations for the other UEs in the plurality of UEs, the SL PRS measurements obtained by the other UEs in the plurality of UEs, and the revised SL PRS transmission configuration for the UE, e.g. as discussed for FIG. 19. In some embodiments, the SL PRS measurements comprise at least one of: a receive time-transmission time difference (Rx-Tx), a reference signal time difference (RSTD), round trip signal propagation time (RTT), a reference signal received power, a reference signal received quality, an angle of arrival, or some combination of these.

FIG. 23 is a block diagram of an embodiment of a UE 2300, which can be utilized as described herein above (e.g., in association with the previously-described figures, with respect to a UE 105, a receiving device/UE, target UE, coordinating UE, etc.). It should be noted that FIG. 23 is meant only to provide a generalized illustration of various components, any or all of which may be utilized as appropriate. Furthermore, the functionality of any UE (e.g. UE 105) discussed herein may be executed by one or more of the hardware and/or software components illustrated in FIG. 23.

The UE 2300 is shown comprising hardware elements that can be electrically coupled via a bus 2305 (or may otherwise be in communication, as appropriate). The hardware elements may include a processor(s) 2310 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 2310 may comprise one or more processing units, which may be housed in a single integrated circuit (IC) or multiple ICs. As shown in FIG. 23, some embodiments may have a separate DSP 2320, depending on desired functionality. Location determination and/or other determinations based on wireless communication may be provided in the processor(s) 2310 and/or wireless communication interface 2330 (discussed below). The UE 2300 also can include one or more input devices 2370, which can include without limitation one or more keyboards, touch screens, touch pads, microphones, buttons, dials, switches, and/or the like; and one or more output devices 2315, which can include without limitation one or more displays (e.g., touch screens), light emitting diodes (LEDs), speakers, and/or the like.

The UE 2300 may also include a wireless communication interface 2330, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 2300 to communicate with other devices as described in the embodiments above. The wireless communication interface 2330 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 2332 that send and/or receive wireless signals 2334. According to some embodiments, the wireless communication antenna(s) 2332 may comprise a plurality of discrete antennas, antenna arrays, or any combination thereof. The antenna(s) 2332 may be capable of transmitting and receiving wireless signals using beams (e.g., Tx beams and Rx beams). Beam formation may be performed using digital and/or analog beam formation techniques, with respective digital and/or analog circuitry. The wireless communication interface 2330 may include such circuitry.

Depending on desired functionality, the wireless communication interface 2330 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 2300 may communicate with different data networks that may comprise various network types. For example, one such network type may comprise a wireless wide area network (WWAN), which may be a code-division multiple access (CDMA) network, a time division multiple access (TDMA) network, a frequency division multiple access (FDMA) network, an orthogonal frequency division multiple access (OFDMA) network, a single-carrier frequency division multiple access (SC-FDMA) network, a WiMAX (IEEE 802.16) network, and so on. A CDMA network may implement one or more radio access technologies (RATs) such as CDMA2000®, wideband code division multiple access (WCDMA), and so on. CDMA2000® includes IS-95, IS-2000 and/or IS-856 standards. A TDMA network may implement global system for mobile communications (GSM), digital advanced mobile phone system (D-AMPS), or some other RAT. An OFDMA network may employ long-term evolution (LTE), LTE Advanced, fifth-generation (5G) new radio (NR), and so on. 5G NR, LTE, LTE Advanced, GSM, and WCDMA are described in documents from 3rd Generation Partnership Project (3GPP). CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 2300 can further include sensor(s) 2340. Sensor(s) 2340 may comprise, without limitation, one or more inertial sensors and/or other sensors (e.g., accelerometer(s), gyro scope(s), camera(s), magnetometer(s), altimeter(s), microphone(s), proximity sensor(s), light sensor(s), barometer(s), and the like), some of which may be used to obtain position-related measurements and/or other information.

Embodiments of the UE 2300 may also include a Global Navigation Satellite System (GNSS) receiver 2380 capable of receiving signals 2384 from one or more GNSS satellites using an antenna 2382 (which could be the same as antenna 2332). Positioning based on GNSS signal measurement can be utilized to complement and/or incorporate the techniques described herein. The GNSS receiver 2380 can extract a position of the UE 2300, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 2380 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 2380 is illustrated in FIG. 23 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 2310, DSP 2320, and/or a processor within the wireless communication interface 2330 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 2310 or DSP 2320.

The UE 2300 may further include and/or be in communication with a memory 2360. The memory 2360 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 2360 of the UE 2300 also can comprise software elements (not shown in FIG. 23), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 2360 that are executable by the UE 2300 (and/or processor(s) 2310 or DSP 2320 within UE 2300). In some embodiments, then, such code and/or instructions can be used to configure and/or adapt a general-purpose computer (or other device) to perform one or more operations in accordance with the described methods.

Figure 24:
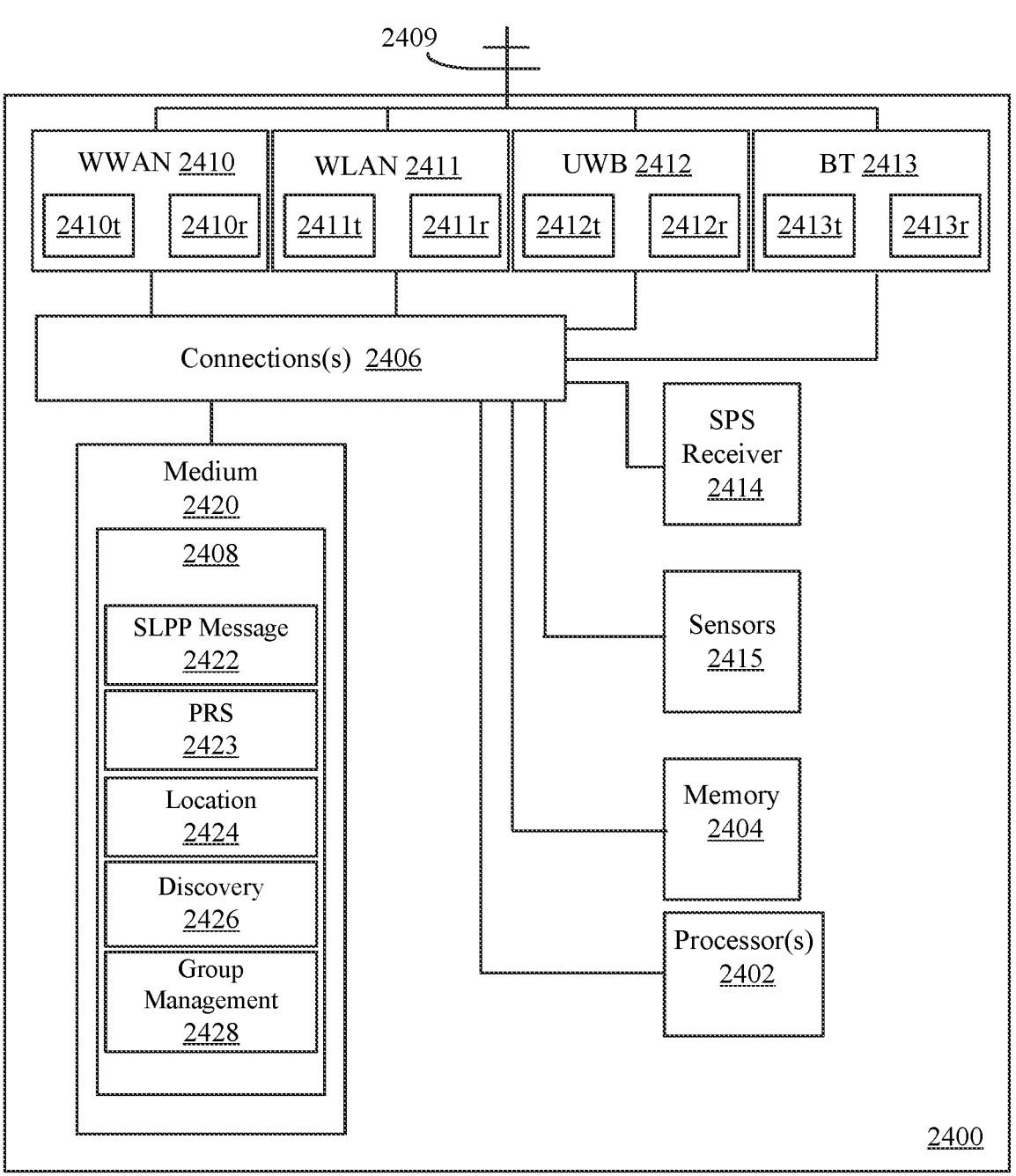
FIG. 24 shows a schematic block diagram illustrating certain exemplary features of a UE that is configured to support sidelink positioning, as discussed herein.

FIG. 24 shows a schematic block diagram illustrating certain exemplary features of a UE 2400, e.g., which may be a UE 105 shown in FIGS. 1, 3, 5-9 and 11-19, and any of the UEs illustrated in FIGS. 2 and 10 and supports sidelink positioning of the UE 2400. The UE 2400, for example, may perform the signal flows 1100-1900 shown in respective FIGS. 11-19 and methods 2000-2200, shown in respective FIGS. 20-22, and accompanying techniques as discussed herein. The UE 2400 may include, for example, one or more processors 2402, memory 2404, an external interface such as at least one wireless transceivers (e.g., wireless network interface) illustrated as Wireless Wide Area Network (WWAN) transceiver 2410, Wireless Local Area Network (WLAN) transceiver 2411, an Ultra-Wideband (UWB) transceiver 2412 and a Bluetooth (BT) transceiver 2413, SPS receiver 2414, and one or more sensors 2415, which may be operatively coupled with one or more connections 2406 (e.g., buses, lines, fibers, links, etc.) to non-transitory computer readable medium 2420 and memory 2404. The SPS receiver 2414, for example, may receive and process SPS signals from satellite vehicles 190 shown in FIG. 1. The one or more sensors 2415, for example, may include an inertial measurement unit (IMU) that may include one or more accelerometers, one or more gyroscopes, a magnetometer, etc. The UE 2400 may further include additional items, which are not shown, such as a user interface that may include e.g., a display, a keypad or other input device, such as virtual keypad on the display, through which a user may interface with the UE 2400. In certain example implementations, all or part of UE 2400 may take the form of a chipset, and/or the like.

The UE 2400 may include at least one wireless transceiver, such as wireless transceiver 2410 for a WWAN communication system and wireless transceiver 2411 for a WLAN communication system, UWB transceiver 2412 for a UWB communication system, BT transceiver 2413 for a Bluetooth communication system, or a combined transceiver for any of WWAN, WLAN, UWB, and BT. The WWAN transceiver 2410 may include a transmitter 2410t and receiver 2410r coupled to one or more antennas 2409 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The WLAN transceiver 2411 may include a transmitter 2411t and receiver 2411r coupled to one or more antennas 2409 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The UWB transceiver 2412 may include a transmitter 2412t and receiver 2412r coupled to one or more antennas 2409 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The BT transceiver 2413 may include a transmitter 2413t and receiver 2413r coupled to one or more antennas 2409 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The transmitters 2410t, 2411t, 2412t, and 2413t may include multiple transmitters that may be discrete components or combined/integrated components, and/or the receivers 2410r, 2411r, 2412r, and 2413r may include multiple receivers that may be discrete components or combined/integrated components. The WWAN transceiver 2410 may be configured to communicate signals (e.g., with base stations and/or one or more other UEs or other devices) according to a variety of radio access technologies (RATs) such as New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), etc. New Radio may use mm-wave frequencies and/or sub-6 GHz frequencies. The WLAN transceiver 2411 may be configured to communicate signals (e.g., with access points and/or one or more other devices) according to a variety of radio access technologies (RATs) such as 3GPP LTE-V2X (PC5), IEEE 1102.11 (including IEEE 1102.11p), Wi-Fi, Wi-Fi Direct (Wi-Fi D), Zigbee etc. The UWB transceiver 2412 may be configured to communicate signals (e.g., with access points and/or one or more other devices) according to a variety of radio access technologies (RATs) such as personal area network (PAN) including IEEE 802.15.3, IEEE 802.15.4, etc. The BT transceiver 2413 may be configured to communicate signals (e.g., with access points and/or one or more other devices) according to a variety of radio access technologies (RATs) such as a Bluetooth network. The transceivers 2410 2411, 2412, and 2413 may be communicatively coupled to a transceiver interface, e.g., by optical and/or electrical connection, which may be at least partially integrated with the transceivers 2410, 2411, 2412, 2413.

In some embodiments, UE 2400 may include antenna 2409, which may be internal or external. UE antenna 2409 may be used to transmit and/or receive signals processed by wireless transceivers 2410, 2411, 2412, 2413. In some embodiments, UE antenna 2409 may be coupled to wireless transceivers 2410, 2411, 2412, 2413. In some embodiments, measurements of signals received (transmitted) by UE 2400 may be performed at the point of connection of the UE antenna 2409 and wireless transceivers 2410, 2411, 2412, 2413. For example, the measurement point of reference for received (transmitted) RF signal measurements may be an input (output) UE of the receiver 2410r (transmitter 2410t) and an output (input) UE of the UE antenna 2409. In a UE 2400 with multiple UE antennas 2409 or antenna arrays, the antenna connector may be viewed as a virtual point representing the aggregate output (input) of multiple UE antennas.

The one or more processors 2402 may be implemented using a combination of hardware, firmware, and software. For example, the one or more processors 2402 may be configured to perform the functions discussed herein by implementing one or more instructions or program code 2408 on a non-transitory computer readable medium, such as medium 2420 and/or memory 2404. In some embodiments, the one or more processors 2402 may represent one or more circuits configurable to perform at least a portion of a data signal computing procedure or process related to the operation of UE 2400.

The medium 2420 and/or memory 2404 may store instructions or program code 2408 that contain executable code or software instructions that when executed by the one or more processors 2402 cause the one or more processors 2402 to operate as a special purpose computer programmed to perform the techniques disclosed herein. As illustrated in UE 2400, the medium 2420 and/or memory 2404 may include one or more components or modules that may be implemented by the one or more processors 2402 to perform the methodologies described herein. While the components or modules are illustrated as software in medium 2420 that is executable by the one or more processors 2402, it should be understood that the components or modules may be stored in memory 2404 or may be dedicated hardware either in the one or more processors 2402 or off the processors.

A number of software modules and data tables may reside in the medium 2420 and/or memory 2404 and be utilized by the one or more processors 2402 in order to manage both communications and the functionality described herein. It should be appreciated that the organization of the contents of the medium 2420 and/or memory 2404 as shown in UE 2400 is merely exemplary, and as such the functionality of the modules and/or data structures may be combined, separated, and/or be structured in different ways depending upon the implementation of the UE 2400.

The medium 2420 and/or memory 2404 may include an SLPP message module 2422 that when implemented by the one or more processors 2402 configures the one or more processors 2402 to transmit and receive sidelink positioning (e.g., SLPP) messages, via the external interface including one or more of wireless transceivers 2410, 2411, 2412, and 2413. The sidelink positioning messages may use SLPP as discussed herein. The one or more processors 2402 may be configured to transmit SLPP messages, via the external interface, directly to one or more other UEs or to broadcast the SLPP messages using groupcast or multicast to a plurality of other UEs. The one or more processors 2402 may be configured to transmit and receive SLPP messages, via the external interface, with a location server (e.g. an LMF) in a PLMN with the SLPP message(s) embedded in an LPP message, embedded in both an LPP and SUPL message (e.g. which may include a SUPL POS message), embedded in just a SUPL message (e.g. which may include a SUPL POS message), or not embedded in an LPP or SUPL message. The one or more processors 2402 may be configured, for example, to transmit and receive, via the external interface, SLPP messages that include an SLPP capabilities request or SLPP capabilities, SLPP resources, and/or SLPP service requirements for the UE. The one or more processors 2402 may be configured, for example, to transmit and receive, via the external interface, proposed PRS configurations for sidelink positioning and may be configured to transmit and receive, via the external interface, confirmation, rejection or modification of proposed PRS configurations for sidelink positioning. The sidelink positioning messages may use SLPP as discussed herein. The one or more processors 2402 may be configured, for example, to transmit and receive, via the external interface, SLPP messages that include a measurement report or location results. The transmitted measurement report, for example, may include information for the sidelink positioning signals transmitted by the UE and measurements performed by the UE 2400 for sidelink positioning signals transmitted by other UEs and may include indications of reverse link communication from each UE in a group to the UE 2400. The received measurement reports, for example, may include measurements performed by other UEs including measurements for the sidelink positioning signals transmitted by the UE 2400, and may include indications of reverse link communication from each UE in a group to each of the other UEs in the group. The location results may include ranges, distances and/or directions between one or more pairs of UEs in a group and/or relative locations, absolute locations and/or velocities and/or relative velocities for each of one or more UEs in a group.

The medium 2420 and/or memory 2404 may include a PRS module 2423 that when implemented by the one or more processors 2402 configures the one or more processors 2402 to transmit, via the external interface including one or more of wireless transceivers 2410, 2411, 2412, and 2413, PRS for sidelink positioning (e.g. sidelink PRS or sidelink SRS for NR or LTE). The one or more processors 2402 may be configured to transmit the SL PRS consistent with a proposed SL PRS configuration sent to or received from another UE. The one or more processors 2402 may be further configured to receive SL PRS from other UEs, via the external interface, and to measure the SL PRS for sidelink positioning.

The medium 2420 and/or memory 2404 may include a location module 2424 that when implemented by the one or more processors 2402 configures the one or more processors 2402 to determine location results for one or more UEs with respect to the UE 2400 based on SL PRS measurements performed by the UE 2400 and measurement information received in SLPP messages from the other UEs. The one or more processors 2402 may be further configured to determine velocities of the UE 2400 and/or other UEs based SL PRS measurements performed by the UE 2400, and measurement information received in SLPP messages from the other UEs.

The medium 2420 and/or memory 2404 may include a discovery module 2426 that when implemented by the one or more processors 2402 configures the one or more processors 2402 to discover one or more other UEs that are available for sidelink positioning. The one or more processors 2402 may be further configured to obtain group criteria parameters for other UEs, such as a distance restriction, a time restriction, a direction of travel restriction, a speed restriction, sidelink position method restriction or a sidelink position method type restriction.

The medium 2420 and/or memory 2404 may include a group management module 2428 that when implemented by the one or more processors 2402 configures the one or more processors 2402 to determine a group status indication for one or more UEs, indicating inclusion or exclusion of the UE in the group, based on the group criteria parameters. The one or more processors 2402 may be further configured to determine a group status indication for one or more UEs in a group, indicating inclusion or exclusion of the UE in the group, based on the indications of reverse link communication for the one or more UEs, including indications of reverse link communication from each UE and the indications of reverse link communication from the UE 2400. The one or more processors 2402 may be further configured to instigate the addition or transfer of one or more UEs from one group to another group based on relative locations and velocities of the one or more UEs and the UEs in the groups.

The methodologies described herein may be implemented by various means depending upon the application. For example, these methodologies may be implemented in hardware, firmware, software, or any combination thereof. For a hardware implementation, the one or more processors 2402 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a non-transitory computer readable medium 2420 or memory 2404 that is connected to and executed by the one or more processors 2402. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 2408 on a non-transitory computer readable medium, such as medium 2420 and/or memory 2404. Examples include computer readable media encoded with a data structure and computer readable media encoded with a computer program code 2408. For example, the non-transitory computer readable medium including program code 2408 stored thereon may include program code 2408 to support sidelink positioning in a manner consistent with disclosed embodiments. Non-transitory computer readable medium 2420 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 2408 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 2420, instructions and/or data may be provided as signals on transmission media included in a communication apparatus. For example, a communication apparatus may include an external interface including one or more of wireless transceivers 2410, 2411, 2412, and 2413 having signals indicative of instructions and data. The instructions and data are configured to cause one or more processors to implement the functions outlined in the claims. That is, the communication apparatus includes transmission media with signals indicative of information to perform disclosed functions.

Memory 2404 may represent any data storage mechanism. Memory 2404 may include, for example, a primary memory and/or a secondary memory. Primary memory may include, for example, a random-access memory, read only memory, etc. While illustrated in this example as being separate from one or more processors 2402, it should be understood that all or part of a primary memory may be provided within or otherwise co-located/coupled with the one or more processors 2402. Secondary memory may include, for example, the same or similar type of memory as primary memory and/or one or more data storage devices or systems, such as, for example, a disk drive, an optical disc drive, a tape drive, a solid-state memory drive, etc.

In certain implementations, secondary memory may be operatively receptive of, or otherwise configurable to couple to a non-transitory computer readable medium 2420. As such, in certain example implementations, the methods and/or apparatuses presented herein may take the form in whole or part of a computer readable medium 2420 that may include computer implementable program code 2408 stored thereon, which if executed by one or more processors 2402 may be operatively enabled to perform all or portions of the example operations as described herein. Computer readable medium 2420 may be a part of memory 2404.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

Clause 1. An example method performed by a user equipment (UE) for sidelink positioning of a plurality of UEs including the UE, comprising determining a session for a sidelink positioning protocol (SLPP) for the plurality of UEs, wherein the session is indicated to each UE in the plurality of UEs; and exchanging a plurality of SLPP messages with other UEs in the plurality of UEs, wherein the SLPP messages are part of the session, wherein the SLPP messages enable the sidelink positioning.

Clause 2. The method of clause 1 further comprising: performing the sidelink positioning comprises obtaining location results for at least two target UEs in the plurality of UEs, wherein the location results comprise at least one of: a range between each target UE and another UE in the plurality of UEs; a direction to or from the each target UE from or to, respectively, another UE in the plurality of UEs; a location of the each target UE relative to a location of another UE in the plurality of UEs; a velocity of the each target UE relative to a velocity of another UE in the plurality of UEs; an absolute location of the each target UE; an absolute velocity of the each target UE; or some combination thereof.

Clause 3. The method of clause 1 or 2, wherein the plurality of SLPP messages includes at least one SLPP message sent by a sending UE to a receiving UE or receiving group of UEs, wherein the UE is either the sending UE, the receiving UE or part of the receiving group of UEs, wherein the at least one SLPP message comprises: SLPP capabilities of the sending UE; a request for SLPP capabilities of the receiving UE or receiving group of UEs; SLPP assistance data to assist the receiving UE or receiving group of UEs to transmit or measure positioning related signals; a request for SLPP assistance data from the receiving UE to assist the sending UE to transmit or measure positioning related signals; a request for measurements or some of the location results or both obtained by the receiving UE or receiving group of UEs; measurements or some of the location results or both obtained by the sending UE; or some combination of these.

Clause 4. The method of any of clauses 1-3, further comprising: discovering each of the other UEs in the plurality of UEs; receiving an indication from each of the other UEs in the plurality of UEs that the each of the other UEs supports SLPP; and determining to initiate the session based on a service request received from a network entity or a configuration of the UE.

Clause 5. The method of any of clauses 1-4, further comprising: sending a first SLPP message to each of the other UEs in the plurality of UEs comprising a request for the each UE to join the session; and receiving a second SLPP message from each of the other UEs in the plurality of UEs indicating acceptance or rejection of the request.

Clause 6. The method of any of clauses 1-5, further comprising including in the first SLPP message at least one of: a level 2 group address of the plurality of UEs, an SLPP session ID, or both of these.

Clause 7. The method of any of clauses 1-6, further comprising: sending a third SLPP message to each of the other UEs in the plurality of UEs, wherein the third SLPP message starts or restarts the SLPP session.

Clause 8. The method of any of clauses 1-7, further comprising including in the third SLPP message at least one of: an application level ID for each UE of the plurality of UEs, an SLPP UE ID for each UE of the plurality of UEs, a group ciphering key for the plurality of UEs, or some combination of these.

Clause 9. The method of any of clauses 1-8, further comprising sending a first SLPP message to at least one UE in the plurality of UEs to terminate the session at the at least one UE.

Clause 10. The method of any of clauses 1-9, further comprising sending a first SLPP message to each UE except the UE in a second plurality of UEs, wherein the second plurality of UEs comprises the UE and at least some of the other UEs in the plurality of UEs, wherein the first SLPP message comprises a request for the each UE to join a modified session; sending a second SLPP message to each UE in a third plurality of UEs when the third plurality of UEs contains at least one UE, wherein the third plurality of UEs contain UEs not in the plurality of UEs, wherein the second SLPP message comprises a request for the each UE to join the modified session; receiving a third SLPP message from the each UE in the second plurality of UEs, indicating whether the each UE accepts or rejects the request; receiving a fourth SLPP message from the each UE in the third plurality of UEs when the third plurality of UEs contains at least one UE, indicating whether the each UE accepts or rejects the request; and sending a fifth SLPP message to each UE except the UE in the plurality of UEs that is not in the second plurality of UEs indicating that the session is terminated at the each UE.

Clause 11. The method of any of clauses 1-10, further comprising sending a sixth SLPP message to each UE in the second plurality of UEs and the third plurality of UEs when the each UE accepts the request for the each UE to join the modified session, wherein the sixth SLPP message starts the modified session.

Clause 12. The method of any of clauses 1-11, wherein third plurality of UEs contains no UEs.

Clause 13. The method of any of clauses 1-12, further comprising: receiving a first SLPP message from a second UE in the plurality of UEs comprising a request for the UE to join, terminate, start, modify, or leave the session or for the second UE to join the session; and sending a second SLPP message to the second UE when the first SLPP message comprises the request for the UE to join or modify the session or the request for the second UE to join the session, the second SLPP message indicating acceptance or rejection of the request.

Clause 14. The method of any of clauses 1-13, wherein each SLPP message in the plurality of SLPP messages includes at least one of: an SLPP session ID; an SLPP transaction ID; a level 2 address of a UE sending the SLPP message; a level 2 address of a UE or a group of UEs receiving the SLPP message; information for one or more UEs of the plurality of UEs, wherein the information includes an SLPP UE ID for each UE in the one or more UEs of the plurality of UEs; or some combination of these.

Clause 15. The method of any of clauses 1-14, wherein the sidelink positioning of the plurality of UEs is performed using at least one of: transmission and measurement of sidelink positioning reference signals (SL PRS), real time kinematic (RTK), transmission and measurement of WiFi signals, transmission and measurement of ultra-wideband (UWB) signals, or some combination of these.

Clause 16. The method of any of clauses 1-15, wherein the sidelink positioning of the plurality of UEs is performed using RTK, wherein each UE in the plurality of UEs obtains carrier phase measurements of Global Navigation Satellite (GNSS) signals, wherein the carrier phase measurements obtained by the plurality of UEs are provided to at least one UE in the plurality of UEs, wherein the at least one UE determines location results for the plurality of UEs based on the carrier phase measurements obtained by the plurality of UEs.

Clause 17. The method of any of clauses 1-16, wherein the sidelink positioning of the plurality of UEs is performed using transmission and measurement of SL PRS and further comprising: obtaining an SL PRS transmission configuration for each UE in the plurality of UEs; obtaining SL PRS measurements for the other UEs in the plurality of UEs based on the SL PRS transmission configurations for the other UEs; transmitting SL PRS based on the SL PRS transmission configuration for the UE; and performing at least one:

sending the obtained SL PRS measurements to at least one other UE in the plurality of UEs, or receiving obtained SL PRS measurements from at least one other UE in the plurality of UEs, or both of these, wherein the obtained SL PRS measurements enable determination of location results for the target UEs.

Clause 18. The method of any of clauses 1-17, wherein the SL PRS measurements comprise at least one of: a receive time-transmission time difference (Rx-Tx), a reference signal time difference (RSTD), a round trip signal propagation time (RTT), a reference signal received power, a reference signal received quality, an angle of arrival, or some combination of these.

Clause 19. An example method performed by a user equipment (UE) for sidelink positioning of a plurality of UEs including the UE, comprising determining to perform sidelink positioning of the plurality of UEs, wherein there is no discovery between the UE and at least some of the other UEs in the plurality of UEs; and exchanging a plurality of SLPP messages with other UEs in the plurality of UEs using broadcast or groupcast, wherein the SLPP messages are not part of a session, wherein the SLPP messages enable the sidelink positioning.

Clause 20. The method of clause 19, further comprising obtaining location results for at least two target UEs in the plurality of UEs, wherein the location results comprise at least one of: a range between each target UE and another UE in the plurality of UEs; a direction to or from the each target UE from or to, respectively, another UE in the plurality of UEs; a location of the each target UE relative to a location of another UE in the plurality of UEs; a velocity of the each target UE relative to a velocity of another UE in the plurality of UEs; an absolute location of the each target UE; an absolute velocity of the each target UE; or some combination thereof.

Clause 21. The method of clause 19 or 20, wherein the plurality of SLPP messages includes at least one SLPP message sent by a sending UE to other UEs in the plurality of UEs, wherein the UE is either the sending UE or one of the other UEs, wherein the at least one SLPP message comprises: SLPP assistance data to assist the other UEs to transmit or measure positioning related signals; measurements or some of the location results or both obtained by the sending UE; a level 2 address of the sending UE; an application level address of the sending UE; or some combination of these.

Clause 22. The method of any of clauses 19-21, wherein the sidelink positioning of the plurality of UEs is performed using at least one of: transmission and measurement of sidelink positioning reference signals (SL PRS); real time kinematic (RTK); transmission and measurement of WiFi signals; transmission and measurement of ultra-wideband (UBW) signals; or some combination of these.

Clause 23. The method of any of clauses 19-22, wherein the sidelink positioning of the plurality of UEs is performed using RTK, wherein each UE in the plurality of UEs obtains carrier phase measurements of Global Navigation Satellite (GNSS) signals, wherein the carrier phase measurements obtained by the plurality of UEs are provided to at least one UE in the plurality of UEs, wherein the at least one UE in the plurality of UEs determines location results for some of the target UEs in the plurality of UEs based on the carrier phase measurements obtained by the plurality of UEs.

Clause 24. The method of any of clauses 19-23, wherein the sidelink positioning of the plurality of UEs is performed using transmission and measurement of SL PRS and further comprising: receiving SL PRS transmission configurations from other UEs in the plurality of UEs; obtaining SL PRS measurements for the other UEs in the plurality of UEs based on the SL PRS transmission configurations; receiving revised SL PRS transmission configurations from the other UEs in the plurality of UEs, wherein the revised SL PRS transmission configurations correspond to SL PRS transmitted by the other UEs; sending the obtained SL PRS measurements for the other UEs to the other UEs in the plurality of UEs; transmitting SL PRS based on an SL PRS transmission configuration for the UE; sending the SL PRS transmission configuration for the UE to other UEs in the plurality of UEs prior to the transmitting SL PRS; sending a revised SL PRS transmission configuration for the UE to the other UEs in the plurality of UEs after transmitting SL PRS, wherein the revised SL PRS transmission configuration corresponds to the transmitted SL PRS; receiving SL PRS measurements obtained by the other UEs in the plurality of UEs; and determining location results for some of the target UEs based on at least one of the obtained SL PRS measurements for the other UEs, the revised SL PRS transmission configurations for the other UEs in the plurality of UEs, the SL PRS measurements obtained by the other UEs in the plurality of UEs, and the revised SL PRS transmission configuration for the UE.

Clause 25. The method of any of clauses 18-24, wherein the SL PRS measurements comprise at least one of: a receive time-transmission time difference (Rx-Tx), a reference signal time difference (RSTD), round trip signal propagation time (RTT), a reference signal received power, a reference signal received quality, an angle of arrival, or some combination of these.

Clause 26. An example UE for sidelink positioning of a plurality of UEs including the UE, comprises a transceiver, a memory, and one or more processors communicatively coupled with the transceiver and the memory. The one or more processors may be configured to determine a session for a sidelink positioning protocol (SLPP) for the plurality of UEs, wherein the session is indicated to each UE in the plurality of UEs; and exchange a plurality of SLPP messages with other UEs in the plurality of UEs, wherein the SLPP messages are part of the session, wherein the SLPP messages enable the sidelink positioning.

Clause 27. The UE of clause 26, wherein the one or more processors are further configured to obtain location results for at least two target UEs in the plurality of UEs, wherein the location results comprise at least one of: a range between each target UE and another UE in the plurality of UEs; a direction to or from the each target UE from or to, respectively, another UE in the plurality of UEs; a location of the each target UE relative to a location of another UE in the plurality of UEs; a velocity of the each target UE relative to a velocity of another UE in the plurality of UEs; an absolute location of the each target UE; an absolute velocity of the each target UE; or some combination thereof.

Clause 28. The UE of clause 26 or 27, wherein the plurality of SLPP messages includes at least one SLPP message sent by a sending UE to a receiving UE or receiving group of UEs, wherein the UE is either the sending UE, the receiving UE or part of the receiving group of UEs, wherein the at least one SLPP message comprises: SLPP capabilities of the sending UE; a request for SLPP capabilities of the receiving UE or receiving group of UEs; SLPP assistance data to assist the receiving UE or receiving group of UEs to transmit or measure positioning related signals; a request for SLPP assistance data from the receiving UE to assist the sending UE to transmit or measure positioning related signals; a request for measurements or some of the location results or both obtained by the receiving UE or receiving group of UEs; measurements or some of the location results or both obtained by the sending UE; or some combination of these.

Clause 29. The UE of any of clauses 26-28, wherein the one or more processors are further configured to: discover each of the other UEs in the plurality of UEs; receive an indication from each of the other UEs in the plurality of UEs that the each of the other UEs supports SLPP; and determine to initiate the session based on a service request received from a network entity or a configuration of the UE.

Clause 30. The UE of any of clauses 26-29, wherein the one or more processors are further configured to: send a first SLPP message to each of the other UEs in the plurality of UEs comprising a request for the each UE to join the session; and receive a second SLPP message from each of the other UEs in the plurality of UEs indicating acceptance or rejection of the request.

Clause 31. The UE of any of clauses 26-30, wherein the one or more processors are further configured to include in the first SLPP message at least one of: a level 2 group address of the plurality of UEs, an SLPP session ID, or both of these.

Clause 32. The UE of any of clauses 26-31, wherein the one or more processors are further configured to: sending a third SLPP message to each of the other UEs in the plurality of UEs, wherein the third SLPP message starts or restarts the SLPP session.

Clause 33. The UE of any of clauses 26-32, wherein the one or more processors are further configured to include in the third SLPP message at least one of: an application level ID for each UE of the plurality of UEs, an SLPP UE ID for each UE of the plurality of UEs, a group ciphering key for the plurality of UEs, or some combination of these.

Clause 34. The UE of any of clauses 26-33, wherein the one or more processors are further configured to send a first SLPP message to at least one UE in the plurality of UEs to terminate the session at the at least one UE.

Clause 35. The UE of any of clauses 26-34, send a first SLPP message to each UE except the UE in a second plurality of UEs, wherein the second plurality of UEs comprises the UE and at least some of the other UEs in the plurality of UEs and additional UEs not in the plurality of UEs, wherein the first SLPP message comprises a request for the each UE to join a modified session; send a second SLPP message to each UE in a third plurality of UEs when the third plurality of UEs contains at least one UE, wherein the third plurality of UEs contain UEs not in the plurality of UEs, wherein the second SLPP message comprises a request for the each UE to join the modified session; receive a third SLPP message from the each UE in the second plurality of UEs, indicating whether the each UE accepts or rejects the request; and receive a fourth SLPP message from the each UE in the third plurality of UEs when the third plurality of UEs contains at least one UE, indicating whether the each UE accepts or rejects the request; send a fifth SLPP message to each UE except the UE in the plurality of UEs that is not in the second plurality of UEs indicating that the session is terminated at the each UE.

Clause 36. The UE of any of clauses 26-35, wherein the one or more processors are further configured to: send a sixth SLPP message to each UE in the second plurality of UEs and the third plurality of UEs when the each UE accepts the request for the each UE to join the modified session, wherein the sixth SLPP message starts the modified session.

Clause 37. The UE of any of clauses 26-36, wherein third plurality of UEs contains no UEs.

Clause 38. The UE of any of clauses 26-37, wherein the one or more processors are further configured to: receive a first SLPP message from a second UE in the plurality of UEs comprising a request for the UE to join, terminate, start, modify, or leave the session or for the second UE to join the session; and send a second SLPP message to the second UE when the first SLPP message comprises the request for the UE to join or modify the session or the request for the second UE to join the session, the second SLPP message indicating an acceptance or rejection of the request.

Clause 39. The UE of any of clauses 26-38, wherein each SLPP message in the plurality of SLPP messages includes at least one of: an SLPP session ID; an SLPP transaction ID; a level 2 address of a UE sending the SLPP message; a level 2 address of a UE or a group of UEs receiving the SLPP message; information for one or more UEs of the plurality of UEs, wherein the information includes an SLPP UE ID for each UE in the one or more UEs of the plurality of UEs; or some combination of these.

Clause 40. The UE of any of clauses 26-39, wherein the sidelink positioning of the plurality of UEs is performed using at least one of: transmission and measurement of sidelink positioning reference signals (SL PRS), real time kinematic (RTK), transmission and measurement of WiFi signals, transmission and measurement of ultra-wideband (UWB) signals, or some combination of these.

Clause 41. The UE of any of clauses 26-40, wherein the sidelink positioning of the plurality of UEs is performed using RTK, wherein each UE in the plurality of UEs obtains carrier phase measurements of Global Navigation Satellite (GNSS) signals, wherein the carrier phase measurements obtained by the plurality of UEs are provided to at least one UE in the plurality of UEs, wherein the at least one UE determines location results for the plurality of UEs based on the carrier phase measurements obtained by the plurality of UEs.

Clause 42. The UE of any of clauses 26-41, wherein the sidelink positioning of the plurality of UEs is performed using transmission and measurement of SL PRS and the one or more processors are further configured to: obtain an SL PRS transmission configuration for each UE in the plurality of UEs; obtain SL PRS measurements for the other UEs in the plurality of UEs based on the SL PRS transmission configurations for the other UEs; transmit SL PRS based on the SL PRS transmission configuration for the UE; and perform at least one: send the obtained SL PRS measurements to at least one other UE in the plurality of UEs, or receive obtained SL PRS measurements from at least one other UE in the plurality of UEs, or both of these, wherein the obtained SL PRS measurements enable determination of location results for the target UEs.

Clause 43. The UE of any of clauses 26-42, wherein the SL PRS measurements comprise at least one of: a receive time-transmission time difference (Rx-Tx), a reference signal time difference (RSTD), a round trip signal propagation time (RTT), a reference signal received power, a reference signal received quality, an angle of arrival, or some combination of these.

Clause 44. An example UE for sidelink positioning of a plurality of UEs including the UE, comprises a transceiver, a memory, and one or more processors communicatively coupled with the transceiver and the memory. The one or more processors may be configured to determine to perform sidelink positioning of the plurality of UEs, wherein there is no discovery between the UE and at least some of the other UEs in the plurality of UEs; and exchange a plurality of SLPP messages with other UEs in the plurality of UEs using broadcast or groupcast, wherein the SLPP messages are not part of a session, wherein the SLPP messages enable the sidelink positioning.

Clause 45. The UE of clause 44, wherein the one or more processors are further configured to obtain location results for at least two target UEs in the plurality of UEs, wherein the location results comprise at least one of: a range between each target UE and another UE in the plurality of UEs; a direction to or from the each target UE from or to, respectively, another UE in the plurality of UEs; a location of the each target UE relative to a location of another UE in the plurality of UEs; a velocity of the each target UE relative to a velocity of another UE in the plurality of UEs; an absolute location of the each target UE; an absolute velocity of the each target UE; or some combination thereof.

Clause 46. The UE of clause 44 or 45, wherein the plurality of SLPP messages includes at least one SLPP message sent by a sending UE to other UEs in the plurality of UEs, wherein the UE is either the sending UE or one of the other UEs, wherein the at least one SLPP message comprises: SLPP assistance data to assist the other UEs to transmit or measure positioning related signals; measurements or some of the location results or both obtained by the sending UE; a level 2 address of the sending UE; an application level address of the sending UE; or some combination of these.

Clause 47. The UE of any of clauses 44-46, wherein the sidelink positioning of the plurality of UEs is performed using at least one of: transmission and measurement of sidelink positioning reference signals (SL PRS); real time kinematic (RTK); transmission and measurement of WiFi signals; transmission and measurement of ultra-wideband (UBW) signals; or some combination of these.

Clause 48. The UE of any of clauses 44-47, wherein the sidelink positioning of the plurality of UEs is performed using transmission and measurement of SL PRS and wherein the one or more processors are further configured to: receive SL PRS transmission configurations from other UEs in the plurality of UEs; obtain SL PRS measurements for the other UEs in the plurality of UEs based on the SL PRS transmission configurations; receive revised SL PRS transmission configurations from the other UEs in the plurality of UEs, wherein the revised SL PRS transmission configurations correspond to SL PRS transmitted by the other UEs; send the obtained SL PRS measurements for the other UEs to the other UEs in the plurality of UEs; transmit SL PRS based on an SL PRS transmission configuration for the UE; send the SL PRS transmission configuration for the UE to other UEs in the plurality of UEs prior to the transmitting SL PRS; send a revised SL PRS transmission configuration for the UE to the other UEs in the plurality of UEs after transmitting SL PRS, wherein the revised SL PRS transmission configuration corresponds to the transmitted SL PRS; receive SL PRS measurements obtained by the other UEs in the plurality of UEs; and determine location results for some of the target UEs based on at least one of the obtained SL PRS measurements for the other UEs, the revised SL PRS transmission configurations for the other UEs in the plurality of UEs, the SL PRS measurements obtained by the other UEs in the plurality of UEs, and the revised SL PRS transmission configuration for the UE.

Clause 49. The UE of any of clauses 44-48, wherein the sidelink positioning of the plurality of UEs is performed using transmission and measurement of SL PRS and further comprising: receiving SL PRS transmission configurations from other UEs in the plurality of UEs; obtaining SL PRS measurements for the other UEs in the plurality of UEs based on the SL PRS transmission configurations; receiving revised SL PRS transmission configurations from the other UEs in the plurality of UEs, wherein the revised SL PRS transmission configurations correspond to SL PRS transmitted by the other UEs; sending the obtained SL PRS measurements for the other UEs to the other UEs in the plurality of UEs; transmitting SL PRS based on an SL PRS transmission configuration for the UE; sending the SL PRS transmission configuration for the UE to other UEs in the plurality of UEs prior to the transmitting SL PRS; sending a revised SL PRS transmission configuration for the UE to the other UEs in the plurality of UEs after transmitting SL PRS, wherein the revised SL PRS transmission configuration corresponds to the transmitted SL PRS; receiving SL PRS measurements obtained by the other UEs in the plurality of UEs; and determining location results for some of the target UEs based on at least one of the obtained SL PRS measurements for the other UEs, the revised SL PRS transmission configurations for the other UEs in the plurality of UEs, the SL PRS measurements obtained by the other UEs in the plurality of UEs, and the revised SL PRS transmission configuration for the UE.

Clause 50. The UE of any of clauses 44-49, wherein the SL PRS measurements comprise at least one of: a receive time-transmission time difference (Rx-Tx), a reference signal time difference (RSTD), round trip signal propagation time (RTT), a reference signal received power, a reference signal received quality, an angle of arrival, or some combination of these.

What is claimed is:

1. A method performed by a user equipment (UE) for sidelink positioning of a plurality of UEs including the UE, comprising:

determining a session for a sidelink positioning protocol (SLPP) for the plurality of UEs, wherein the session is indicated to each UE in the plurality of UEs; and exchanging a plurality of SLPP messages with other UEs in the plurality of UEs, wherein the SLPP messages are part of the session, wherein the SLPP messages enable the sidelink positioning.

2. The method of claim 1, further comprising obtaining location results for at least two target UEs in the plurality of UEs, wherein the location results comprise at least one of:

a range between each target UE and another UE in the plurality of UEs;

a direction to or from the each target UE from or to, respectively, another UE in the plurality of UEs;

a location of the each target UE relative to a location of another UE in the plurality of UEs;

a velocity of the each target UE relative to a velocity of another UE in the plurality of UEs;

an absolute location of the each target UE;

an absolute velocity of the each target UE; or some combination thereof.

3. The method of claim 2, wherein the plurality of SLPP messages includes at least one SLPP message sent by a sending UE to a receiving UE or receiving group of UEs, wherein the UE is either the sending UE, the receiving UE or part of the receiving group of UEs, wherein the at least one SLPP message comprises:

SLPP capabilities of the sending UE;

a request for SLPP capabilities of the receiving UE or receiving group of UEs;

SLPP assistance data to assist the receiving UE or receiving group of UEs to transmit or measure positioning related signals;

a request for SLPP assistance data from the receiving UE to assist the sending UE to transmit or measure positioning related signals;

a request for measurements or some of the location results or both obtained by the receiving UE or receiving group of UEs;

measurements or some of the location results or both obtained by the sending UE; or some combination of these.

4. The method of claim 1, further comprising:

discovering each of the other UEs in the plurality of UEs;

receiving an indication from each of the other UEs in the plurality of UEs that the each of the other UEs supports SLPP; and determining to initiate the session based on a service request received from a network entity or a configuration of the UE.

5. The method of claim 1, further comprising:

sending a first SLPP message to each of the other UEs in the plurality of UEs comprising a request for the each UE to join the session; and receiving a second SLPP message from each of the other UEs in the plurality of UEs indicating acceptance or rejection of the request.

6. The method of claim 5, further comprising including in the first SLPP message at least one of:

a level 2 group address of the plurality of UEs, an SLPP session ID, or both of these.

7. The method of claim 1, further comprising:

sending a third SLPP message to each of the other UEs in the plurality of UEs, wherein the third SLPP message starts or restarts the SLPP session.

8. The method of claim 7, further comprising including in the third SLPP message at least one of:

an application level ID for each UE of the plurality of UEs, an SLPP UE ID for each UE of the plurality of UEs,
a group ciphering key for the plurality of UEs, or
some combination of these.

9. The method of claim 1, further comprising sending a first SLPP message to at least one UE in the plurality of UEs to terminate the session at the at least one UE.

10. The method of claim 1, further comprising:
sending a first SLPP message to each UE except the UE in a second plurality of UEs, wherein the second plurality of UEs comprises the UE and at least some of the other UEs in the plurality of UEs, wherein the first SLPP message comprises a request for the each UE to join a modified session;
sending a second SLPP message to each UE in a third plurality of UEs when the third plurality of UEs contains at least one UE, wherein the third plurality of UEs contain UEs not in the plurality of UEs, wherein the second SLPP message comprises a request for the each UE to join the modified session;
receiving a third SLPP message from the each UE in the second plurality of UEs, indicating whether the each UE accepts or rejects the request;
receiving a fourth SLPP message from the each UE in the third plurality of UEs when the third plurality of UEs contains at least one UE, indicating whether the each UE accepts or rejects the request; and
sending a fifth SLPP message to each UE except the UE in the plurality of UEs that is not in the second plurality of UEs indicating that the session is terminated at the each UE.

11. The method of claim 10, further comprising sending a sixth SLPP message to each UE in the second plurality of UEs and the third plurality of UEs when the each UE accepts the request for the each UE to join the modified session, wherein the sixth SLPP message starts the modified session.

12. The method of claim 10, wherein the third plurality of UEs contains no UEs.

13. The method of claim 1, further comprising:
receiving a first SLPP message from a second UE in the plurality of UEs comprising a request for the UE to join, terminate, start, modify, or leave the session or for the second UE to join the session; and
sending a second SLPP message to the second UE when the first SLPP message comprises the request for the UE to join or modify the session or the request for the second UE to join the session, the second SLPP message indicating an acceptance or rejection of the request.

14. The method of claim 1, wherein each SLPP message in the plurality of SLPP messages includes at least one of:
an SLPP session ID;
an SLPP transaction ID;
a level 2 address of a UE sending the SLPP message;
a level 2 address of a UE or a group of UEs receiving the SLPP message;
information for one or more UEs of the plurality of UEs, wherein the information includes an SLPP UE ID for each UE in the one or more UEs of the plurality of UEs; or
some combination of these.

15. The method of claim 2, wherein the sidelink positioning of the plurality of UEs is performed using at least one of:
transmission and measurement of sidelink positioning reference signals (SL PRS),
real time kinematic (RTK),
transmission and measurement of WiFi signals, transmission and measurement of ultra-wideband (UWB) signals, or
some combination of these.

16. The method of claim 15, wherein the sidelink positioning of the plurality of UEs is performed using RTK, wherein each UE in the plurality of UEs obtains carrier phase measurements of Global Navigation Satellite (GNSS) signals, wherein the carrier phase measurements obtained by the plurality of UEs are provided to at least one UE in the plurality of UEs, wherein the at least one UE determines location results for the plurality of UEs based on the carrier phase measurements obtained by the plurality of UEs.

17. The method of claim 15, wherein the sidelink positioning of the plurality of UEs is performed using transmission and measurement of SL PRS and further comprising:
obtaining an SL PRS transmission configuration for each UE in the plurality of UEs;
obtaining SL PRS measurements for the other UEs in the plurality of UEs based on the SL PRS transmission configurations for the other UEs;
transmitting SL PRS based on the SL PRS transmission configuration for the UE; and
performing at least one of:
sending the obtained SL PRS measurements to at least one other UE in the plurality of UEs, or
receiving obtained SL PRS measurements from at least one other UE in the plurality of UEs, or
both of these, wherein the obtained SL PRS measurements enable determination of location results for the target UEs.

18. The method of claim 17, wherein the SL PRS measurements comprise at least one of:
a receive time-transmission time difference (Rx-Tx),
a reference signal time difference (RSTD),
a round trip signal propagation time (RTT),
a reference signal received power,
a reference signal received quality,
an angle of arrival, or
some combination of these.

19. A method performed by a user equipment (UE) for sidelink positioning of a plurality of UEs including the UE, comprising:
determining to perform sidelink positioning of the plurality of UEs, wherein there is no discovery between the UE and at least some of the other UEs in the plurality of UEs; and
exchanging a plurality of SLPP messages with other UEs in the plurality of UEs using broadcast or groupcast, wherein the SLPP messages are not part of a session, wherein the SLPP messages enable the sidelink positioning.

20. The method of claim 19, further comprising obtaining location results for at least two target UEs in the plurality of UEs, wherein the location results comprise at least one of:
a range between each target UE and another UE in the plurality of UEs;
a direction to or from the each target UE from or to, respectively, another UE in the plurality of UEs;
a location of the each target UE relative to a location of another UE in the plurality of UEs;
a velocity of the each target UE relative to a velocity of another UE in the plurality of UEs;
an absolute location of the each target UE;
an absolute velocity of the each target UE; or
some combination thereof.

21. The method of claim 20, wherein the plurality of SLPP messages includes at least one SLPP message sent by a sending UE to other UEs in the plurality of UEs, wherein the UE is either the sending UE or one of the other UEs, wherein the at least one SLPP message comprises:

SLPP assistance data to assist the other UEs to transmit or measure positioning related signals;

measurements or some of the location results or both obtained by the sending UE;

a level 2 address of the sending UE;

an application level address of the sending UE; or some combination of these.

22. The method of claim 20, wherein the sidelink positioning of the plurality of UEs is performed using at least one of:

transmission and measurement of sidelink positioning reference signals (SL PRS);

real time kinematic (RTK);

transmission and measurement of WiFi signals;

transmission and measurement of ultra-wideband (UBW) signals; or some combination of these.

23. The method of claim 22, wherein the sidelink positioning of the plurality of UEs is performed using RTK, wherein each UE in the plurality of UEs obtains carrier phase measurements of Global Navigation Satellite (GNSS) signals, wherein the carrier phase measurements obtained by the plurality of UEs are provided to at least one UE in the plurality of UEs, wherein the at least one UE in the plurality of UEs determines location results for some of the target UEs in the plurality of UEs based on the carrier phase measurements obtained by the plurality of UEs.

24. The method of claim 23, wherein the sidelink positioning of the plurality of UEs is performed using transmission and measurement of SL PRS and further comprising:

receiving SL PRS transmission configurations from other UEs in the plurality of UEs;

obtaining SL PRS measurements for the other UEs in the plurality of UEs based on the SL PRS transmission configurations;

receiving revised SL PRS transmission configurations from the other UEs in the plurality of UEs, wherein the revised SL PRS transmission configurations correspond to SL PRS transmitted by the other UEs;

sending the obtained SL PRS measurements for the other UEs to the other UEs in the plurality of UEs;

transmitting SL PRS based on an SL PRS transmission configuration for the UE;

sending the SL PRS transmission configuration for the UE to other UEs in the plurality of UEs prior to the transmitting SL PRS;

sending a revised SL PRS transmission configuration for the UE to the other UEs in the plurality of UEs after transmitting SL PRS, wherein the revised SL PRS transmission configuration corresponds to the transmitted SL PRS;

receiving SL PRS measurements obtained by the other UEs in the plurality of UEs; and determining location results for some of the target UEs based on at least one of the obtained SL PRS measurements for the other UEs, the revised SL PRS transmission configurations for the other UEs in the plurality of UEs, the SL PRS measurements obtained by the other UEs in the plurality of UEs, and the revised SL PRS transmission configuration for the UE.

25. The method of claim 24, wherein the SL PRS measurements comprise at least one of:

a receive time-transmission time difference (Rx-Tx), a reference signal time difference (RSTD), round trip signal propagation time (RTT), a reference signal received power, a reference signal received quality, an angle of arrival, or some combination of these.

26. A User Equipment (UE) for sidelink positioning of a plurality of UEs including the UE, and wherein the UE comprises:

one or more transceivers;

one or more memories; and one or more processors communicatively coupled with the one or more transceivers and the one or more memories, wherein the one or more processors are configured to:

determine a session for a sidelink positioning protocol (SLPP) for the plurality of UEs, wherein the session is indicated to each UE in the plurality of UEs; and exchange a plurality of SLPP messages with other UEs in the plurality of UEs, wherein the SLPP messages are part of the session, wherein the SLPP messages enable the sidelink positioning.

27. The UE of claim 26, wherein the one or more processors are further configured to obtain location results for at least two target UEs in the plurality of UEs, wherein the location results comprise at least one of:

a range between each target UE and another UE in the plurality of UEs;

a direction to or from the each target UE from or to, respectively, another UE in the plurality of UEs;

a location of the each target UE relative to a location of another UE in the plurality of UEs;

a velocity of the each target UE relative to a velocity of another UE in the plurality of UEs;

an absolute location of the each target UE;

an absolute velocity of the each target UE; or some combination thereof.

28. The UE of claim 27, wherein the plurality of SLPP messages includes at least one SLPP message sent by a sending UE to a receiving UE or receiving group of UEs, wherein the UE is either the sending UE, the receiving UE or part of the receiving group of UEs, wherein the at least one SLPP message comprises:

SLPP capabilities of the sending UE;

a request for SLPP capabilities of the receiving UE or receiving group of UEs;

SLPP assistance data to assist the receiving UE or receiving group of UEs to transmit or measure positioning related signals;

a request for SLPP assistance data from the receiving UE to assist the sending UE to transmit or measure positioning related signals;

a request for measurements or some of the location results or both obtained by the receiving UE or receiving group of UEs;

measurements or some of the location results or both obtained by the sending UE; or some combination of these.

29. The UE of claim 26, wherein the one or more processors are further configured to:

discover each of the other UEs in the plurality of UEs;

receive an indication from each of the other UEs in the plurality of UEs that the each of the other UEs supports SLPP; and determine to initiate the session based on a service request received from a network entity or a configuration of the UE.

30. The UE of claim 26, wherein the one or more processors are further configured to:

send a first SLPP message to each of the other UEs in the plurality of UEs comprising a request for the each UE to join the session; and receive a second SLPP message from each of the other UEs in the plurality of UEs indicating acceptance or rejection of the request.

31. The UE of claim 30, wherein the one or more processors are further configured to include in the first SLPP message at least one of:

a level 2 group address of the plurality of UEs, an SLPP session ID, or both of these.

32. The UE of claim 26, wherein the one or more processors are further configured to:

send a third SLPP message to each of the other UEs in the plurality of UEs, wherein the third SLPP message starts or restarts the SLPP session.

33. The UE of claim 32, wherein the one or more processors are further configured to include in the third SLPP message at least one of:

an application level ID for each UE of the plurality of UEs, an SLPP UE ID for each UE of the plurality of UEs, a group ciphering key for the plurality of UEs, or some combination of these.

34. The UE of claim 26, wherein the one or more processors are further configured to send a first SLPP message to at least one UE in the plurality of UEs to terminate the session at the at least one UE.

35. The UE of claim 26, wherein the one or more processors are further configured to:

send a first SLPP message to each UE except the UE in a second plurality of UEs, wherein the second plurality of UEs comprises the UE and at least some of the other UEs in the plurality of UEs and additional UEs not in the plurality of UEs, wherein the first SLPP message comprises a request for the each UE to join a modified session;

send a second SLPP message to each UE in a third plurality of UEs when the third plurality of UEs contains at least one UE, wherein the third plurality of UEs contain UEs not in the plurality of UEs, wherein the second SLPP message comprises a request for the each UE to join the modified session;

receive a third SLPP message from the each UE in the second plurality of UEs, indicating whether the each UE accepts or rejects the request; and receive a fourth SLPP message from the each UE in the third plurality of UEs when the third plurality of UEs contains at least one UE, indicating whether the each UE accepts or rejects the request; and send a fifth SLPP message to each UE except the UE in the plurality of UEs that is not in the second plurality of UEs indicating that the session is terminated at the each UE.

36. The UE of claim 35, wherein the one or more processors are further configured to:

send a sixth SLPP message to each UE in the second plurality of UEs and the third plurality of UEs when the each UE accepts the request for the each UE to join the modified session, wherein the sixth SLPP message starts the modified session.

37. The UE of claim 35, wherein the third plurality of UEs contains no UEs.

38. The UE of claim 26, wherein the one or more processors are further configured to:

receive a first SLPP message from a second UE in the plurality of UEs comprising a request for the UE to join, terminate, start, modify, or leave the session or for the second UE to join the session; and send a second SLPP message to the second UE when the first SLPP message comprises the request for the UE to join or modify the session or the request for the second UE to join the session, the second SLPP message indicating an acceptance or rejection of the request.

39. The UE of claim 26, wherein each SLPP message in the plurality of SLPP messages includes at least one of:

an SLPP session ID;

an SLPP transaction ID;

a level 2 address of a UE sending the SLPP message;

a level 2 address of a UE or a group of UEs receiving the SLPP message;

information for one or more UEs of the plurality of UEs, wherein the information includes an SLPP UE ID for each UE in the one or more UEs of the plurality of UEs; or some combination of these.

40. The UE of claim 27, wherein the sidelink positioning of the plurality of UEs is performed using at least one of:

transmission and measurement of sidelink positioning reference signals (SL PRS), real time kinematic (RTK), transmission and measurement of WiFi signals, transmission and measurement of ultra-wideband (UWB) signals, or some combination of these.

41. The UE of claim 40, wherein the sidelink positioning of the plurality of UEs is performed using RTK, wherein each UE in the plurality of UEs obtains carrier phase measurements of Global Navigation Satellite (GNSS) signals, wherein the carrier phase measurements obtained by the plurality of UEs are provided to at least one UE in the plurality of UEs, wherein the at least one UE determines location results for the plurality of UEs based on the carrier phase measurements obtained by the plurality of UEs.

42. The UE of claim 40, wherein the sidelink positioning of the plurality of UEs is performed using transmission and measurement of SL PRS and the one or more processors are further configured to:

obtain an SL PRS transmission configuration for each UE in the plurality of UEs;

obtain SL PRS measurements for the other UEs in the plurality of UEs based on the SL PRS transmission configurations for the other UEs;

transmit SL PRS based on the SL PRS transmission configuration for the UE; and perform at least one:

send the obtained SL PRS measurements to at least one other UE in the plurality of UEs, or receive obtained SL PRS measurements from at least one other UE in the plurality of UEs, or both of these, wherein the obtained SL PRS measurements enable determination of location results for the target UEs.

43. The UE of claim 42, wherein the SL PRS measurements comprise at least one of:

a receive time-transmission time difference (Rx-Tx), a reference signal time difference (RSTD), a round trip signal propagation time (RTT), a reference signal received power, a reference signal received quality, an angle of arrival, or some combination of these.

44. A User Equipment (UE) for sidelink positioning of a plurality of UEs including the UE, and wherein the UE comprises:

one or more transceivers;

one or more memories; and one or more processors communicatively coupled with the one or more transceivers and the one or more memories, wherein the one or more processors are configured to:

determine to perform sidelink positioning of the plurality of UEs, wherein there is no discovery between the UE and at least some of the other UEs in the plurality of UEs; and exchange a plurality of SLPP messages with other UEs in the plurality of UEs using broadcast or groupcast, wherein the SLPP messages are not part of a session, wherein the SLPP messages enable the sidelink positioning.

45. The UE of claim 44, wherein the one or more processors are further configured to obtain location results for at least two target UEs in the plurality of UEs, wherein the location results comprise at least one of:

a range between each target UE and another UE in the plurality of UEs;

a direction to or from the each target UE from or to, respectively, another UE in the plurality of UEs;

a location of the each target UE relative to a location of another UE in the plurality of UEs;

a velocity of the each target UE relative to a velocity of another UE in the plurality of UEs;

an absolute location of the each target UE;

an absolute velocity of the each target UE; or some combination thereof.

46. The UE of claim 45, wherein the plurality of SLPP messages includes at least one SLPP message sent by a sending UE to other UEs in the plurality of UEs, wherein the UE is either the sending UE or one of the other UEs, wherein the at least one SLPP message comprises:

SLPP assistance data to assist the other UEs to transmit or measure positioning related signals;

measurements or some of the location results or both obtained by the sending UE;

a level 2 address of the sending UE;

an application level address of the sending UE; or some combination of these.

47. The UE of claim 45, wherein the sidelink positioning of the plurality of UEs is performed using at least one of:

transmission and measurement of sidelink positioning reference signals (SL PRS);

real time kinematic (RTK);

transmission and measurement of WiFi signals;

transmission and measurement of ultra-wideband (UBW) signals; or some combination of these.

48. The UE of claim 47, wherein the sidelink positioning of the plurality of UEs is performed using RTK, wherein each UE in the plurality of UEs obtains carrier phase measurements of Global Navigation Satellite (GNSS) signals, wherein the carrier phase measurements obtained by the plurality of UEs are provided to at least one UE in the plurality of UEs, wherein the at least one UE in the plurality of UEs determines location results for some of the target UEs in the plurality of UEs based on the carrier phase measurements obtained by the plurality of UEs.

49. The UE of claim 48, wherein the sidelink positioning of the plurality of UEs is performed using transmission and measurement of SL PRS and wherein the one or more processors are further configured to:

receive SL PRS transmission configurations from other UEs in the plurality of UEs;

obtain SL PRS measurements for the other UEs in the plurality of UEs based on the SL PRS transmission configurations;

receive revised SL PRS transmission configurations from the other UEs in the plurality of UEs, wherein the revised SL PRS transmission configurations correspond to SL PRS transmitted by the other UEs;

send the obtained SL PRS measurements for the other UEs to the other UEs in the plurality of UEs;

transmit SL PRS based on an SL PRS transmission configuration for the UE;

send the SL PRS transmission configuration for the UE to other UEs in the plurality of UEs prior to the transmitting SL PRS;

send a revised SL PRS transmission configuration for the UE to the other UEs in the plurality of UEs after transmitting SL PRS, wherein the revised SL PRS transmission configuration corresponds to the transmitted SL PRS;

receive SL PRS measurements obtained by the other UEs in the plurality of UEs; and determine location results for some of the target UEs based on at least one of the obtained SL PRS measurements for the other UEs, the revised SL PRS transmission configurations for the other UEs in the plurality of UEs, the SL PRS measurements obtained by the other UEs in the plurality of UEs, and the revised SL PRS transmission configuration for the UE.

50. The UE of claim 49, wherein the SL PRS measurements comprise at least one of:

a receive time-transmission time difference (Rx-Tx), a reference signal time difference (RSTD), round trip signal propagation time (RTT), a reference signal received power, a reference signal received quality, an angle of arrival, or some combination of these.

* * * * *